United States Patent [19]
Siegrist et al.

[11] 3,725,395
[45] Apr. 3, 1973

[54] HETEROCYCLIC COMPOUNDS CONTAINING ETHYLENE DOUBLE BONDS AND PROCESS FOR THEIR MANUFACTURE

[75] Inventors: Adolf Emil Siegrist, Basel; Peter Liechti, Binningen; Erwin Maeder, Aesch/Bl; Leonardo Guglielmetti, Birsfelden; Hans Rudolf Meyer; Kurt Weber, both of Basel, all of Switzerland

[73] Assignee: Ciba-Geigy A.G., Basel, Switzerland

[22] Filed: Aug. 28, 1970

[21] Appl. No.: 68,012

Related U.S. Application Data

[63] Continuation of Ser. No. 588,318, Oct. 21, 1966, abandoned.

[30] Foreign Application Priority Data

Oct. 28, 1965 Switzerland......................14902/65

[52] U.S. Cl. .........260/240 CA, 96/1 R, 117/33.5 T, 106/124, 106/148, 106/176, 252/152, 252/301.2 W, 252/543, 260/2 S, 260/46.5 R, 260/47 EP, 260/63 FP, 260/73 L, 260/75 N, 260/77.5 D, 260/78 R, 260/78.5 T, 260/79, 260/79.7, 260/80.3 R, 260/240 B, 260/240 C, 260/240.1, 260/248 CS, 260/250 A, 260/251 Q, 260/283 R, 260/290 R, 260/302 D, 260/309, 260/309.2, 260/310 R, 260/566 F, 260/762, 260/304, 260/307 D, 260/308 B

[51] Int. Cl. ..............................................C09b 23/00

[58] Field of Search .....................260/240 CA, 240 D

[56] References Cited

OTHER PUBLICATIONS

Katayanagi, J. Pharm. Soc. Japan, Vol. 68, pages 232-234 (1948).
Crippa et al., Chemical Abstracts Vol. 42, Cols. 2973 to 2974 (1948).
Crippa et al., Chemical Abstracts, Vol. 43, Col. 2209 (1949).
Avramoff et al., J. Am. Chem. Soc., Vol. 78, pages 4090 to 4096 (1956).
Miyano et al., Chem. Pharm. Bull. Vol. 15, pages 511 to 514 (1967).

*Primary Examiner*—John D. Randolph
*Attorney*—Harry Goldsmith, Joseph G. Kolodny and Mario A. Monaco

[57] ABSTRACT

The present invention comprises a process for the manufacture of heterocyclic compounds containing ethylene double bonds. This process is characterized by reacting a compound of formula

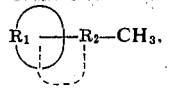

in which $R_1$ represents a heterocyclic ring system of aromatic character which (a) contains at least one 5-membered or 6-membered heterocyclic ring with at least one ring nitrogen atom, (b) is free of hydrogen atoms which (1) are bonded to ring nitrogen atoms and (2) which are replaceable by alkali metal, and (c) is bonded to a ring member of $R_2$ by means of a ring member or has two adjacent ring members in common with two adjacent ring members of $R_2$, in which $R_2$ denotes a carbocyclic ring system of aromatic character which contains 6 ring members, and which optionally is condensed with a further aromatic or hydroaromatic ring system, and in which (b) the methyl group shown in the formula is in a p-position to the bond to $R_1$, is reacted with a Schiff base in the presence of a strongly basic alkali compound, with the reaction medium to be used being dimethylformamide, which is practically anhydrous, except in the case of the use of an alkali hydroxide as the strongly basic alkali compound, in which case the alkali hydroxide may have a water content of up to 25 percent. The products obtained according to this process are valuable fluorescent compounds and useful as optical brighteners.

11 Claims, No Drawings

HETEROCYCLIC COMPOUNDS CONTAINING ETHYLENE DOUBLE BONDS AND PROCESS FOR THEIR MANUFACTURE

This application is a continuation of Ser. No. 588,318, filed Oct. 21, 1966, now abandoned and refiled as streamline continuation Ser. No. 142,388 on May 11, 1971, now allowed.

The present invention comprises a process for the manufacture of heterocyclic compounds containing ethylene double bonds. This process is characterized by reacting a compound of formula (1) 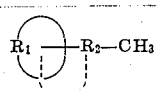

in which $R_1$ represents a heterocyclic ring system of aromatic character which (a) contains at least one 5-membered or 6-membered heterocyclic ring with at least one ring nitrogen atom, (b) is free of hydrogen atoms which (1) are bonded to ring nitrogen atoms and (2) which are replaceable by alkali metal, and (c) is bonded to a ring member of $R_2$ by means of a ring member or has two adjacent ring members in common with two adjacent ring members of $R_2$, in which $R_2$ denotes a carbocyclic or heterocyclic ring system of aromatic character which contains 6 ring members, and which optionally is condensed with further aromatic or hydroaromatic ring systems, and in which (b) the methyl group shown in the formula is in a p-position to the bond to $R_1$, is reacted with a Schiff base in the presence of a strongly basic alkali compound, with the reaction medium to be used being a strongly polar, neutral to basic, organic solvent which (I) is free of atoms, especially hydrogen atoms, which are replaceable by alkali metal and (II) is practically anhydrous, except in the case of the use of an alkali hydroxide as the strongly basic alkali compound in which case the alkali hydroxide may have a water content of up to 25 percent.

Within the framework of the present invention two main types of reactions according to formula (1) are above all of importance, and these may be circumscribed as follows:

1. The reaction of anils of aldehydes of aromatic character, in the manner described under formula (1), with compounds of formula (1a) 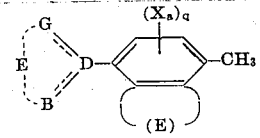

in which formula (a) G, B and D each denote a ring atom of a 5-membered or 6-membered ring system of aromatic character, with at least one of the symbols G, B and D representing a nitrogen atom, and where D may instead of nitrogen also denote a carbon atom and G as well as B may represent carbon, nitrogen, oxygen or sulphur atoms in the arrangement of ring systems which are in themselves known, (b) E represents the ring member supplementation to give a 5-membered or 6-membered ring system of aromatic character, containing carbon, nitrogen, oxygen or sulphur atoms in the arrangement of ring systems which are in themselves known, and in which (c) the rings which are formed conjointly with the symbol E may contain further substituents, which like the substituent $X_a$ do not contain any atoms which may be replaced by alkali, especially hydrogen atoms, and $p$ represents the numbers 0 or 1 and $q$ the numbers 0, 1, 2 or 3.

The aforementioned substituents may be of any desired aliphatic, cycloaliphatic, araliphatic or aromatic nature or may represent functional substituents (e.g. carboxylic acid ester groups and the like) as long as they fulfil the preceding condition.

2. A further important application of the reaction category disclosed under formula (1) comprises the reaction of anils of aldehydes of aromatic character, in the manner given under formula (1), with compounds of formula (1b) 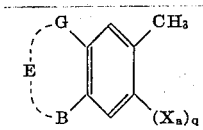

in which formula (a) G and B each denote a ring atom of a 5-membered or 6-membered ring system of aromatic character and may represent carbon, oxygen, sulphur or nitrogen atoms, but at least one of the symbols G or B represent a nitrogen atom, and these atoms are present in the arrangement of ring systems which are in themselves known, (b) E denotes the ring member supplementation to form a 5-membered or 6-membered ring system of aromatic character, containing carbon, nitrogen, oxygen or sulphur atoms in the arrangement of ring systems which are in themselves known, and in which (c) the ring formed together with the symbol E may contain further substituents, which like the substituent $X_a$ do not contain any atoms replaceable by alkali, especially hydrogen atoms, and $q$ may denote the numbers 0, 1, 2 or 3.

These substituents may again, as explained under formula (1a), be of any desired aliphatic, cycloaliphatic, araliphatic or aromatic nature or may represent functional substituents (e.g. carboxylic acid ester groups).

The reaction which has been discovered in the present process is based in principle on a reaction of the methyl group of compounds of formula category (1) with the azomethine grouping of a Schiff base (for example benzalaniline) with elimination of the amine components, according to the following scheme:

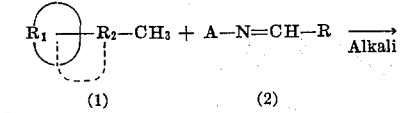

(1)    (2)

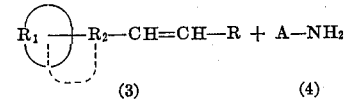

(3)    (4)

Here $R_1$ and $R_2$ have the significance given above, A—N= represents an amine residue and =CH—R represents an aldehyde residue, in which R denotes a residue of an aldehyde of aromatic character.

The heterocyclic ring system $R_1$ may consist of one or more rings. At the same time it is a prerequisite in all cases that this ring system $R_1$ should contain a heterocyclic ring, having 5 to 6 ring members and containing ring nitrogen atoms, this ring in turn being bonded to $R_2$, and in fact either (a) in such a way that one ring atom of this heterocyclic ring is bonded to a ring atom of $R_2$ by means of one bond, or (b) that this heterocyclic ring has two, in each case adjacent, ring atoms in common with $R_2$, that is to say that it forms a condensed ring system. The statement that the ring system $R_1$ may consist of one or more rings, denotes that for example (a) $R_1$ consists only of one heterocyclic ring having 5 to 6 ring members and containing ring nitrogen atoms, or (b) a heterocyclic compound as defined under (a) contains further carbocyclic rings (especially 6-rings) condensed to it (preferably a benzene or naphthalene ring), or (c) a heterocyclic compound as defined under (a) contains further aromatic rings of carbocylic or heterocyclic nature bonded via a single valence (that is to say not condensed), or (d) a heterocyclic compound as defined under (a) is condensed with further heterocyclic rings, in which case hetero-atoms may also be common to two rings, or (e) combinations of the abovementioned variants with one another.

One of the reagents to be used for the process of the invention, namely the compound according to formula (1), is capable of very broad variation within the framework of the definition given above.

The text which follows summarizes the basic types and some selected classes of compounds according to formula (1), without thereby imposing a limitation to these formulas.

A. Compounds of formula (5) 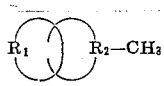

in which $R_1$ denotes a heterocyclic ring system which contains a 5-membered to 6-membered heterocyclic ring with two adjacent ring members which are directly bonded to $R_2$ and at least one nitrogen atom which is exclusively bonded into the ring, and $R_2$ denotes a benzene ring condensed with the hetero-ring, with the two carbon atoms which belong to both rings and with the carbon atom bonded to the $H_3C$-group being in the 1,2,4-position relative to one another. In this case the benzene residue $R_2$ is with advantage monocyclic and the heterocyclic ring of the residue $R_1$ is only condensed with $R_2$. The latter may however of course still contain monovalent substituents, e.g. hydrocarbon residues, which may, like benzene residues or diphenyl residues, also be cyclic. Here emphasis should be placed on the compounds of formula (6) 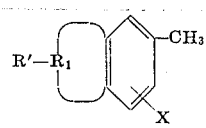

and especially on the benzoxazoles of formula (7) 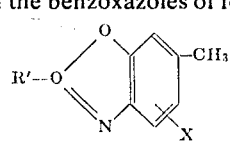

in which $R'$ denotes a benzene residue or naphthalene residue, X a hydrogen atom, a chlorine atom, a methoxy group or a methyl group and $R_1$ a 5-membered heterocyclic ring with a nitrogen atom exclusively bonded into the ring, this ring being condensed with the benzene ring in the manner stated. As has been stated, the benzene residue $R'$ may contain further substituents, e.g. those mentioned for X, or further singly bonded benzene residues.

B. Compounds of formula (8) 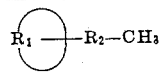

in which $R_1$ denotes a heterocyclic ring system which contains at least one 5-membered to 6-membered heterocyclic ring with a ring member which is directly bonded to $R_2$ and a nitrogen atom which is exclusively bonded into the ring, and $R_2$ represents a benzene residue or naphthalene residue bonded to $R_1$ and to the $H_3C$-group in the 1,4-position. Here the ring system $R_1$ preferably consists of a 5-membered to 6-membered heterocyclic ring and a benzene or naphthalene ring condensed with this ring, with the rings referred to again being able to have further substituents, as may be the case for compounds of formula (9) 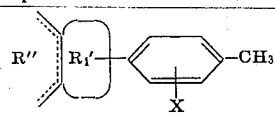

in which $R''$ denotes a benzene residue or naphthalene residue condensed with $R_1'$ in the manner indicated by the valency lines, $R_1'$ denotes a 5-membered to 6-membered heterocyclic ring with a ring member directly bonded to the methylphenyl residue and with at least one nitrogen atom exclusively bonded into the ring, and X denotes a hydrogen atom, a chlorine atom, a methoxy group of a methyl group. Possible compounds are especially triazole, oxazole and diazine compounds, for example compounds of formulas

(10) 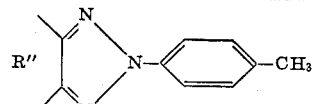

(11) 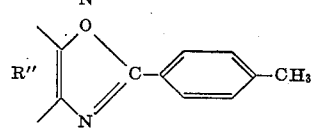

and

(12) 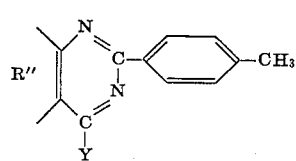

in which $R''$ denotes a benzene or naphthalene ring, condensed with the triazole, oxazole or diazine ring in the manner indicated by the valency lines, and Y denotes a hydrogen atom or a benzene residue.

C. Compounds of formula

(13) 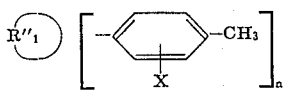

in which $R_1''$ denotes a heterocyclic ring system having at most two rings, which contains a 5-membered to 6-membered heterocyclic ring with two to three ring members singly and directly bonded to the methylbenzene residue and at least one nitrogen atom exclusively bonded into the ring, X represents a hydrogen atom, a halogen atom, a methoxy group or a methyl group, and n is equal to 2 or 3. $R_1''$ may for example be an oxdiazole, thiadiazole, quinazoline, pyrimidine or 1,3,5-triazine residue. As Examples there may here be emphasized the oxdiazole and thiadiazole compounds of formula

(14) 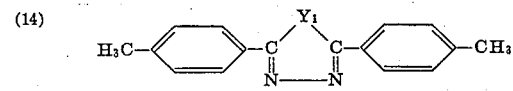

in which $Y_1$ denotes an oxygen or sulphur atom.

D. Compounds of formula

(15) 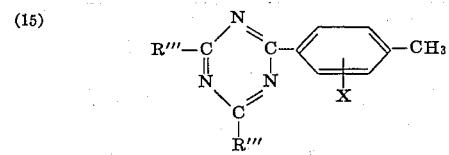

in which $R'''$ denotes, for example, a monocyclic benzene residue and X a hydrogen atom, a chlorine atom, a methoxy group or a methyl group, especially triazines of formula

(16) 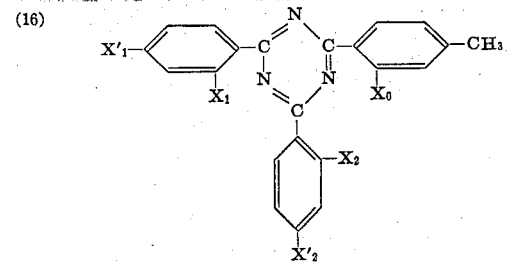

in which $X_0$, $X_1$, $X_2$, $X_1'$ and $X_2'$ denote methyl groups or hydrogen atoms. If at least one of the residues $R'''$ contains a methyl group in the para-position, and/or if at least one of the symbols $X_1'$ or $X_2'$ denotes a methyl group, then these compounds may also correspond to formula (13).

E. Compounds according to one of the formulas listed below:

(17) 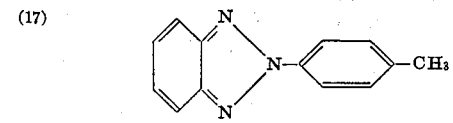

(18) 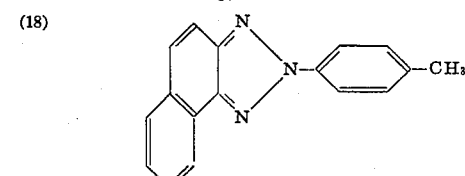

(19) 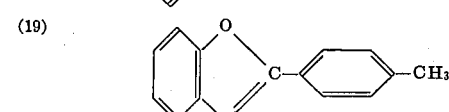

(20) 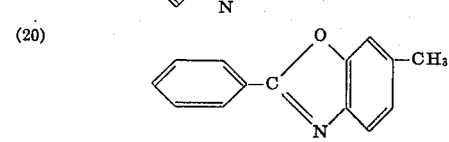

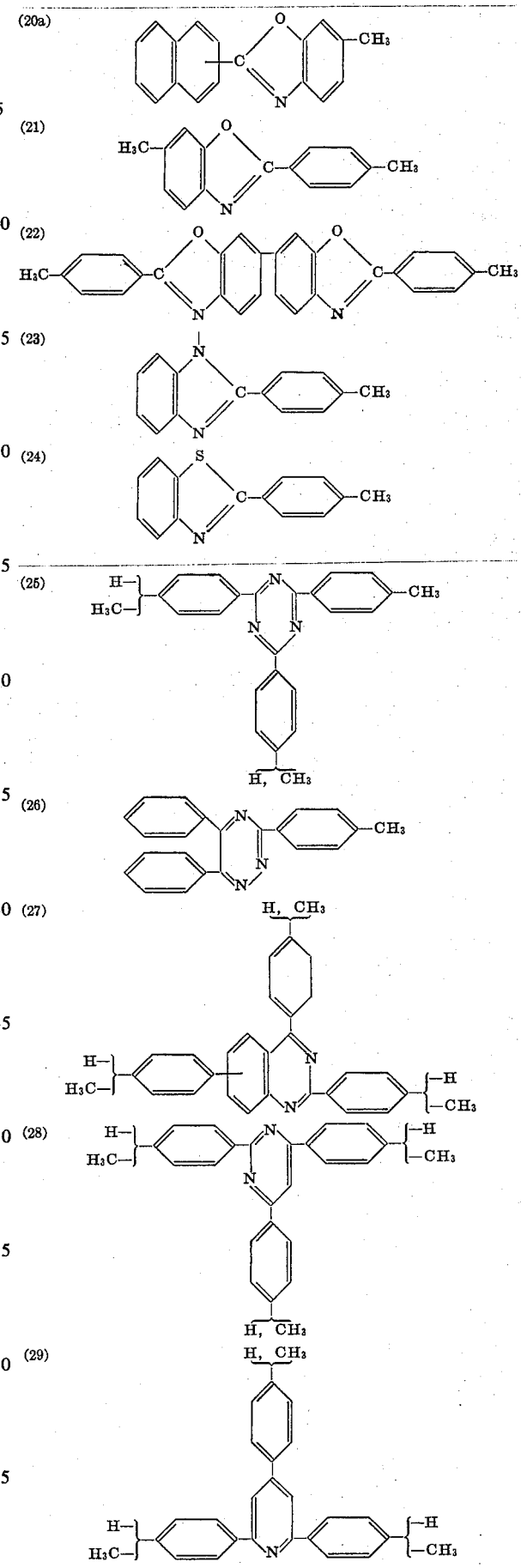

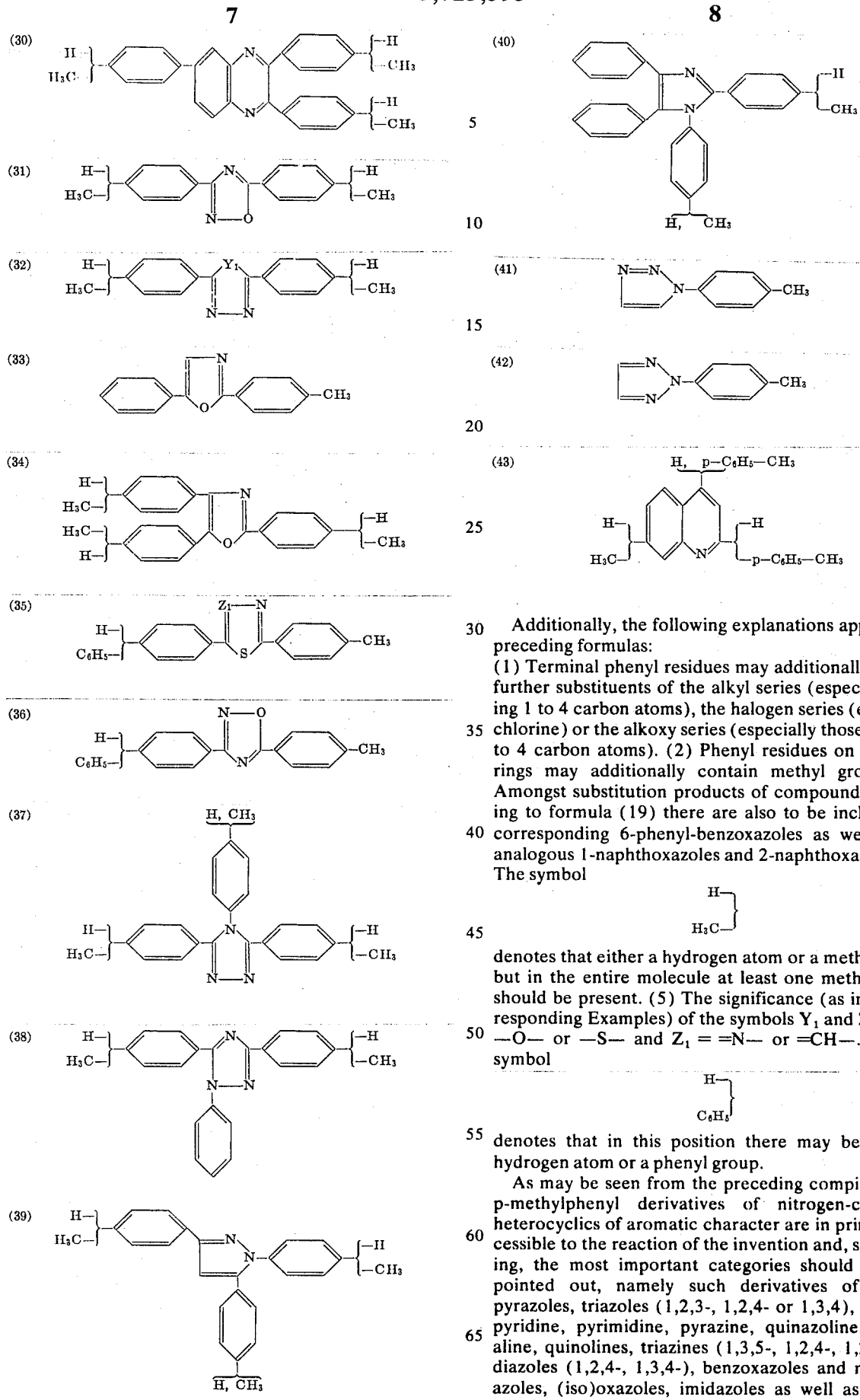

Additionally, the following explanations apply to the preceding formulas:

(1) Terminal phenyl residues may additionally contain further substituents of the alkyl series (especially having 1 to 4 carbon atoms), the halogen series (especially chlorine) or the alkoxy series (especially those having 1 to 4 carbon atoms). (2) Phenyl residues on s-triazine rings may additionally contain methyl groups. (3) Amongst substitution products of compounds according to formula (19) there are also to be included the corresponding 6-phenyl-benzoxazoles as well as the analogous 1-naphthoxazoles and 2-naphthoxazoles. (4) The symbol

denotes that either a hydrogen atom or a methyl group, but in the entire molecule at least one methyl group, should be present. (5) The significance (as in the corresponding Examples) of the symbols $Y_1$ and $Z_1$ is $Y_1 =$ —O— or —S— and $Z_1 = $ =N— or =CH—. (6) The symbol

denotes that in this position there may be either a hydrogen atom or a phenyl group.

As may be seen from the preceding compilation, all p-methylphenyl derivatives of nitrogen-containing heterocyclics of aromatic character are in principle accessible to the reaction of the invention and, summarizing, the most important categories should again be pointed out, namely such derivatives of pyrrole, pyrazoles, triazoles (1,2,3-, 1,2,4- or 1,3,4), tetrazole, pyridine, pyrimidine, pyrazine, quinazoline, quinoxaline, quinolines, triazines (1,3,5-, 1,2,4-, 1,2,3-), oxdiazoles (1,2,4-, 1,3,4-), benzoxazoles and naphthoxazoles, (iso)oxazoles, imidazoles as well as the corresponding ring systems which are condensed with benzene or naphthalene rings, where these have not already been named.

The Schiff base to be used as the second reagent in the present process must, as will be obvious, be free of reactive methyl groups, for example those in the p-position to the azomethine grouping. Possible Schiff bases are, in turn, the (known) condensation products of aldehydes of aromatic character with primary amines (of aliphatic, aromatic or heterocyclic nature), whose amino group is bonded to a tertiary carbon atom. Compounds of this type may accordingly be written as azomethine compounds of formula (45)

(45) 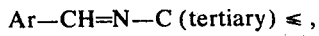 Ar—CH=N—C (tertiary) ≼ , in which Ar denotes an aromatic residue. In this, either one or both of the components required for the synthesis of the Schiff bases (aldehyde and amine) may contain further substituents, provided the above restriction is observed. Since the amine, especially aniline, residue is split off during the reaction and is no longer present in the final product, the presence of substituents in this is generally not indicated and is uninteresting. Nevertheless substituents which do not interfere with, or hinder, the reaction, for example chlorine atoms, may be present in this ring also. The benzene residue bonded to the =HC-group may for example carry halogen atoms such as bromine or chlorine or alkoxy groups such as methoxy or ethoxy. Preferred interest attaches to Schiff bases of aromatic aldehydes with anilines, that is to say aromatic aldehyde-anils. Such anils for example correspond to the formula

(44) 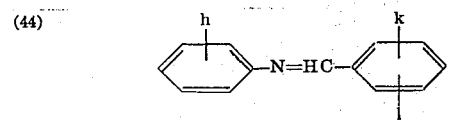

in which $k$ and $l$ may be identical or different and denote hydrogen atoms, chlorine atoms or methoxy groups and in which $h$ represents chlorine or, preferably, hydrogen. Adjacent $k$ and $l$ may together also form a —O—CH$_2$—O— group. Another important variant of aromatic anils corresponds to the formula (45a) 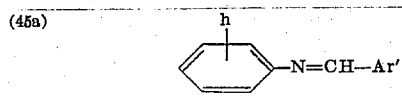

in which $h$ (as above) represents a hydrogen atom or chlorine and Ar' denotes a naphthyl or diphenyl residue. As monoaldehydes suitable for the synthesis of these Schiff bases there may be quoted for example: aldehydes of the benzene series such as benzaldehyde or its halogenated analogues, such as the monochloro-analogues and dichloro-analogues, alkoxybenzaldehydes such as p-methoxy-benzaldehyde, alkylated benzaldehydes, provided these do not contain any p-methyl groups, such as toluyl-aldehyde, xylyl-aldehyde and cumoyl-aldehyde, methylenedioxy-benzaldehyde (piperonal), 4-dimethylamino-benzaldehyde, 4-diethylamino-benzaldehyde, and diphenyl-aldehyde; aldehydes of the naphthalene series such as α- and β-naphthaldehyde, and heterocyclic aldehydes such as for example furfurol and thiophenaldehyde.

As suitable amines there may be named, by way of example, the anilines, naphthylamines or, as an aliphatic representative, tert. butylamine.

Compounds of formula (1) are reacted with the aldehyde-anils in the presence of a strongly polar, neutral to alkaline, organic solvent which is free of atoms, especially hydrogen atoms, which are replaceable by alkali metals. Such solvents are especially represented by di-alkylated acylamides, preferably those of the type

(46) 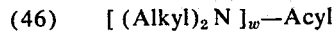 [ (Alkyl)$_2$ N ]$_w$—Acyl in which "Alkyl" denotes a loweralkyl group (containing 1 to 4 carbon atoms), especially a methyl group, "Acyl" the residue of a low carboxylic acid (containing 1 to 4 carbon atoms), especially formic acid or acetic acid, or of phosphoric acid, and w gives the basicity of the acid. As important examples of such solvents there may be quoted dimethylformamide, diethylformamide, dimethylacetamide and hexamethyl-phosphoric acid-triamide. It is also possible to use solvent mixtures.

The reaction furthermore requires a strongly basic alkali compound. By the term strongly basic alkali compounds there are to be understood, within the framework of the present invention, such compounds of the alkali metals (I.main group of the periodic table of elements) including ammonium as have a basic strength of at least about that of lithium hydroxide. Accordingly, they may be compounds of lithium, sodium, potassium, rubidium, caesium or ammonium of, for example, the alcoholate, hydroxide, amide, hydride, sulphide or strongly basic ion exchanger types. Potassium compounds of composition

(47)  KOC$_{m-1}$H$_{2m-1}$ in which m denotes an integer of 1 to 6, such as for example potassium hydroxide or potassium tertiary-butylate, are advantageously used (above all when mild reaction conditions as regards reaction temperature appear to be indicated). In the case of alkali alcoholates and alkali amides (and hydrides) it is here necessary to work in a practically anhydrous medium, whereas in the case of alkali hydroxides water contents of up to 25 percent (for example contents of water of crystallization) are admissible. In the case of potassium hydroxide a water content of up to about 10 percent has proved appropriate. As examples of other alkali compounds which may be used there may be quoted sodium methylate, sodium hydroxide, sodium amide, lithium amide, lithium hydroxide, rubidium hydroxide, caesium hydroxide and the like. Of course it is also possible to work with mixtures of such bases.

In accordance with the preceding explanations, an embodiment of the present invention which is important in practice consists of reacting anils of aldehydes of the benzene and naphthalene series with compounds which correspond to the formula

(48) 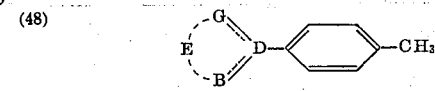

in which formula (a) G, B and D each denote a ring atom of a 5-membered or 6-membered ring system of aromatic character, with at least one of the symbols G, B and D representing a nitrogen atom, where D may, instead of nitrogen, also denote the carbon atom and G as well as B may represent carbon, nitrogen, oxygen or sulphur atoms in the arrangement of ring systems which are in themselves known, (b) E represents the ring member supplementation for a 5-membered or 6-membered ring system of aromatic character containing carbon, nitrogen, oxygen or sulphur atoms in the arrangement of ring systems which are in themselves known, and in which (c) the ring formed together with the symbol E may contain further substituents which do not contain any atoms, particularly hydrogen atoms, which are replaceable by alkali, this reaction being carried out in the presence of an alkali compound having a basic strength of at least that of lithium hydroxide, preferably potassium tertiary-butylate or potassium hydroxide, in a solvent which corresponds to the formula $$[ (Alkyl)_2 N ]_w —Acyl$$

in which "Alkyl" denotes a low alkyl group, "Acyl" the residue of a low aliphatic, carboxylic acid or of phosphoric acid and w the basicity of the acid, preferably in dimethylformamide.

It is appropriate to react the compounds of formula (1) with the aldehyde-anils in equivalent amounts, so that no component is present in significant excess. As regards the alkali compound, it is advantageous to use at least the equivalent amount, that is to say at least 1 mole, of a compound having, for example, a KO group, per mole of aldehyde-anil. When using potassium hydroxide a 4-fold to 8-fold amount is preferably employed.

The reaction of the invention may generally be carried out at temperatures in the range of between about 10° and 150°C. If alcoholates are used as the potassium compound in the reaction, then the application of heat is generally not necessary. The procedure is, for example, that the aldehyde-aniline is added to the mixture of the compound of formula (1), the solvent and the potassium alcoholate, preferably with stirring and with exclusion of air, at a temperature of between 15° and 30°C, whereupon the reaction takes place of its own accord, with a slight temperature rise. When using potassium hydroxide it is frequently necessary to work at higher temperatures. For example the reaction mixture is slowly warmed to 30°–100°C and then kept at this temperature for some time, for example one-half to 2 hours. The products may be worked up from the reaction mixture by usual methods which are in themselves known.

The compounds obtainable by the present process are in part known compounds. New compounds are, amongst others, the compounds of the following composition:

(49)

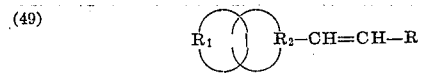

in which $R_1$ denotes a heterocyclic ring system which contains a 5-membered to 6-membered heterocyclic ring having two adjacent ring members directly bonded to $R_2$ and at least one nitrogen atom exclusively bonded into the ring, $R_2$ denotes a benzene ring condensed with the hetero-ring, with the two carbon atoms belonging to both rings and the carbon atom bonded to the —CH= group being in the 1,2,4-position to one another, and R denotes an aromatic residue.

II. Compounds of formula (50)

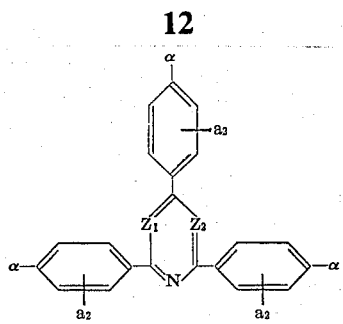

in which $a_2$ represents hydrogen, halogen, the methyl group or the methoxy group, $Z_1$ and/or $Z_2$ denotes a ring member =CH— or =N— and α represents a hydrogen atom, a phenyl residue or a residue of the series

in which (I) at least one residue α differs from hydrogen or phenyl and has the significance of one of the other residues quoted for α, and in which (II) terminal phenyl or naphthyl residues may additionally contain 1 to 3 alkyl groups, 1 to 2 halogen atoms or an alkoxy group.

III. Compounds of formula (51)

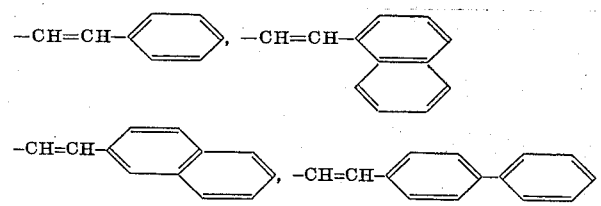

in which R''' denotes an organic residue bonded to the triazine ring by means of a benzene ring, $R_2$ a benzene residue bonded in the 1,4-position to the triazine ring and the —CH= group, and R an aromatic residue.

IV. Triazine derivatives of formula (158)

B₁—CH=CH—⟨⟩—C(=N)—⟨⟩—CH=CH—B₁ with pendant phenyl-B₂ in which $B_1$ represents a phenyl or diphenyl residue and $B_2$ represents hydrogen, a phenyl residue or an alkyl group having 1 to 4 carbon atoms, and in which terminal phenyl residues may contain an alkyl group with 1 to 4 carbon atoms, halogen or a methoxy group.

V. Pyridine derivatives of formula (363)

in which V₁, V₂ or V₃ represent hydrogen, a styryl residue or a p-phenylstyryl residue, but in which at least one residue V differs from hydrogen.

VI. Pyrimidine derivatives of formula (371)
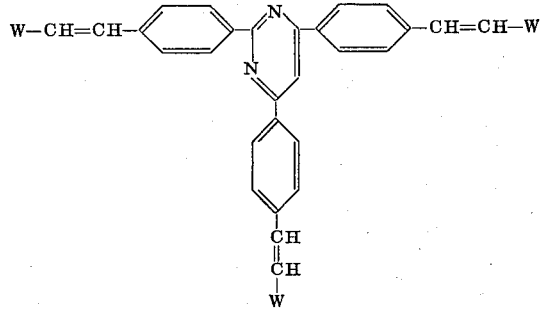

in which W denotes a phenyl, diphenyl, 1-naphthyl or 2-naphthyl residue.

VII. Compounds of formula

(52)
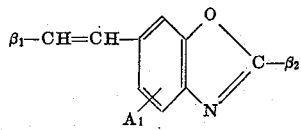

in which $A_1$ represents a hydrogen atom, a methyl group or a halogen atom, $\beta_1$ denotes a residue of the series phenyl, diphenyl, 1-naphthyl or 2-naphthyl and $\beta_2$ represents a residue of the series phenyl, diphenyl, styryl, stilbenyl, p-phenyl-stilbenyl, 1-naphthyl or 2-naphthyl, and where terminal phenyl or naphthyl groups may additionally contain 1 to 3 alkyl groups, 1 to 2 halogen atoms or an alkoxy group.

VIII. Benzoxazole derivatives of formula (111)
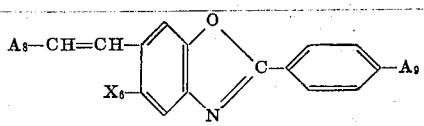

in which $X_6$ represents hydrogen or a methyl group, $A_8$ denotes a phenyl group, a diphenyl group or a 1-naphthyl or 2-naphthyl group, and $A_9$ represents hydrogen, halogen, an alkyl group containing 1 to 4 carbon atoms, a styryl group or p-phenylstyryl group, and where terminal phenyl or naphthyl groups may additionally contain 1 to 3 alkyl groups, 1 to 2 halogen atoms or an alkoxy group.

IX. Compounds of formula

(53)
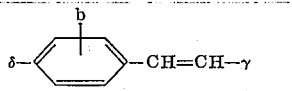

in which $b$ represents a hydrogen atom or a methyl group, $\gamma$ represents a p-isopropylphenyl, diphenyl, 1-naphthyl or 2-naphthyl residue, and $\delta$ denotes a residue of the series

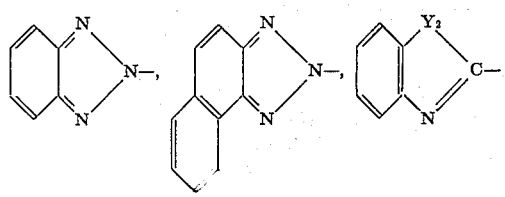

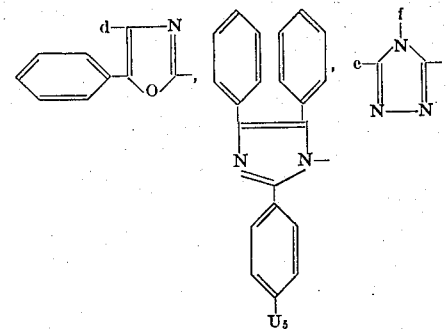

where (I) d represents hydrogen or phenyl, $e$ and $f$ represent phenyl, stilbenyl, p-phenylstilbenyl or benzostilbenyl, and furthermore $Y_2$ represents a bridge member —O—, —NH— or —N(alkyl)-, where (II) $U_5$ denotes hydrogen, a styryl residue or a p-phenylstyryl residue, and where (III) terminal phenyl or naphthyl residues may contain 1 to 3 alkyl groups, 1 to 2 halogen atoms or an alkoxy group.

X. Compounds of general formula

(54)
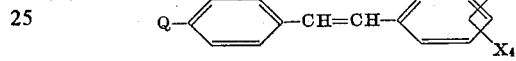

in which the symbol Q represents a benztriazole, naphthotriazole, 2-benzoxazole, 2-naphthoxazole, benzdiazine, 2-oxazole, s-triazine, as-triazine, oxdiazole (optionally aryl-substituted) or benzthiazole residue and $X_3$ and $X_4$ denote branched alkyl groups, or one of the substituents $X_3$ and $X_4$ denotes a phenyl group or two adjacent substituents $X_3$ and $X_4$ denote a condensed-on carbocyclic ring.

XI. Compounds of formula

(55)
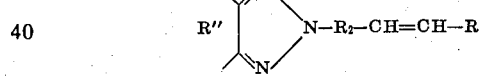

in which R″ denotes a benzene or naphthalene ring condensed with the triazole ring in the manner indicated by the valency lines, $R_2$ denotes a benzene residue bonded to the triazole ring and the —CH= group in the 1,4-position and R denotes a p-isopropylphenyl, biphenylyl or naphthyl residue.

XII. Oxazole compounds of formula

(56)
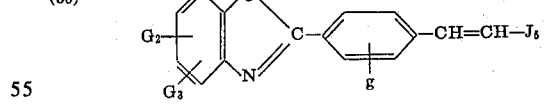

in which $G_2$ denotes hydrogen, an alkyl group having 1 to 4 carbon atoms, a phenyl group, a phenylalkyl group with 1 to 4 carbon atoms in the alkyl group, halogen or a sulphonamide group, $G_3$ represents hydrogen or an alkyl group or may, together with an adjacent residue $G_2$ and the benzene ring to which these G-residues are attached, form a naphthalene ring g represents hydrogen or methyl and $J_5$ denotes a p-isopropylphenyl, diphenyl, 1-naphthyl or 2-naphthyl residue, where terminal phenyl or naphthyl residues may additionally contain 1 to 3 alkyl groups, 1 to 2 halogen atoms or an alkoxy group.

XIII. Compounds of formula

(57) 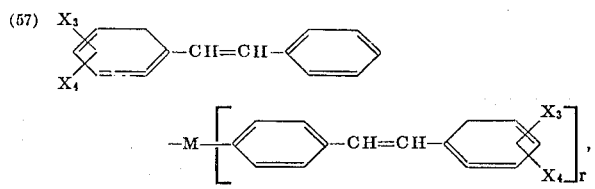

in which M represents a 1,2,4-oxdiazole, 1,3,4-triazole, thiadiazole, s-triazine or bisbenzoxazole residue of formula (57)a 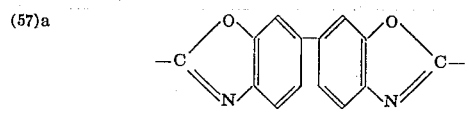

and $X_3$ and $X_4$ denote hydrogen, halogen, alkyl (straight-chain or branched) or alkoxy groups, or one of the substituents $X_3$ and $X_4$ denotes a phenyl group or two adjacent substituents of a condensed-on carbocyclic ring, and r represents the numbers 1 or 2.

XIV. Compounds of formula

(58) 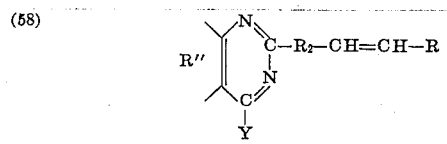

in which R'' represents a benzene ring condensed with the diazine ring in the manner indicated by the valency lines, Y denotes a hydrogen atom or a benzene residue, $R_2$ denotes a benzene residue bonded to the diazine ring and to the —CH= group in the 1,4-position and R denotes an aromatic residue.

XV. Compounds of formula

(59) 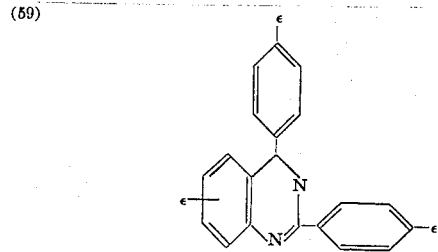

in which one to two residues ε represent a styryl or p-phenylstyryl residue and the remaining ε residues denote hydrogen atoms.

XVI. Compounds of formula (141) 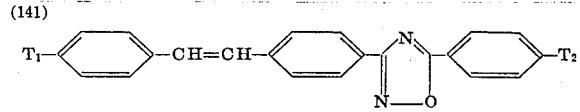

in which $T_1$ represents hydrogen or a phenyl residue and $R_2$ represents hydrogen, a styryl residue or a p-phenylstyryl residue.

XVII. 1,2,4-Triazine compounds of formula

(60) 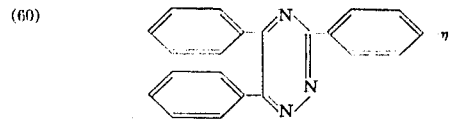

in which η represents a styryl or p-phenylstyryl residue.

XVIII. Benzthiazole compounds of formula

(61) 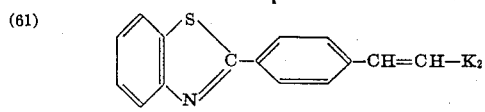

in which $K_2$ represents a diphenyl residue or a 1-naphthyl or 2-naphthyl residue.

XIX. Compounds of formula

(62) 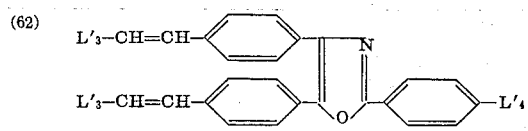

in which $L_3'$ denotes a diphenyl or naphthyl residue and $L_4'$ hydrogen, a styryl residue or a p-phenylstyryl residue.

XX. Compounds of formula (306) 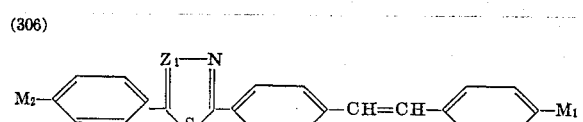

in which $M_1$ and $M_2$ represent hydrogen or phenyl and $Z_1$ represents a bridge member =CH— or =N—.

XXI. Compounds of formula (314) 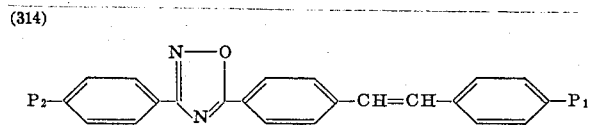

in which $P_1$ represents hydrogen, an alkyl group containing 1 to 6 carbon atoms or a phenyl group and $P_2$ represents hydrogen or a phenyl group.

XXII. Compounds of formula (340) 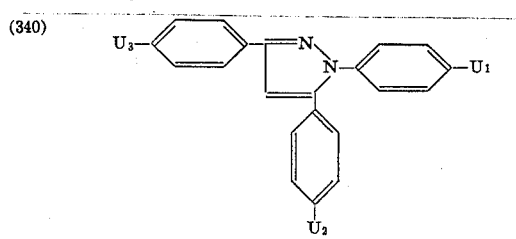

in which $U_1$, $U_2$ and $U_3$ denote a hydrogen atom, a styryl residue or a phenylstyryl residue and at least one symbol U differs from hydrogen.

XXII. Compounds of formula (379) 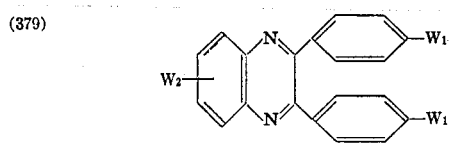

in which $W_1$ and $W_2$ denote a hydrogen atom, a styryl group or a p-phenylstyryl group, but at least one symbol W differs from hydrogen.

XXIV. Compounds of formula (386) 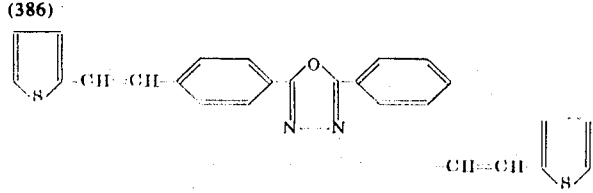

or (387)

[chemical structure: thiophene-CH=CH-phenyl-C(benzoxazole)]

whose terminal aromatic rings may additionally contain alkyl groups, halogen atoms or alkoxy groups.

In these formulas quoted under numbers I to XXIV possible alkyl groups in principle also include long chain alkyl groups, but in practice it is mostly alkyl groups containing up to about 8 carbon atoms, preferably 1 to 4 carbon atoms, and especially branched-chain alkyl groups, which require consideration.

Though again in the case of alkoxy groups higher members, that is to say those containing 4 or more carbon atoms, as well as polyalkyleneoxy groups, are possible, the predominant practical significance resides in alkoxy groups containing 1 to 4 carbon atoms. Amongst the halogens quoted, chlorine is of especial interest.

The new compounds of the formulas of the preceding groups I to XXIV may be used as intermediates, for example for the manufacture of dyestuffs or pharmaceuticals. It is also possible subsequently to introduce acid groups conferring water solubility into the new compounds, by methods which are in themselves known.

A large number of compounds of general formula (49), especially those of formulas (50), (51), (52), (53), (54), (55), (56), (57), (61), (111), (158), (306), (363), and (371) may, as has further been found, be used as optical brighteners provided they do not contain any chromophoric groups.

From the point of view of use as optical brighteners for the most varied organic materials in which optical brighteners are desirable, the types of compound which are advantageously accessible by the above process may also be classified as follows:

a. Compounds of formula

(63) $A_1-CH=CH-$ [benzoxazole]$-C-R_2$, $X_5$ in which $A_1$ denotes a phenyl, diphenylyl or naphthyl residue, $A_2$ denotes a phenyl, diphenylyl, naphthyl or stilbenyl residue, and $X_5$ represents hydrogen, alkyl or halogen.

b. Compounds of formula

(64) [phenyl-phenyl-CH=CH-phenyl-C(benzoxazole)-(A_3)_s], $X_5$ in which $A_3$ represents hydrogen, an alkyl group having 1 to 18 carbon atoms, an aryl residue, especially a phenyl residue, an aralkyl residue (especially a phenyl-$C_{1-4}$-alkyl residue) or a halogen atom and s denotes an integer from 1 to 3, preferably 1, and $X_5$ represents hydrogen, alkyl or halogen.

c. Compounds of formula

(65) [naphthyl-CH=CH-phenyl-C(benzoxazole)-(A_3)_s], $X_5$ in which $A_3$ represents hydrogen, an alkyl group having 1 to 18 carbon atoms, an aryl residue, especially a phenyl residue, an aralkyl residue especially a phenyl-$C_{1-4}$-alkyl residue or a halogen atom and s denotes an integer from 1 to 3, preferably 1, and $X_5$ represents hydrogen, alkyl or halogen.

d. Compounds of formula

(66) [triazine ring with $A_4$]$-N-$[phenyl]$-CH=CH-A_5$, $(X_5)_r$ in which $A_4$ represents the remainder of the benzene or naphthalene ring, $A_5$ denotes a diphenylyl or naphthyl residue, $X_5$ represents hydrogen, alkyl or halogen and r represents 1 or 2.

e. Compounds of formula

(67) [triazine with $A_7-C$, $C-A_6$, $C-A_7$]

in which $A_6$ denotes a residue of the series (67a) [phenyl-CH=CH-phenyl], $R_5$ (67b) [phenyl-CH=CH-phenyl-phenyl], $X_5$ (67c) [phenyl-CH=CH-naphthyl], $X_5$ $A_7$ denotes a phenyl, diphenylyl or naphthyl residue or a residue $A_6$, and these quoted aromatic residues may additionally contain 1 to 2 substituents $X_5$ having the significance of hydrogen, alkyl or halogen, preferably in the phenylene nuclei described under $A_6$.

The categories of compounds emphasized above as regards their brightener effect possess a more or less pronounced fluorescence in the dissolved or finely divided state. They are suitable for optical brightening of the most diverse organic materials of natural or synthetic origin, or of materials containing such organic substances for which optical brightening is relevant. As such materials there may for example be quoted the following group of organic materials, without the recital which follows in any way being inteded to express any limitation in this respect:

I. Synthetic organic hight molecular materials such as (A) polymerization products based on organic compounds containing at least one polymerizable carbon-carbon double bond (homopolymers or copolymers as well as their post-treatment products such as cross-linking products, graft products or degradation products, polymer dilutions and the like), as examples of which there may be quoted: polymers based on α, β-unsaturated carboxylic acids (for example acrylic compounds), olefine hydrocarbons, vinyl and vinylidene compounds, halogenated hydrocarbons, unsaturated aldehydes and ketones, allyl compounds and the like; furthermore polymerization products such as are obtainable by ring opening (for example polyamides of the polycaprolactam type), furthermore formaldehyde polymers, or polymers which are obtainable both by polyaddition and by polycondensation such as polythioethers, polyacetals and thioplastics. (B) Polycondensation products or precondensates based on bifunctional or polyfunctional compounds with groups capable of condensation, their homocondensation and cocondensation products as well as post-treatment products (for example saturated and unsaturated, unbranched or branched, polyesters), polyamides, maleate resins, their pre-condensates and products of analogous structure, polycarbonates, silicone resins and others; (C)polyaddition products such as polyurethanes (cross-linked and uncross-linked) or epoxide resins. II. Semi-synthetic organic materials such as for example cellulose esters, nitrocellulose, cellulose ethers, regenerated cellulose or their post-treatment products, and casein plastics.

III. Natural organic materials with animal or vegetable origin, for example based on cellulose or on proteins such as wool, cotton, silk, leather, wood compositions in a finely divided form, natural resins, and furthermore rubber, guttapercha, balata as well as their post-treatment products and modification products.

The organic materials requiring consideration may be present in the most diverse processing states (raw materials, semi-finished goods or finished goods) and states of aggregation. They may thus be present in the form of the most diverse shaped articles, for example as sheets, profiles, injection mouldings, chips, granules, and foams; films, foils, lacquers, strips, coverings, impregnations and coatings or filaments, fibers, flocks, bristles and wires. The materials quoted may on the other hand also be present in an unshaped state in the most diverse homogeneous and inhomogeneous forms of distribution and states of aggregation, for example as powders, solutions, emulsions, dispersions, sols, gels, putties, pastes, waxes, adhesives and trowelling compositions and the like.

Fiber materials may for example be present as continuous filaments, staple fibers, flocks, hanks, yarns, threads, fiber fleeces, felts, waddings, flocked structures, woven textile fabrics or laminates, knitted fabrics as well as papers, cardboards or paper compositions and the like.

When used as brighteners, these compounds may be added to the materials quoted either before or during shaping. Thus for example they may be added to the moulding composition in the manufacture of films or other moulded articles, or they may be dissolved, dispersed or otherwise finely divided in the spinning composition before spinning. The optical brighteners may also be added to the starting substances, reaction mixtures or intermediate products for the manufacture of fully synthetic or semi-synthetic organic materials, that is to say also before or during the chemical reaction, for example in the case of a polycondensation, a polymerization or a polyaddition.

The new optical brighteners may of course also be employed in all cases where organic materials of the type indicated above are combined with inorganic materials in any form. They are distinguished by exceptionally good heat stability, light fastness and resistance to migration.

The amount of the new optical brighteners to be used, relative to the material to be optically brightened, may vary within wide limits. A clear and durable effect can already be achieved with very small amounts, in some cases for example with amounts of 0.001 per cent by weight. However amounts of up to about 0.5 per cent by weight and more may also be used. For most practical purposes amounts of between 0.01 and 0.2 per cent by weight are preferably of interest.

The compounds serving as brighteners may for example also be employed as follows: (a) mixed with dyestuffs or pigments or as an additive to dye baths, printing, etching or reserve pastes. Further also for the post-treatment of dyeings, prints or discharge prints; (b) mixed with so-called "carriers", antioxidants, light protection agents, heat stabilizers, chemical bleaching agents or as an additive to bleaching baths; (c) mixed with cross-linking agents, finishing materials such as starch or synthetically produced finishes; (d) in combination with detergents, where the detergent and the brightener may be separately added to the wash baths to be used, or preferably detergents are used which contain the brightener mixed into them; (e) in combination with polymeric carriers (polymerization, polycondensation or polyaddition products), in which the brighteners are optionally introduced alongside other substances in a dissolved or dispersed form, (f) as additives to the most diverse industrial products in order to make these more marketable or to avoid disadvantages in their usability, for example as an additive to glues, adhesives, paints and the like.

The compounds which have been emphasized as optical brighteners may also be used as scintillators for various photographic purposes, such as for electrophotographic reproduction or for super-sensitization.

In the tables which follow later on, symbols have the following significance:

Column I = formula number

Column II = structural elements

Column III = crude yield in %

Column IV = recrystallization medium, with these being designated by the numbers listed below: 1 = water, 2 = ethanol, 3 = dioxane, 4 = dimethylformamide, 5 = tetrachlorethylene, 6 = chlorobenzene, 7 = o-dichlorobenzene, 8 = trichlorobenzene, 9 = toluene, 10 = n-hexane, 11 = xylene.

Column V = color of the purified reaction of product, with the latter having been designated by the numbers listed below: 1 = colorless, 2 = almost colorless, 3 = pale green 4 = light green, 5 = pale yellow, 6 = light yellow, 7 = yellow, 8 = pale greenish yellow, 9 = light greenish yellow, 10 = greenish yellow.

Column VI = melting point (uncorrected) in °C.

Column VII = elementary formula and analytical data (upper line calculated, lower line found).

EXAMPLE 1

8.63 g of the compound of formula (101)

and 7.05 g of 4'-methoxybenzal-aniline (C₆H₅—N=HC—C₆H₄—OCH₃) are stirred into 200 ml of anhydrous dimethylformamide with exclusion of air, and are all at once treated with 11.2 g of potassium tertiary-butylate. The color of the reaction mixture changes immediately from pale yellow to dark blue and the temperature rises in the course of 10 minutes by about 12°C. The mixture is stirred for a further 15 minutes without external warming, during which the temperature drops by about 3°C. Thereafter 400 ml of water are added dropwise at 5° to 15°C and the reaction product is filtered off and washed with water until neutral.

The moist filter residue is now dissolved in 270 ml of dimethylformamide with warming, treated with 25 ml of 10 percent hydrochloric acid and after a few minutes with 300 ml of water and cooled to about 10°C. After filtration, washing with water and methanol and subsequent drying about 11.7 g, corresponding to 93 percent of theory, of the compound of formula (102)

are obtained in the form of a pale yellow powder of melting point 206 to 207.5°C. Recrystallizing this three times from tetrachlorethylene with the aid of Fuller's earth yields pale yellow glistening platelets of melting point 214° to 214.5°C.

Analysis: $C_{25}H_{19}ON_3$ (377.43). Calculated: C 79.55, H 5.07, N 11.13; found: C 79.80, H 5.11, N 11.24.

If instead of the 7.05 g of 4-methoxybenzalaniline 6.05 g of benzalaniline are used, then 10.4 g, corresponding to 90 percent of theory, of the compound of formula (103)

are obtained in the form of a beige-yellow light-colored powder which melts at 171° to 171.5°C. After three recrystallizations from tetrachlorethylene with the aid of Fuller's earth pale greenish yellow glistening platelets of melting point 173.5° to 174°C are obtained.
Analysis: $C_{24}H_{17}N_3$ (347.40). Calculated: C 82.97, H 4.93, N 12.10; found: C 82.96, H 5.04, N 12.23.

EXAMPLE 2

7.1 g of 1-[6'-phenyl-benzoxazolyl-(2')]-4-methylbenzene of formula (104)

and 4.53 g of benzalaniline are stirred into 150 ml of anhydrous dimethylformamide with exclusion of air and treated all at once with 7.45 g of potassium tertiary-butylate. The color of the reaction solution changes immediately from yellow to reddish brown and the temperature rises over the course of 4 minutes, for example from 20°C to 31°C. The mixture is stirred for a further 10 minutes without external warming, during which the temperature falls by about 5°C. Thereafter 350 ml of water are added dropwise at 5° to 15°C and the precipitated reaction product is filtered off and washed with water until neutral.

The moist filter residue is now dissolved in 250 ml of dimethylformamide with warming, treated with 25 ml of 10 percent hydrochloric acid and after a few minutes with 350 ml of water and cooled to about 10°C. After filtering, washing with water and methanol and subsequent drying about 5.38 g, corresponding to 57.7 percent of theory, of 4-[6'-phenyl-benzoxazolyl-(2')]-stilbene of formula (105)

are obtained in the form of a pale yellowish beige powder of melting point 222° to 223°C. Three recrystallizations from tetrachlorethylene with the aid of Fullers earth yield pale greenish yellow glistening platelets which melt at 226° to 226.5°C.
Analysis: $C_{27}H_{19}ON$ (373.43). Calculated: C 86.84, H 5.13, N 3.75; found: C 86.71, H 5.03, N 3.75.

If instead of the 4.53 g of benzalaniline 5.3 g of 4'-methoxybenzalaniline are used then 6.2 g, corresponding to 61.6 percent of theory, of the compound of formula (106)

are obtained in the form of a light yellow powder which melts at 245° to 247°C. After three recrystallizations from tetrachlorethylene with the aid of Fuller's earth light greenish yellow glistening platelets of melting point 250° to 251°C are obtained.
Analysis: $C_{28}H_{21}O_2N$ (403.46). Calculated: C 83.35, M 5.25, N 3.47; found: C 83.11, H 5.44, N 3.46.

In a similar manner, 10.01 g of the compound of formula (107)

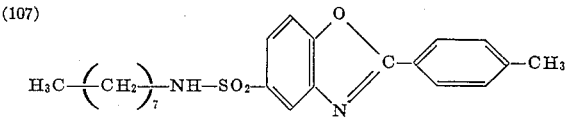

and 4.53 g of benzalaniline may be used to produce 8.1 g, corresponding to 66.2 percent of theory, of the compound of formula (108)

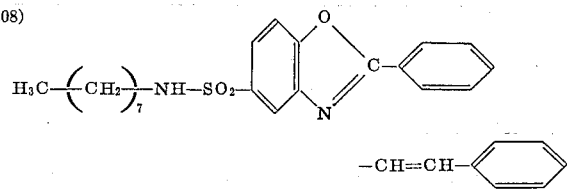

After three recrystallizations from ethanol with the aid of activated charcoal colorless glistening platelets of melting point 194° to 194.5°C are obtained.
Analysis: $C_{29}H_{32}O_3N_2S$ (488.65). Calculated: C 71.28, H 6.60, N 5.73; found: C 71.01, H 6.65, N 5.73.

EXAMPLE 3

7.13 g of 2-diphenylyl-(4')-6-methylbenzoxazole of formula (109)

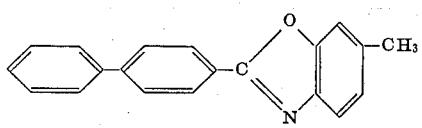

and 4.53 g of benzalaniline are stirred into 200 ml of anhydrous dimethylformamide with exclusion of air and treated all at once with 7.45 g of potassium tertiary butylate. The color of the reaction solution changes immediately from pale yellow to dark brown and the temperature rises by 5° to 10°C over the course of 4 minutes. The mixture is stirred for a further 35 minutes without external warming, during which the temperature falls by a few °C. Thereafter 350 ml of water are added dropwise at 5° to 15°C and the precipitated reaction product is filtered off and washed with water until neutral.

The moist filter residue is now dissolved in 200 ml of dimethylformamide with warming, treated with 25 ml of 10 percent hydrochloric acid and after one hour with 200 ml of water, and cooled to about 10°C. After filtering, washing with water and methanol and subsequent drying about 6.3 g, corresponding to 67.5 percent of theory, of the compound of formula (110)

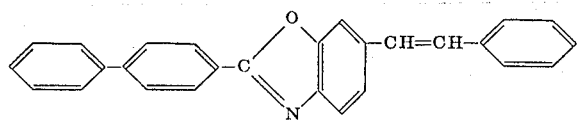

are obtained in the form of a brownish yellow powder. Three recrystallizations from tetrachlorethylene with the aid of Fuller's earth yield pale green glistening platelets of melting point 203° to 203.5°C.
Analysis: $C_{27}H_{19}ON$ (373.43). Calculated: C 86.84, H 5.13, N 3.75; found: C 86.72, H 5.01, N 3.67.

The benzoxazole derivatives of formula (111)

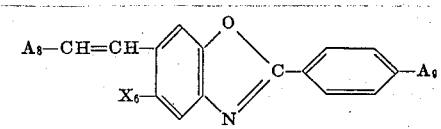

listed in the Table which follows may be prepared in a similar manner, with the duration of the reaction being extended to 60 minutes.

| I | II A_8 | II X_6 | II A_9 | III | IV | V | VI | VII |
|---|---|---|---|---|---|---|---|---|
| 112 |  | H | H | 77.6 | 2 | 1 | 146–146.5 | $C_{21}H_{15}ON$ C 84.82  H 5.09  N 4.71 / C 84.87  H 5.24  N 4.55 |
| 113 | 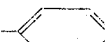 | H | -C(CH_3)_3 | 77.3 | 2 | 1 | 141–141.5 | $C_{25}H_{23}ON$ C 84.95  H 6.56  N 3.96 / C 84.76  H 6.68  N 4.00 |
| 114 | 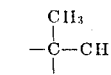—OCH_3 | H | 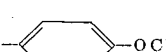 | 60.5 | 2/3 | 9 | 232–232.5 | $C_{28}H_{21}O_2N$ C 83.35  H 5.25  N 3.47 / C 83.23  H 5.12  N 3.45 |
| 115 | 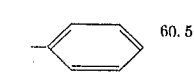—OCH_3 | H | —Cl | 51.4 | 5 | 5 | 199–199.5 | $C_{22}H_{16}O_2NCl$ C 73.03  H 4.46  N 3.87 / C 73.16  H 4.51  N 3.90 |
| 116 | 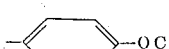 | H | —H | 97 | 5 | 3 | 215–216 | $C_{27}H_{19}ON$ C 86.84  H 5.13  N 3.75 / C 86.85  H 5.22  N 3.75 |
| 117 | 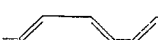 | H | -C(CH_3)_3 | 92.1 | 5 | 2 | 199.5–200 | $C_{31}H_{27}ON$ C 86.68  H 6.34  N 3.26 / C 86.72  H 6.36  N 3.21 |
| 118 | 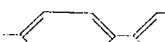 | H | 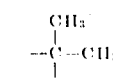 | 87.5 | 6 | 9 | 289–289.5 | $C_{33}H_{23}ON$ C 88.17  H 5.16  N 3.12 / C 87.98  H 5.19  N 3.15 |
| 119 |  | H | -C(CH_3)_3 | 100 | 3/2 | 1 | 185.5–186 | $C_{29}H_{25}ON$ C 86.32  H 6.25  N 3.47 / C 86.27  H 6.22  N 3.53 |

| I | II A8 | II X6 | II A9 | III | IV | V | VI | VII |
|---|---|---|---|---|---|---|---|---|
| 120 | (naphthyl) | H | (phenyl) | 76.7 | 5 | 9 | 248–249 | C₃₁H₂₁ON C 87.91 H 5.00 N 3.31 / C 87.85 H 4.86 N 3.45 |
| 121 | (phenyl) | —CH₃ | (phenyl) | 74.4 | 3/2 | 3 | 179.5–180.5 | C₂₈H₂₁ON C 86.79 H 5.46 N 3.62 / C 86.59 H 5.53 N 3.63 |
| 122 | (biphenyl) | —CH₃ | (phenyl) | 100 | 4 | 9 | 259–259.5 | C₃₄H₂₅ON C 88.09 H 5.44 N 3.02 / C 87.79 H 5.48 N 3.06 |
| 123 | (naphthyl) | —CH₃ | (phenyl) | 78.6 | 3/2 | 9 | 228–228.5 | C₃₂H₂₃ON C 87.84 H 5.30 N 3.20 / C 87.56 H 5.44 N 3.30 |
| 124 | (naphthyl) | —CH₃ | (phenyl) | 85.0 | 3/2 | 10 | 202.5–203 | C₃₂H₂₃ON C 87.84 H 5.30 N 3.20 / C 87.59 H 5.41 N 3.35 |
| 125 | (chlorophenyl) | —CH₃ | (phenyl) | 66.4 | 2 | 5 | 200–201 | C₂₈H₂₀ON Cl C 79.71 H 4.78 N 3.32 / C 79.95 H 4.61 N 3.40 |
| 126 | (methoxyphenyl) | —CH₃ | (phenyl) | 52.6 | 10/11 | 5 | 191.5–192 | C₂₉H₂₃O₂N C 83.43 H 5.55 N 3.36 / C 83.35 H 5.81 N 3.29 |

EXAMPLE 4

5.93 g of 1-[5',6'-dimethyl-benzoxazolyl-(2')]-4-methylbenzene of formula (127)

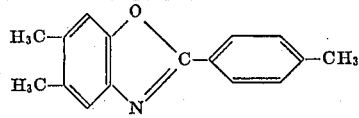

[melting point: 207° to 207.5°C] and 9.06 g of benzalaniline are stirred into 250 ml of anhydrous dimethylformamide with exclusion of air and treated all at once with 16.8 g of potassium tertiary butylate. The light beige reaction mixture immediately assumes a violet brown color and the temperature rises by 6°C. The mixture is stirred for a further 90 minutes without external warming and thereafter firstly 300 ml of water and then 100 ml of 10 percent strength aqueous hydrochloric acid are added dropwise. The precipitated reaction product is filtered off, washed with water and methanol and dried. About 4.5 g, corresponding to 43.5 percent of theory, of the compound of formula (128)

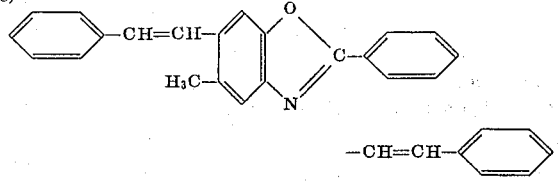

are obtained in the form of a brown powder. After chromatography in tetrachlorethylene on activated aluminum oxide and recrystallization from dioxane/ethanol light greenish yellow fine needles of melting point 222° to 223°C are obtained.

Analysis: $C_{30}H_{23}ON$ (413.49). Calculated: C 87.14, H 5.61, N 3.39; found: C 87.12, H 5.62, N 3.49.

The following benzoxazole derivatives may be prepared in a similar manner:

(129)

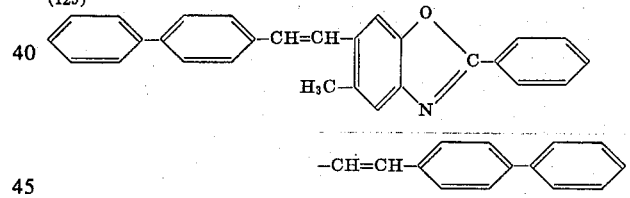

Yield: about 12.8 g, corresponding to 90.5 percent of theory. Greenish yellow fine needles from o-dichlorobenzene. Melting point: 296.5° to 298.5°C.

Analysis: $C_{42}H_{31}ON$ (565.68). Calculated: C 89.17, H 5.52, N 2.48; found: C 88.96, H 5.70, N 2.64.

(130)

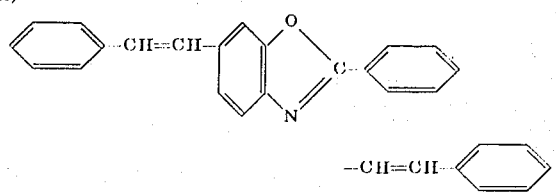

Yield: 22 percent of theory. Light greenish yellow fine glistening needles from tetrachlorethylene. Melting point 260° to 260.5°C Analysis: $C_{29}H_{21}ON$ (399.47). Calculated: C 87.19, H 5.30, N 3.51; found: C 87.04, H 5.32, N 3.71.

EXAMPLE 5

14.8 g of the compound of formula (131)
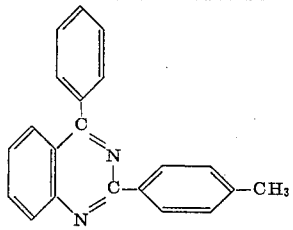

and 9.6 g of benzalaniline are stirred into 200 ml of anhydrous dimethylformamide with exclusion of air and treated all at once with 16.8 g of potassium tertiary butylate. The color of the reaction mixture changes immediately from pale yellow to dark green and the temperature rises by about 7°C in the course of 15 minutes. The mixture is stirred for a further 1¾ hours without external warming, during which the temperature falls by about 5°C. Thereafter 300 ml of water are added dropwise at 10° to 20°C and the reaction product is filtered and washed with water until neutral.

The moist filter residue is now dissolved in 300 ml of dimethylformamide with warming, treated with 25 ml of 10 percent strength hydrochloric acid and after 50 minutes with 300 ml of water and cooled to about 10°C. After filtering, washing with water and methanol and subsequent drying about 18.1 g, corresponding to 94.1 percent of theory, of the compound of formula (132)
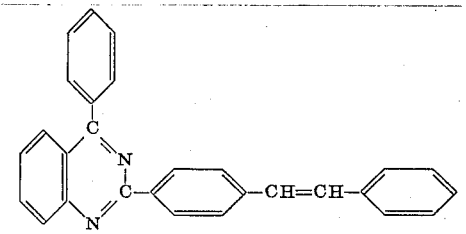

are obtained in the form of a light yellow powder of melting point 160° to 161°C. After three recrystallizations from dimethylformamide-water [10 : 1] with the aid of activated charcoal light yellow fine needles of melting point 162.5° to 163°C are obtained.
Analysis: $C_{28}H_{20}N_2$ (384.46). Calculated C 87.47, H 5.24, N 7.29; found: C 87.24, H 5.28, N 7.48.

If instead of the 9.6 g of benzalaniline 10.6 g of 4'-methoxybenzalaniline are used then 18.9 g, corresponding to 94.2 percent of theory, of the compound of formula (133)
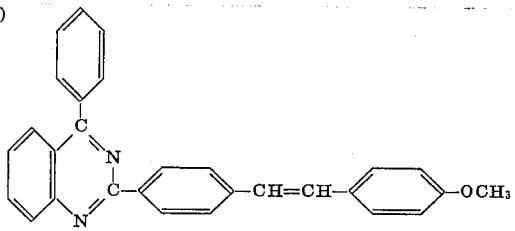

are obtained in the form of yellow fine needles which melt at 163.5° to 165°C. On recrystallizing three times from tetrachlorethylene with the aid of Fuller's earth, luminous yellow felted small needles of melting point 167.5° to 168.5°C are obtained.
Analysis: $C_{29}H_{22}ON_2$ (414.48). Calculated: C 84.03, H 5.35, N 6.76; found: C 84.14, H 5.42, N 6.89.

Using 10.8 g of 4'-chlorobenzalaniline about 19.8 g, corresponding to 94.5 percent of theory, of the compound of formula (134)
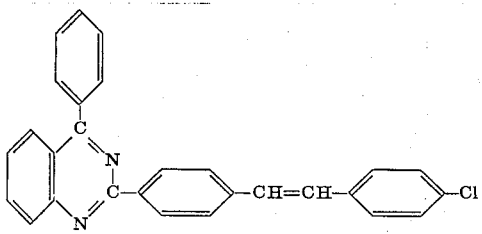

are obtained. Yield: 94.5 percent of theory. Pale yellow very fine crystals from dimethylformamide/ethanol. Melting point 185° to 186°C.
Analysis: $C_{28}H_{19}N_2Cl$ (418.93). Calculated: C 80.28, H 4.57, N 6.69; found: C 80.06, H 4.57, N 6.66.

EXAMPLE 6

6.65 g of the compound of formula (135)
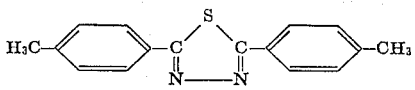

and 10.55 g of 4'-methoxybenzalaniline are stirred into 200 ml of anhydrous dimethylformamide with exclusion of air and treated all at once with 11.2 g of potassium tertiary-butylate. The color of the reaction mixture changes immediately from pale yellow to blue-green and the temperature rises by only about 12°C over the course of 4 minutes. The mixture is stirred for a further 2½ hours without external warming, during which the temperature again drops. Thereafter 400 ml of water are added dropwise at 10° to 20°C and the reaction product is filtered off and washed with water until neutral.

The moist filter residue is now dissolved in 3 l of dimethylformamide with warming, treated with 25 ml of 10 percent strength hydrochloric acid and after 1 hour with 3 l of water and cooled to about 10°C. After filtering, washing with water and methanol and subsequent drying about 10.5 g, corresponding to 83.5 percent of theory, of 2,5-bis-[4''-methoxystilbenyl-(4')]-1,3,4-thiadiazole of formula (136)
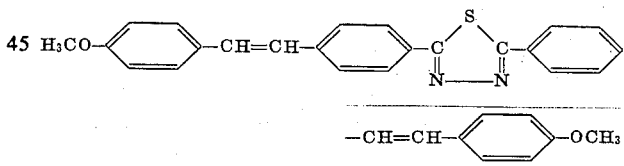

are obtained in the form of a yellow powder of melting point 294° to 297°C. Two recrystallizations from o-dichlorobenzene with the aid of Fuller's earth yield light yellow glistening platelets of melting point 300° to 300.5°C.
Analysis: $C_{32}H_{26}O_2N_2S$ (502.64). Calculated: C 76.46, H 5.21, N 5.57; found: C 76.75, H 5.36, N 5.50.

If instead of the 6.65 g of 2,5-bis-[4'-methyl-phenyl-(1')]-1,3,4-thiadiazole of formula (135) an equimolecular amount of 2,5-bis-[4'-methyl-phenyl-(1')]-1,3,4-oxdiazole of formula (137)
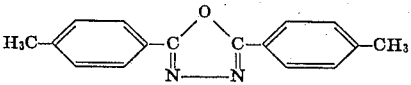

are used then about 10.8 g, corresponding to 89 percent of theory, of 2,5-bis-[4''-methoxy-stilbenyl-(4')]-1,3,4-oxdiazole of formula (138)

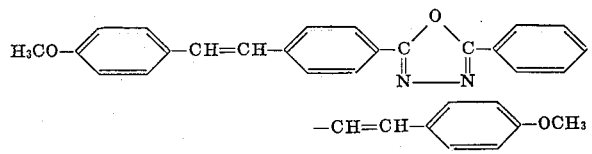

are obtained in the form of a light yellow powder which after three recrystallizations from o-dichlorobenzene with the aid of Fuller's earth yields pale yellow glistening platelets of melting point 311° to 311,5°C.
Analysis: $C_{32}H_{26}O_3N_2$ (486.54). Calculated: C 78.99, H 5.39, N 5.76; found: C 78.90, H 5.67, N 5.78.

In a similar manner, 3-[4'-methyl-phenyl-(1')]-5-phenyl-1,2,4-oxdiazole of formula (139)

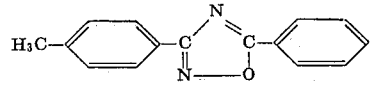

and 3,5-di-[4'-methyl-phenyl-(1')]-1,2,4-oxdiazole of formula (140)

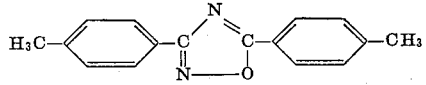

may be used to produce the 1,2,4-oxdiazole derivatives of formula (141)

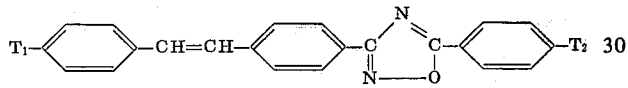

which are listed in the following Table.

| I | II T₁ | T₂ | III | IV | V | VI | VII | | |
|---|---|---|---|---|---|---|---|---|---|
| 142 | H | H | 70.2 | 1 | 2 | 159–159.5 | $C_{22}H_{16}ON_2$ | | |
| | | | | | | | C 81.46 | H 4.97 | N 8.64 |
| | | | | | | | C 81.51 | H 4.91 | N 8.78 |
| 143 | ⌬ | H | 75.0 | 5 | 1 | 228–228.5 | $C_{28}H_{20}ON_2$ | | |
| | | | | | | | C 83.97 | H 5.03 | N 7.00 |
| | | | | | | | C 84.20 | H 5.15 | N 6.77 |
| 144 | H | —CH=CH—⌬ | 64.5 | 5 | 8 | 246.5–247 | $C_{30}H_{22}ON_2$ | | |
| | | | | | | | C 84.48 | H 5.20 | N 6.57 |
| | | | | | | | C 84.61 | H 5.25 | N 6.53 |
| 145 | ⌬ | —CH=CH—⌬ | 91.7 | 7 | 9 | 329–330 | $C_{42}H_{30}ON_2$ | | |
| | | | | | | | C 87.17 | H 5.23 | N 4.84 |
| | | | | | | | C 87.14 | H 5.28 | N 4.79 |

EXAMPLE 7

10.8 g of 2,4-diphenyl-6-[4'-methylphenyl (1')]-1,3,5-triazine of formula (146)

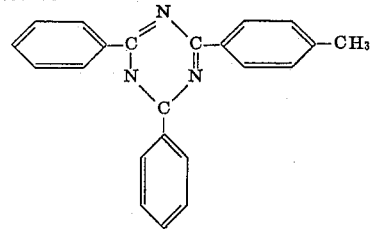

and 7.05 g of 4'-methoxybenzalaniline are stirred into 200 ml of anhydrous dimethylformamide with exclusion of air and treated all at once with 11.2 g of potassium tertiary-butylate. The color of the reaction mixture changes immediately from light beige to bluish violet and the temperature rises by a few °C over the course of 2 minutes. The mixture is stirred for a further 1 hour without external warming during which the temperature again drops somewhat. Thereafter 400 ml of water are added dropwise at 10° to 15°C and the reaction mixture is filtered and washed with water until neutral.

The moist filter residue is now dissolved in 120 ml of dimethylformamide with warming, treated with 25 ml of 10 percent strength hydrochloric acid and after a few minutes with 120 ml of water and cooled to about 10°C. After filtering, washing with water and methanol and subsequent drying about 14.7 g, corresponding to 100 percent of theory, of 2,4-diphenyl-6-[4''-methoxy-stilbenyl-(4')]-1,3,5-triazine of formula (147)

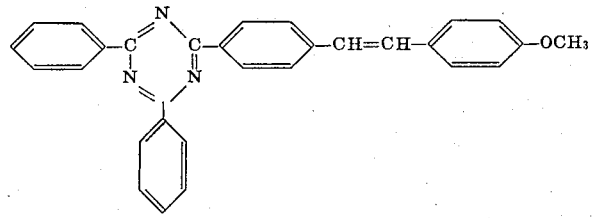

are obtained in the form of a yellow powder of melting point 243.5° to 246.5°C. After chromatography in tetrachlorethylene on activated aluminum oxide and recrystallization from dioxane-ethanol, pale greenish yellow felted small needles of melting point 235.5°C are obtained.
Analysis: $C_{30}H_{23}ON_3$ (441,51). Calculated: C 81.61, H 5.25, N 9.52; found: C 81.70, H 5.38, N 9.45.

EXAMPLE 8

11.7 g of 2,4,6-tri-[4'-methylphenyl-(1')]-1,3,5-triazine of formula (148)

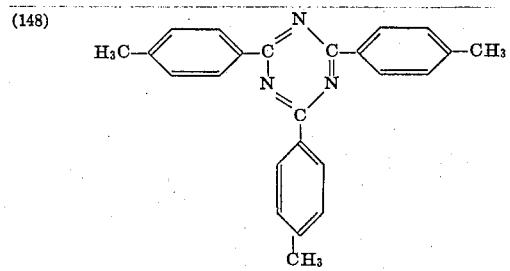

and 18.1 g of benzalaniline are stirred into 350 ml of anhydrous dimethylformamide with exclusion of air and treated all at once with 28.0 g of potassium tertiary-butylate. The color of the reaction mixture changes immediately from pale yellow to violet and the temperature rises over the course of 5 minutes by about 10°C. The mixture is stirred for a further 1½ hours without external warming, during which the temperature again drops. Thereafter 350 ml of water are added dropwise at 10° to 20°C and the reaction product is filtered off and washed with water until neutral.

The moist filter residue is now dissolved in 500 ml of dimethylformamide with warming, treated with 50 ml of 10 percent strength hydrochloric acid and thereafter with 500 ml of water. The mixture is cooled to about 10°C, filtered off, and the residue first washed with water, then with methanol and dried. About 20.4 g, corresponding to 99.5 percent of theory, of 2,4,6-tri-[stilbenyl-(4')]-1,3,5-triazine of formula (149)

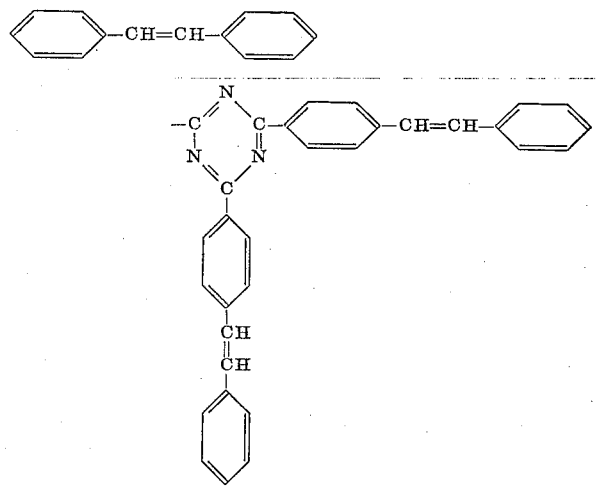

are obtained in the form of light yellow very fine small needles which melt at 251° to 254°C. After four recrystallizations from tetrachlorethylene with the aid of Fuller's earth light greenish yellow small needles of melting point 275° to 277°C are obtained.
Analysis: $C_{45}H_{33}N_3$ (615.78). Calculated: C 87.77, H 5.40 N 6.82; found: C 87.56, H 5.50, N 6.96.

If instead of 18.1 g of benzalaniline 21.1 g of 4'-methoxybenzalaniline are used, then about 22.7 g, corresponding to 96.6 percent of theory, of 2,4,6-tri-[4''-methoxy-stilbenzyl-(4')]-1,3,5-triazine of formula (150)

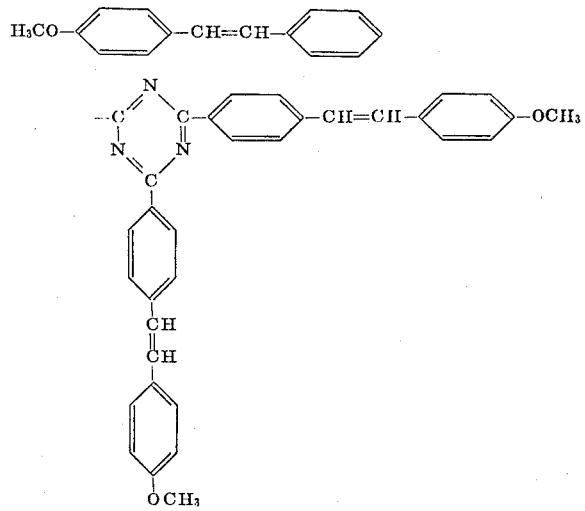

are obtained in the form of a yellow powder of melting point 263.5° to 265°C. After chromatography in o-dichlorobenzene on activated aluminum oxide and two recrystallizations from tetrachlorethylene yellow very fine small needles of melting point 300°C are obtained.
Analysis: $C_{48}H_{39}O_3N_3$ (705.82). Calculated: C 81.68, H 5.57, N 5.95; found: C 81.53, H 5.51, N 5.87.

EXAMPLE 9

11.7 g of 2,4,6-tri-[4'-methylphenyl-(1')]-1,3,5-triazine of formula (148), 18.1 g of benzalaniline and 12.6 g of potassium hydroxide powder containing about 10 percent water are stirred into 300 ml of dimethylformamide with exclusion of air, in the course of which a dark blue color is produced after a few minutes. The temperature is raised to 90°C over the course of 1 hour, and the mixture stirred for a further 40 minutes at this temperature and then cooled to about 10°C. Now 100 ml of water, 150 ml of 10 percent strength hydrochloric acid and a further 250 ml of water are successively added dropwise at 10° to 20°C. The precipitated reaction product is filtered off, washed with water until neutral and freed of a by-product by further washing with methanol. After drying about 19.7 g, corresponding to 96.2 percent of theory, of 2,4,6-tri-[stilbenyl-(4')]-1,3,5-triazine of formula (149) are obtained in the form of a yellow powder which melts at 262° to 267°C. After chromatography in tetrachlorethylene on activated aluminum oxide and subsequently three recrystallizations from tetrachlorethylene, light greenish yellow felted small needles of melting point 293° to 293.5°C are obtained.
Analysis: $C_{45}H_{33}N_3$ (615.78). Calculated: C 87.77, H 5.40, N 6.82; found: C 87.55, H 5.55, N 6.98.

If instead of the 18.1 g of benzalaniline 25.73 g of diphenyl-(4)-aldehyde-anil are used and the reaction is carried out for 30 minutes at 60°C, then the 2,4,6-tri-[4''-phenyl-stilbenyl-(4')]-1,3,5-triazine of formula (151)

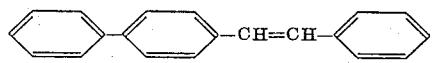

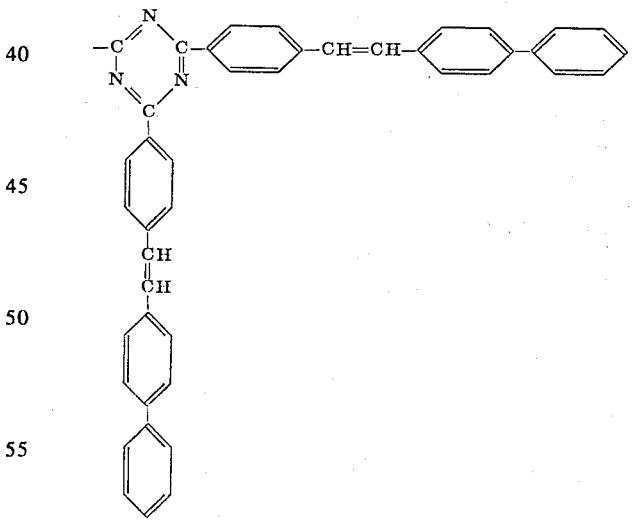

is obtained. Yield: 93.1 percent of theory. Greenish yellow crystals from o-dichlorobenzene. Melting point: 361° to 362°C.
Analysis: $C_{63}H_{45}N_3$ (844.67). Calculated: C 89.65, H 5.37, N 4.98; found: C 89.74, H 5.28, N 5.10.

The following stilbenyl-1,3,5-triazine derivatives may be prepared in a similar manner: From 2,4,6-tri-[4'-methyl-phenyl-(1')]-1,3,5-triazine of formula (148) and 4'-chloro-benzalaniline, the compound of formula (152)

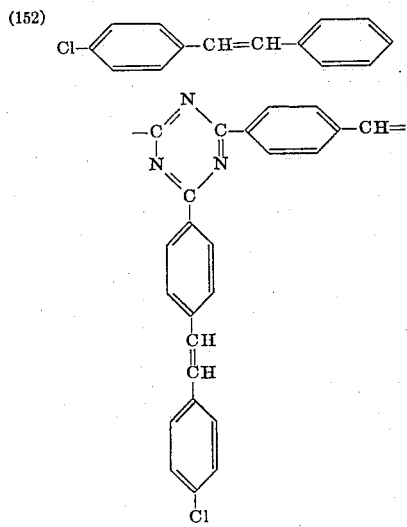

Yield: 94.0 percent of theory. Light yellow very fine small needles from tetrachlorethylene. Melting point: 315° to 317°C.
Analysis: $C_{45}H_{30}N_3Cl_3$ (719.12). Calculated: C 75.16, H 4.21, N 5.84; found: C 75.17, H 4.22, N 6.00. From 2,4-diphenyl-6-[4'-methylphenyl-(1')]-1,3,5-triazine of formula (146) and diphenyl-(4)-aldehyde-anil, the compound of formula (153)

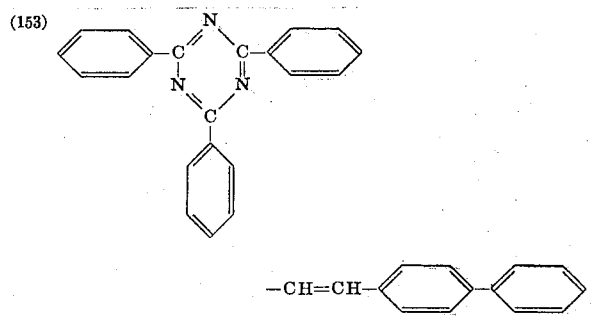

Yield: 98.5 percent of theory. Light yellow very fine needles from tetrachlorethylene. Melting point: 284° to 285°C.
Analysis: $C_{35}H_{25}N_3$ (487.57). Calculated: C 86.21, H 5.17, N 8.62; found: C 86.35, H 5.28, N 8.54.
From 2,4,6-tri-[2',4'-dimethyl-phenyl-(1')]-1,3,5-triazine of formula (154)

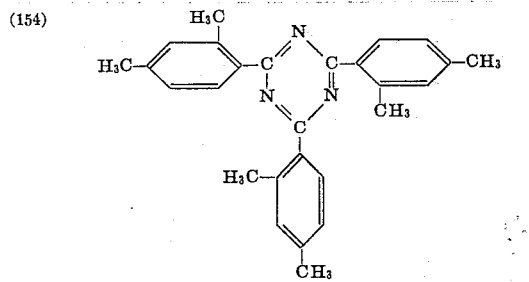

and diphenyl-(4)-aldehyde-anil, the compound of formula (155)

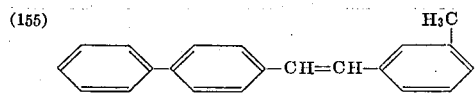

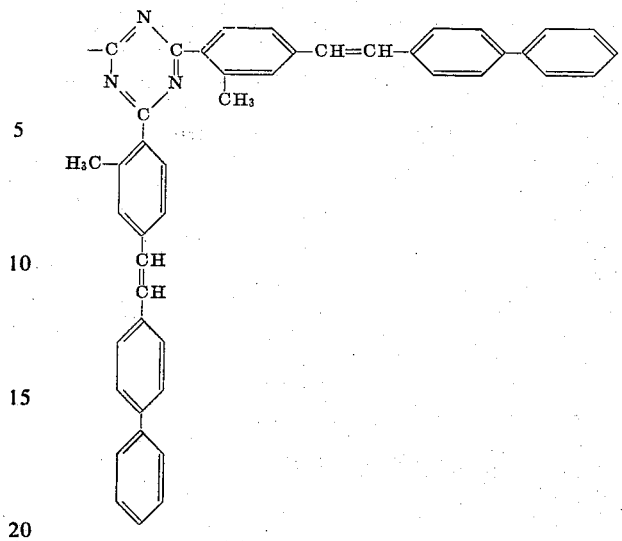

Yield: 100 percent of theory. Yellow very fine small needles from xylene. Melting point: 162° to 162.5°C.
Analysis: $C_{66}H_{51}N_3$ (886.16). Calculated: C 89.46, H 5.80, N 4.74; found: C 89.16, H 5.83, N 4.68.

EXAMPLE 10

16.87 g of 2,4-di-[4'-methylphenyl-(1')]-6-phenyl-1,3,5-triazine of formula (156)

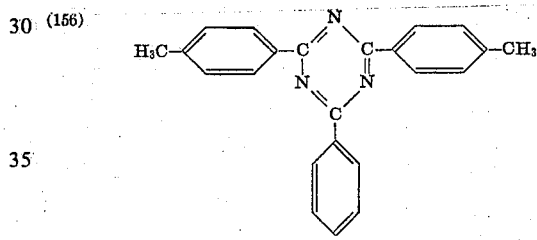

[Melting point: 218° to 218.5°C], 18.1 g of benzalaniline and 50 g of potassium hydroxide powder containing about 10 percent water are stirred into 400 ml of dimethylformamide with exclusion of air, during which a violet color is produced after a few minutes. The temperature is raised to 60°C over the course of 30 minutes, and the mixture stirred for a further 30 minutes at this temperature and then cooled to room temperature. Now 50 ml of water and 500 ml of 10 percent strength hydrochloric acid are successively added dropwise. The precipitated reaction product is filtered off, washed with water until neutral and freed of a by-product by further washing with 300 ml of methanol. After drying about 24.8 g, corresponding to 96.6 percent of theory, of 2,4-di-[stilbenyl-(4')]-6-phenyl-1,3,5-triazine of formula (157)

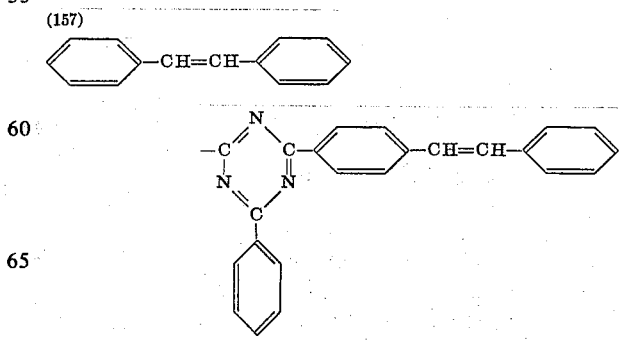

are obtained as a light yellow powder. After chromatography in tetrachlorethylene on activated aluminum oxide and recrystallization from tetrachlorethylene practically colorless crystals of melting point 241° to 241.5°C are obtained.
Analysis: $C_{37}H_{27}N_3$ (513.61). Calculated: C 86.52, H 5.30, N 8.18; found: C 86.46, H 5.03, N 7.99.

The 1,3,5-triazine derivatives of formula (158)

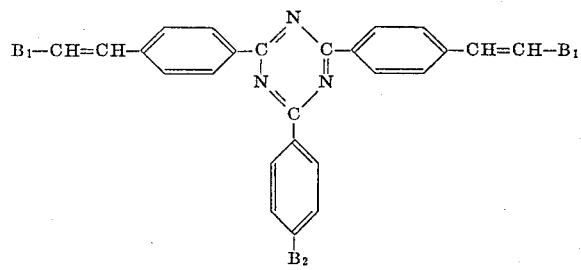

listed in the following Table may be produced in a similar manner.

(164)

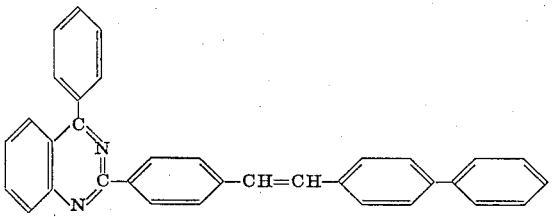

Yield: 94.3 percent of theory. Light yellow felted fine small needles from tetrachlorethylene. Melting point 226.5° to 227°C.
Analysis: $C_{34}H_{24}N_2$ (460.55). Calculated: C 88.66, H 5.25, N 6.08; found: C 88.46, H 4.96, N 6.04.

(165)

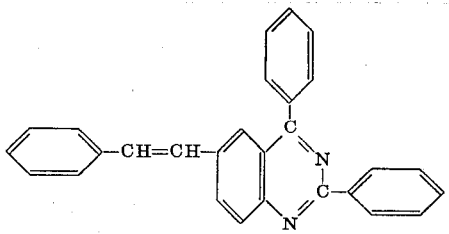

| I | B₁ | B₂ | III | IV | V | VI | VII | | |
|---|---|---|---|---|---|---|---|---|---|
| 159 | –⌬ | CH₃<br>–C–CH₃<br>CH₃ | 97.0 | 9/10 | 6 | 230.5-231 | $C_{41}H_{35}N_3$<br>C 86.43 H 6.19 N 7.38<br>C 86.33 H 6.08 N 7.56 | | |
| 160 | –⌬ | –⌬ | 94.3 | 5 | 8 | 240.5-241 | $C_{43}H_{31}N_3$<br>C 87.58 H 5.30 N 7.13<br>C 87.44 H 5.55 N 7.13 | | |
| 161 | –⌬–⌬ | H | 94.9 | 7 | 9 | 351-352.5 | $C_{49}H_{35}N_3$<br>C 88.39 H 5.30 N 6.31<br>C 88.33 H 5.43 N 6.28 | | |
| 162 | –⌬–⌬ | CH₃<br>–C–CH₃<br>CH₃ | 98.0 | 3/2 | 10 | 325-328 | $C_{53}H_{43}N_3$<br>C 88.18 H 6.00 N 5.82<br>C 88.37 H 6.28 N 5.80 | | |
| 163 | –⌬–⌬ | –⌬ | 91.7 | 7 | 2 | 359-360 | $C_{55}H_{39}N_3$<br>C 89.04 H 5.30 N 5.66<br>C 88.08 H 5.51 N 5.73 | | |

EXAMPLE 11

14.8 g of the compound of formula (131), 9.06 g of benzalaniline and 25 g of potassium hydroxide powder containing about 10 percent water are stirred into 300 ml of dimethylformamide with exclusion of air, during which a violet color gradually develops. The temperature is raised to 60°C over the course of 30 minutes, and the mixture stirred for a further 30 minutes at this temperature and then cooled to room temperature. Now 100 ml of water and 260 ml of 10 percent strength hydrochloric acid are successively added dropwise. The precipitated reaction product is washed with a great deal of water and thereafter with 600 ml of methanol and is dried. About 16.7 g, corresponding to 87.0 percent of theory, of the compound of formula (132) are obtained in the form of a yellow powder which melts at 159.5° to 160°C. After chromatography in tetrachlorethylene on activated aluminum oxide and recrystallization from dioxane-ethanol practically colorless felted fine small needles of melting point 164.5° to 165°C are obtained.
Analysis: $C_{28}H_{20}N_2$ (384.46). Calculated: C 87.47, H 5.24, N 7.29; found: C 87.20, H 5.10, N 7.32.

The following quinazoline derivatives may be prepared in a similar manner.

Yield: 93.5 percent of theory. Light yellow fine felted small needles from tetrachlorethylene. Melting point: 198° to 198.5°C
Analysis: $C_{28}H_{20}N_2$ (384.46). Calculated: C 87.47, H 5.24, N 7.29; found: C 87.67, H 5.35, N 7.12.

(166)

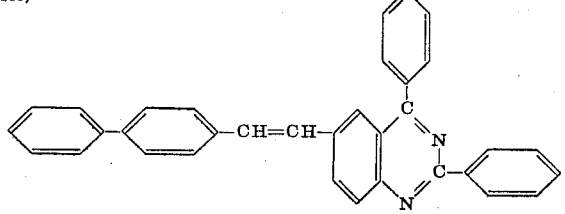

Yield: 97.0 percent of theory. Light greenish yellow glistening small needles from dioxane-ethanol. Melting point: 243° to 243.5°C.
Analysis: $C_{34}H_{24}N_2$ (460.55). Calculated: C 88.66, H 5.25, N 6.08; found: C 88.42, H 5.43, N 6.15.

(167)

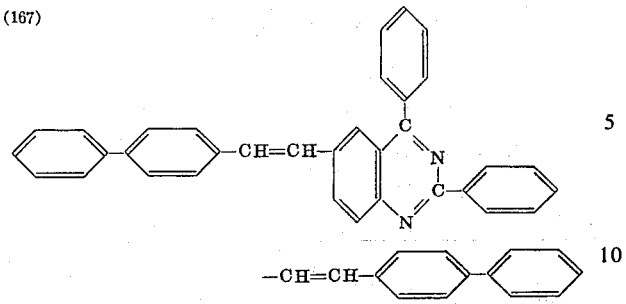

Yield: 96.5 percent of theory. Luminous greenish yellow fine small needles from o-dichlorobenzene. Melting point: 384° to 385°C.
Analysis: $C_{48}H_{34}N_2$ (638.77). Calculated: C 90.25, H 5.37, N 4.39; found: C 90.16, H 5.41, N 4.45.

(168)

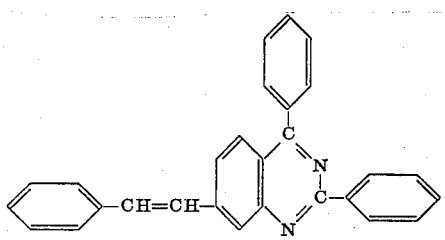

Yield: 87.5 percent of theory. Light yellow felted small needles from dioxane-ethanol. Melting point: 166° to 166.5°C.
Analysis: $C_{28}H_{20}N_2$ (384.46). Calculated: C 87.47, H 5.24, N 7.29; found: C 87.46, H 5.34, N 7.21.

(169)

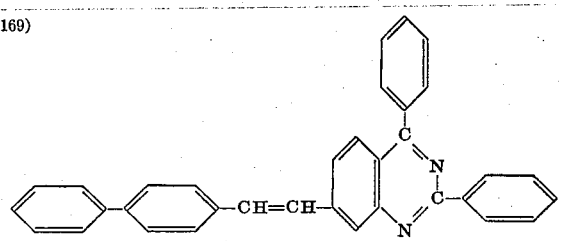

Yield: 92.5 % of theory. Pale yellow felted small needles from tetrachlorethylene. Melting point: 242° to 242.5°C.
Analysis $C_{34}H_{24}N_2$ (460.55). Calculated: C 88.66, H 5.25, N 6.08; found: C 88.71, H 5.32, N 5.84.

(170)

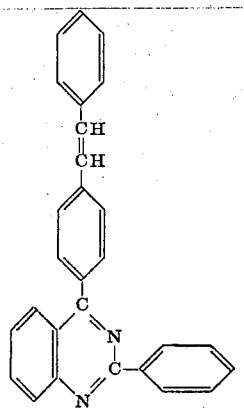

Yield: 92.0 percent of theory. Practically colorless very fine crystals from tetrachlorethylene. Melting point: 218° to 219°C.
Analysis: $C_{28}H_{20}N_2$ (384.46). Calculated: C 87.47, H 5.24, N 7.29; found: C 87.52, H 5.33, N 7.54

(171)

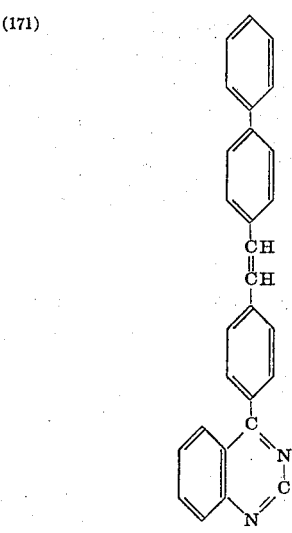

Yield: 97.7 percent of theory. Pale yellow glistening small crystals from o-dichlorobenzene. Melting point: 300° to 301°C
Analysis: $C_{34}H_{24}N_2$ (460.55). Calculated: C 88.66, H 5.25, N 6.08; found: C 88.73, H 5.31, N 5.93.

EXAMPLE 12

10.31 g of 3-[4'-methyl-phenyl-(1')]-5,6-diphenyl-1,2,4-triazine of formula (172)

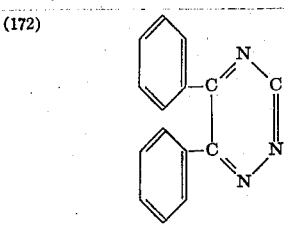

(melting point: 137.5° to 138°C), 6.04 g of benzalaniline and 16.7 g of potassium hydroxide powder containing about 10 percent of water are stirred into 200 ml of dimethylformamide with exclusion of air, during which a yellowish brown coloration gradually develops. The temperature is raised to 60°C over the course of 30 minutes, and the mixture stirred for a further 30 minutes at this temperature and then cooled to room temperature. Now 100 ml of water and 200 ml of 10 percent strength hydrochloric acid are successively added dropwise. The precipitated reaction product is washed with a great deal of water and with 500 ml of methanol and is dried. About 9.5 g, corresponding to 69.2 percent of theory, of 3-[stilbenyl-(4')]-5,6-diphenyl-1,2,4-triazine of formula (173)

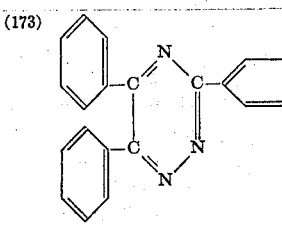

are obtained in the form of a light yellow powder. After three recrystallizations from dimethylformamide-ethanol-water with the aid of activated charcoal, light yellow very fine felted crystals of melting point 202.5° to 203.5°C are obtained.
Analysis: $C_{29}H_{21}N_3$ (411.48). Calculated: C 84.64, H 5.14, N 10.21; found: C 84.60, H 5.32, N 10.24.

The following 1,2,4-triazine derivative is obtained in a similar manner:

(174) 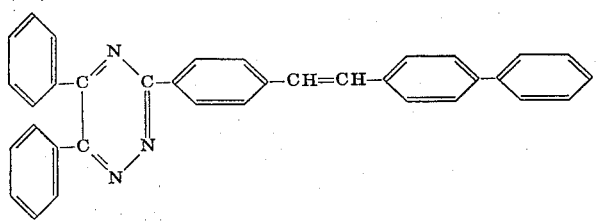

The naphthtriazole derivatives of formula (175) 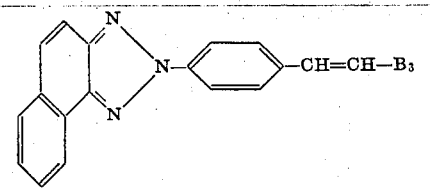

listed in the following Table may be prepared in a similar manner.

| I | II B₃ | III | IV | V | VI | VII | | |
|---|---|---|---|---|---|---|---|---|
| 102 | —⟨⟩—OCH₃ | 91.2 | 5 | 8 | 215–215.5 | C 79.55  C 79.34 | $C_{25}H_{19}ON_3$  H 5.07  H 5.07 | N 11.13  N 11.17 |
| 176 | —⟨⟩—Cl | 86.5 | 5 | 9 | 237.5–238 | C 75.49  C 75.29 | $C_{24}H_{16}N_3Cl$  H 4.22  H 4.04 | N 11.00  N 10.91 |
| 177 | —⟨⟩—⟨⟩ | 92.6 | 7 | 9 | 255–256 | C 85.08  C 84.98 | $C_{30}H_{21}N_3$  H 5.00  H 4.86 | N 9.92  N 10.07 |
| 178 | —⟨⟩⟨⟩ (naphthyl) | 94.6 | 5 | 10 | 215–215.5 | C 84.61  C 84.43 | $C_{28}H_{19}N_3$  H 4.82  H 4.86 | N 10.57  N 10.58 |
| 179 | —⟨⟩⟨⟩ (naphthyl) | 79.5 | 5 | 9 | 236.5–237 | C 84.61  C 84.85 | $C_{28}H_{19}N_3$  H 4.82  H 5.00 | N 10.57  N 10.64 |
| 180 | Cl-⟨⟩ | 63.0 | 5 | 8 | 182–182.5 | C 75.49  C 75.32 | $C_{24}H_{16}N_3Cl$  H 4.22  H 4.42 | N 11.00  N 11.09 |
| 181 | —⟨⟩—CH(CH₃)₂ | 84.4 | 2/4 | 5 | 173.5–174 | C 83.26  C 82.88 | $C_{27}H_{23}N_3$  H 5.95  H 5.99 | N 10.79  N 10.83 |
| 182 | —⟨⟩—O—C—CH₂ | 69.5 | 5 | 9 | 232–233 | C 76.71  C 76.89 | $C_{25}H_{17}O_2N_3$  H 4.38  H 4.47 | N 10.74  N 10.77 |

Yield: 85.5 percent of theory. Light yellow glistening small needles from dimethylformamide. Melting point: 264° to 265°C.
Analysis: $C_{35}H_{25}N_3$ (487.57). Calculated: C 86.21, H 5.17, N 8.62; found: C 86.04, H 5.05, N 8.40

EXAMPLE 13

12.96 g of the compound of formula (101), 9.1 g of benzalaniline and 25 g of potassium hydroxide powder containing about 10 percent of water are stirred into 300 ml of dimethylformamide with exclusion of air, during which a red coloration gradually develops. The temperature is raised to 60°C over the course of 30 minutes, and the mixture stirred for a further 30 minutes at this temperature and then cooled to room temperature. 100 ml of water and 240 ml of 10 percent hydrochloric acid are now successively added dropwise. The precipitated reaction product is washed with a great deal of water and thereafter with 80 ml of methanol, and is dried. About 15.7 g, corresponding to 90.5 percent of theory, of the naphthtriazole derivative of formula (103) are obtained in the form of a beige powder which melts at 173.5° to 174°C. Three recrystallizations from tetrachlorethylene with the aid of Fuller's earth yield pale greenish yellow glistening platelets of melting point 182° to 182.5°C.
Analysis: $C_{24}H_{17}N_3$ (347.40). Caclulated: C 82.97, H 4.93, N 12.10; found: C 83.07, H 4.94, N 12.09.

EXAMPLE 14

5.19 g of the benztriazole derivative of formula (183) 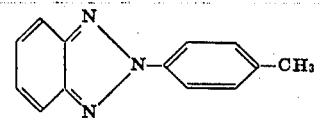

(melting point: 119.5° to 120°C), 4.53 g of benzalaniline and 12.5 g of potassium hydroxide powder containing about 10 percent of water are reacted in 150 ml of dimethylformamide according to the instructions of Example 13 and are worked up. About 3.7 g, corresponding to 49.8 percent of theory, of the benztriazole compound of formula (184) 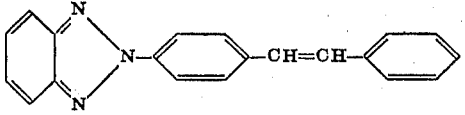

are obtained in the form of a light beige powder of melting point 194° to 194.5°C. Two recrystallizations from ethanol with the aid of activated charcoal yield colorless glistening platelets which melt at 196° to 196.5°C.
Analysis: $C_{20}H_{15}N_3$ (297.34). Calculated: C 80.71, H 5.09, N 14.13; found: C 80.74, H 4.82, N 14.21.

If instead of benzalaniline 6.43 g of diphenyl-(4)-aldehyde-anil are used, then the compound of formula (185)
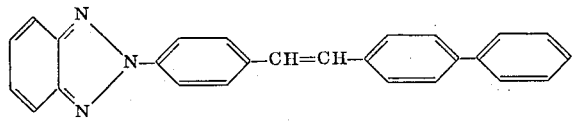

is obtained. Yield: 86.7 percent of theory. Pale greenish yellow glistening small needles from tetrachlorethylene. Melting point: 271° to 271.5°C.
Analysis: $C_{26}H_{19}N_3$ (373.44). Calculated: C 83.62, H 5.13, N 11.25; found: C 83.57, H 5.22, N 11.10.

EXAMPLE 15

10.41 g of 2-[4'-methyl-phenyl-(1')]-5-[biphenylyl-(4'')]a 1,3,4-oxdiazole of formula (186)
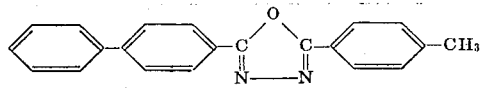

7.05 g of 4'-methoxybenzalaniline and 6.3 g of potassium hydroxide powder containing about 10 percent of water are stirred into 200 ml of dimethylformamide with exclusion of air, during which a bluish-tinged red coloration develops after a few minutes. The temperature is raised to 90°C over the course of 45 minutes and the mixture stirred for a further 30 minutes at 90° to 95°C and thereafter cooled to about 10°C. Now 100 ml of water, 100 ml of 10 percent strength hydrochloric acid and a further 250 ml of water are added successively dropwise at 10° to 15°C. The precipitated reaction product is filtered off, washed with water until neutral and freed of a by-product by further washing with methanol. After drying about 9.8 g, corresponding to 68.3 percent of theory, of 2-[4''-methoxy-stilbenyl-(4')]-5-[biphenylyl-(4''')]-1,3,4-oxdiazole of formula (187)
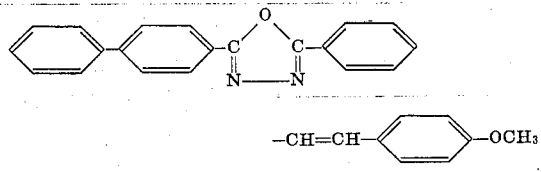

are obtained in the form of a light yellow powder which after three recrystallizations, first from o-dichlorobenzene and then from tetrachlorethylene, with the aid of Fullers earth yields pale yellow felted small needles of melting point 248° to 248.5°C.
Analysis: $C_{29}H_{22}O_2N_2$ (430.48). Calculated: C 80.90, H 5.15 N 6.51; found: C 81.09, H 5.19, N 6.52.

The 1,3,4-oxdiazole derivatives of formula (188)
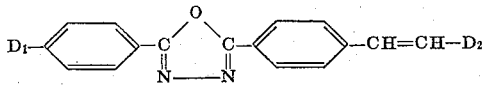

listed in the following Table may be prepared in a similar manner; in this, the reaction temperature was limited to 60°C but 8 mols of potassium hydroxide per methyl group to be reacted were used.

| I | II D₁ | II D₂ | III | IV | V | VI | VII |
|---|---|---|---|---|---|---|---|
| 189 | H | —⌬ | 50.6 | 2 | 2 | 168.5–169.5 | $C_{22}H_{16}ON_2$<br>C 81.46 H 4.97 N 8.64<br>C 81.29 H 5.25 N 8.89 |
| 190 | CH₃—C(CH₃)—CH₃ | —⌬ | 59.4 | 2 | 1 | 166–167 | $C_{26}H_{24}ON_2$<br>C 82.07 H 6.36 N 7.36<br>C 82.00 H 6.27 N 7.47 |
| 191 | —⌬ | —⌬ | 72.5 | 5 | 1 | 227–228 | $C_{28}H_{20}ON_2$<br>C 83.97 H 5.03 N 7.00<br>C 83.93 H 5.06 N 7.07 |
| 192 | —CH=CH—⌬ | —⌬ | 84.9 | 7 | 8 | 278–279 | $C_{30}H_{22}ON_2$<br>C 84.48 H 5.20 N 6.57<br>C 84.52 H 5.18 N 6.53 |
| 193 | —⌬—CH=CH—⌬ | —⌬ | 85.6 | 7 | 8 | 309–310 | $C_{36}H_{26}ON_2$<br>C 86.03 H 5.21 N 5.57<br>C 86.03 H 5.25 N 5.64 |
| 194 | H | —⌬—⌬ | 84.0 | 5 | 5 | 217–217.5 | $C_{28}H_{20}ON_2$<br>C 83.97 H 5.03 N 7.00<br>C 83.96 H 5.16 N 6.94 |
| 195 | CH₃—C(CH₃)—CH₃ | —⌬—⌬ | 88.4 | 5 | 8 | 235–235.5 | $C_{32}H_{28}ON_2$<br>C 84.18 H 6.18 N 6.14<br>C 83.98 H 6.25 N 6.13 |
| 196 | —⌬ | —⌬—⌬ | 88.5 | 7 | 8 | 286.5–287 | $C_{34}H_{24}ON_2$<br>C 85.69 H 5.08 N 5.88<br>C 85.99 H 4.83 N 5.83 |
| 197 | —CH=CH—⌬ | —⌬—⌬ | 90.9 | 7 | 8 | 305–306 | $C_{36}H_{26}ON_2$<br>C 86.03 H 5.31 N 5.57<br>C 85.74 H 5.18 N 5.63 |
| 198 | —CH=CH—⌬—⌬ | —⌬—⌬ | 93.6 | 8 | 8 | 371–372.5 | $C_{42}H_{30}ON_2$<br>C 87.17 H 5.23 N 4.84<br>C 86.91 H 5.30 N 4.81 |
| 199 | —⌬—CH=CH—⌬ | —⌬—⌬ | 86.5 | 7 | 8 | 375–376 | $C_{42}H_{30}ON_2$<br>C 87.17 H 5.23 N 4.84<br>C 87.21 H 5.47 N 4.78 |
| 200 | H | —⌬—Cl | 64.0 | 5 | 3 | 209.5–210 | $C_{22}H_{15}ON_2Cl$<br>C 73.64 H 4.21 N 7.81<br>C 73.54 H 4.23 N 7.78 |

| | II | | | | | | |
|---|---|---|---|---|---|---|---|
| I | D₁ | D₂ | III | IV | V | VI | VII |
| 201 | CH₃−C(CH₃)−CH₃ | −⟨⟩−Cl | 67.0 | 5 | 1 | 217.5–219 | C₂₆H₂₃ON₂Cl<br>C 75.26  H 5.59  N 6.75<br>C 75.20  H 5.67  N 6.88 |
| 202 | −⟨⟩− | −⟨⟩−Cl | 78.4 | 7 | 2 | 250–251 | C₂₈H₁₉ON₂Cl<br>C 77.33  H 4.40  N 6.44<br>C 77.10  H 4.63  N 6.50 |
| 203 | −CH=CH−⟨⟩− | −⟨⟩−Cl | 73.8 | 5 | 8 | 289–290 | C₃₀H₂₁ON₂Cl<br>C 78.17  H 4.59  N 6.08<br>C 78.04  H 4.46  N 5.99 |
| 204 | −CH=CH−⟨⟩−Cl | −⟨⟩−Cl | 88.2 | 7 | 8 | 310–311 | C₃₀H₂₀ON₂Cl₂<br>C 72.74  H 4.07  N 5.65<br>C 72.66  H 4.23  N 5.79 |
| 205 | H | −⟨⟩−OCH₃ | 58.1 | 5 | 9 | 176 | C₂₃H₁₈O₂N₂<br>C 77.95  H 5.12  N 7.91<br>C 77.74  H 5.15  N 7.91 |
| 206 | CH₃−C(CH₃)−CH₃ | −⟨⟩−OCH₃ | 65.7 | 5 | 9 | 190.5–191 | C₂₇H₂₆O₂N₂<br>C 79.00  H 6.38  N 6.83<br>C 79.18  H 6.24  N 6.81 |
| 138 | −CH=CH−⟨⟩−OCH₃ | −⟨⟩−OCH₃ | 83.0 | 7 | 5 | 310–311 | C₃₂H₂₆O₃N₂<br>C 78.99  H 5.39  N 5.76<br>C 79.12  H 5.63  N 5.87 |
| 207 | H | naphthyl | 85.4 | 5 | 9 | 188.5–189.5 | C₂₆H₁₈ON₂<br>C 83.40  H 4.85  N 7.48<br>C 83.40  H 4.97  N 7.55 |
| 208 | CH₃−C(CH₃)−CH₃ | naphthyl | 71.5 | 5 | 5 | 164.5–165.5 | C₃₀H₂₆ON₂<br>C 83.69  H 6.09  N 6.51<br>C 83.52  H 5.99  N 6.53 |
| 209 | H | naphthyl | 66.3 | 7 | 5 | 200.5–202 | C₂₆H₁₈ON₂<br>C 83.40  H 4.85  N 7.48<br>C 83.57  H 5.00  N 7.47 |
| 210 | CH₃−C(CH₃)−CH₃ | naphthyl | 69.9 | 5 | 5 | 219–219.5 | C₃₀H₂₆ON₂<br>C 83.69  H 6.09  N 6.51<br>C 83.99  H 6.05  N 6.63 |
| 211 | −⟨⟩− | naphthyl | 71.0 | 7 | 8 | 265–265.5 | C₃₂H₂₂ON₂<br>C 85.31  H 4.92  N 6.22<br>C 85.31  H 4.98  N 6.30 |
| 212 | −⟨⟩− | naphthyl | 79.0 | 2/4 | 9 | 218.5–219 | C₃₂H₂₂ON₂<br>C 85.31  H 4.92  N 6.22<br>C 85.29  H 5.13  N 6.17 |

EXAMPLE 16

12.52 g of 2,5-bis-[4'-methyl-phenyl-(1')]-1,3,4-oxdiazole of formula (137), 18,12 g of benzalaniline and 12.6 g of potassium hydroxide powder containing about 10 percent of water are stirred into 300 ml of dimethylformamide with exclusion of air, during which a red coloration develops after a few minutes. The temperature is raised to 90°C over the course of 25 minutes, and the mixture stirred for a further 40 minutes at 90° to 95°C and then cooled to about 10°C. Now 100 ml of water, 140 ml of 10 percent strength hydrochloric acid and a further 250 ml of water are successively added dropwise at 10° to 20°C. The precipitated reaction product is filtered, washed with water until neutral and freed of a by-product by further washing with methanol. After drying about 18.0 g, corresponding to 84.5 percent of theory, of 2,5-bis-[stilbenyl-(4')]-1,3,4-oxidazole of formula (192)

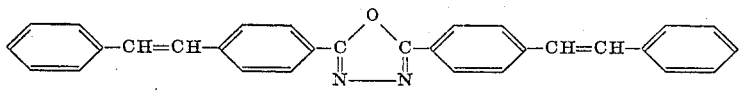

are obtained in the form of a light yellow powder which melts at 270° to 274°C. After three recrystallizations from o-dichlorobenzene with the aid of Fuller's earth pale greenish yellow glistening platelets of melting point 279° to 280°C are obtained.
Analysis: $C_{30}H_{22}ON_2$. (426.49). Calculated: C 84.48, H 5.20 N 6.57; found: C 84.25, H 5.28, N 6.51.

The 1,3,4-oxdiazole and 1,3,4-thiadiazole derivatives of formula (213)
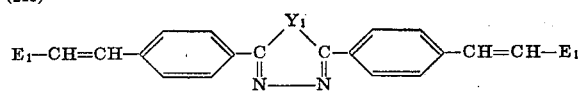

listed in the following Table may be prepared analogously, with the reaction temperature being specified in °C in column VIII.

develops. The reaction mixture is stirred for a further 30 minutes at 90° to 95°C, then cooled to about 10°C, and 100 ml of water, 150 ml of 10 percent strength hydrochloric acid and a further 300 ml of water are successively added dropwise at 10° to 20°C. The precipitated reaction product is filtered, washed with water until neutral and freed of a byproduct by means of methanol. After drying about 9.9 g, corresponding to 53.2 percent of theory, of 4-[6'-phenyl-benzoxazolyl-(2')]-stilbene of formula (105) are obtained in the form of a yellowish beige powder of melting point 222° to 225.5°C. After three recrystallizations from tetrachlorethylene with the aid of Fuller's earth pale greenish yellow glistening small needles and platelets are obtained which melt at 224° to 224.5°C.
Analysis: $C_{27}H_{19}ON$ (373.43). Calculated: C 86.84, H 5.13, N 3.75; found: C 86.63, H 5.09, N 3.67.

| I | $Y_1$ | $E_1$ | III | IV | V | VI | VII | VIII |
|---|---|---|---|---|---|---|---|---|
| 104 | —O— | ⎯⟨⎯⟩⎯Cl | 96 | 7 | 8 | 305–305.5 | $C_{30}H_{20}ON_2Cl_2$<br>C 72.44 H 4.07 N 5.65<br>C 72.68 H 4.06 N 5.54 | 99–95 |
| 138 | —O— | ⎯⟨⎯⟩⎯OCH₃ | 75.2 | 7 | 9 | 309.5–310 | $C_{32}H_{26}O_3N_2$<br>C 78.99 H 5.39 N 5.76<br>C 79.01 H 5.58 N 5.83 | 90–95 |
| 214 | —O— | naphthyl | 92.0 | 7 | 8 | 334–335 | $C_{38}H_{26}ON_2$<br>C 86.66 H 4.98 N 5.32<br>C 86.65 H 5.15 N 5.28 | 60 |
| 215 | —S— | phenyl | 93.2 | 7 | 5 | 361–362 | $C_{30}H_{22}N_2S$<br>C 81.42 H 5.01 N 6.33<br>C 81.14 H 5.00 N 6.28 | 60 |
| 216 | —S— | biphenyl | 94.9 | 8 | 10 | >400 | $C_{42}H_{30}N_2S$<br>C 84.81 H 5.08 N 4.71<br>C 84.76 H 5.19 N 4.79 | 60 |
| 217 | O | phenyl-CH(CH₃)₂ | 91.6 | 11 | 1 | 285–286.5 | $C_{36}H_{34}ON_2$<br>C 84.67 H 6.71 N 5.49<br>C 84.82 H 6.71 N 5.73 | 60 |
| 218 | —O— | naphthyl | 92.5 | 11 | 6 | 255–255.5 | $C_{38}H_{26}ON_2$<br>C 86.66 H 4.98 N 5.32<br>C 86.76 H 5.19 N 5.24 | 60 |

EXAMPLE 17

14.3 g of 1-[6'-phenyl-benzoxazolyl-(2')]-4-methyl-benzene of formula (104), 9.2 g of benzalaniline and 6.3 g of potassium hydroxide powder containing about 10 percent of water are stirred into 300 ml of dimethylformamide with exclusion of air. The temperature is raised to 90°C over the course of 1 hour, during which first a violet, and then a dark brown, coloration develops.

The 4-[aryloxazolyl-(2')]-stilbene derivatives of formula (219)
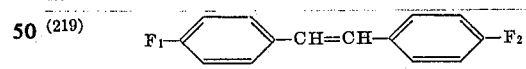

listed in the following Table may be prepared in a similar manner; in this, the reaction temperature was restricted to 60°C but 4 mols of potassium hydroxide per methyl group to be reacted were used.

| I | $F_1$ | $F_2$ | III | IV | V | VI | VII |
|---|---|---|---|---|---|---|---|
| 220 | H | benzoxazolyl | 45.7 | 2 | 1 | 197–197.5 | $C_{21}H_{15}ON$<br>C 84.82 H 5.09 N 4.71<br>C 84.61 H 4.89 N 4.90 |
| 221 | H | 5-tert-butyl-benzoxazolyl | 51.0 | 2 | 1 | 174–174.5 | $C_{25}H_{23}ON$<br>C 84.95 H 6.56 N 3.96<br>C 84.09 H 6.59 N 400 |

| I | II F₁ | II F₂ | III | IV | V | VI | VII |
|---|---|---|---|---|---|---|---|
| 222 | H | benzoxazole with 5-CH₃ | 43.4 | 2 | 1 | 182.5–183 | $C_{22}H_{17}ON$<br>C 84.86  H 5.50  N 4.50<br>C 84.59  H 5.52  N 4.44 |
| 223 | H | Same as above | 32.1 | 1/4 | 8 | 180–180.5 | $C_{22}H_{17}ON$<br>C 84.86  H 5.50  N 4.50<br>C 85.12  H 5.58  N 4.66 |
| 224 | H | benzoxazole with phenyl | 55.2 | 5 | 5 | 233–233.5 | $C_{27}H_{19}ON$<br>C 86.84  H 5.13  N 3.75<br>C 86.73  H 5.20  N 3.77 |
| 225 | H | benzoxazole with C(CH₃)₂Ph | 36.2 | 2/3 | 1 | 144–144.5 | $C_{30}H_{25}ON$<br>C 86.71  H 6.06  N 3.37<br>C 86.75  H 6.05  N 3.40 |
| 226 | H | benzoxazole with 2 CH₃ | 78.0 | 5 | 1 | 233–233.5 | $C_{23}H_{19}ON$<br>C 84.89  H 5.89  N 4.30<br>C 84.64  H 5.72  N 4.40 |
| 227 | H | naphthoxazole | 64.5 | 2/3 | 9 | 204–204.5 | $C_{25}H_{17}ON$<br>C 86.43  H 4.93  N 4.03<br>C 86.69  H 5.15  N 3.98 |
| 228 | —Cl | benzoxazole | 69.4 | 5 | 2 | 239–239.5 | $C_{21}H_{14}ONCl$<br>C 76.02  H 4.25  N 4.22<br>C 75.95  H 4.19  N 4.36 |
| 229 | —Cl | benzoxazole with C(CH₃)₃ | 71.1 | 5 | 2 | 228.5–229 | $C_{25}H_{22}ONCl$<br>C 77.41  H 5.72  N 3.61<br>C 77.37  H 5.76  N 3.68 |
| 230 | —Cl | benzoxazole with phenyl | 58.7 | 5 | 8 | 255–255.5 | $C_{27}H_{18}ONCl$<br>C 79.50  H 4.45  N 3.43<br>C 79.36  H 4.51  N 3.37 |
| 231 | —Cl | naphthoxazole | 75.5 | 5 | 9 | 222–223 | $C_{25}H_{16}ONCl$<br>C 78.63  H 4.22  N 3.67<br>C 78.68  H 4.34  N 3.83 |
| 232 | —OCH₃ | benzoxazole | 52.6 | 2/3 | 3 | 220.5–222 | $C_{22}H_{17}O_2N$<br>C 80.71  H 5.23  N 4.28<br>C 80.46  H 5.38  N 4.20 |
| 233 | —OCH₃ | benzoxazole with 2 CH₃ | 44.3 | 5 | 2 | 211–211.5 | $C_{25}H_{25}O_2N$<br>C 81.43  H 6.57  N 3.65<br>C 81.53  H 6.72  N 3.69 |

| I | II F1 | II F2 | III | IV | V | VI | VII | |
|---|---|---|---|---|---|---|---|---|
| 234 | —OCH₃ | (benzoxazole with -C(CH₃)₂-phenyl) | 53.9 | 5 | 9 | 197–197.5 | $C_{31}H_{27}O_2N$ C 83.57 H 6.11 N 3.14 C 83.64 H 6.18 N 3.16 | |
| 106 | —OCH₃ | (benzoxazole with phenyl) | 56.6 | 5 | 3 | 254–254.5 | $C_{28}H_{21}O_2N$ C 83.35 H 5.25 N 3.47 C 82.93 H 5.36 N 3.33 | |
| 235 | —OCH₃ | (benzoxazole with naphthyl) | 56.2 | 5 | 9 | 216–217 | $C_{26}H_{19}O_2N$ C 82.74 H 5.07 N 3.71 C 82.52 H 5.23 N 3.54 | |
| 236 | —CH(CH₃)₂ | (benzoxazole with phenyl) | 72.5 | 4 | 9 | 196.5–197 | $C_{30}H_{25}ON$ C 86.71 H 6.06 N 3.37 C 86.58 H 6.18 N 3.43 | |
| 237 | H | (benzoxazole with two CH₃) | 78.0 | 5 | 1 | 233–233.5 | $C_{23}H_{19}ON$ C 84.80 H 5.89 N 4.30 C 84.64 N 5.72 N 4.40 | |

EXAMPLE 18

10.47 g of 1-[benzoxazolyl-(2')]-4-methylbenzene of formula (238)

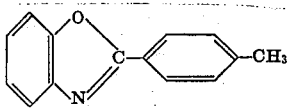

12.87 g of diphenyl-(4)-aldehyde-anil and 25 g of potassium hydroxide powder containing about 10 percent of water are stirred into 300 ml of dimethylformamide with exclusion of air, during which a reddish brown coloration develops. The temperature is raised to 60°C over the course of 30 minutes, and the mixture stirred for a further 30 minutes at this temperature and thereafter cooled to room temperature. Now 150 ml of water and 250 ml of 10 percent strength hydrochloric acid are successively added dropwise. The precipitated reaction product is filtered, washed with water until neutral and freed of a by-product by further washing with 600 ml of methanol. After drying about 12.3 g, corresponding to 66.0 percent of theory, of 4-[benzoxazolyl-(2'')]-4'-phenylstilbene of formula (239)

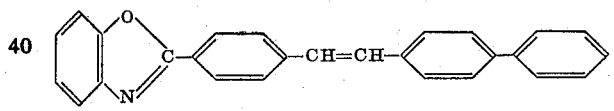

are obtained in the form of a light yellow powder which melts at 270° to 272°C. After three recrystallizations from o-dichlorobenzene with the aid of Fuller's earth about 8.4 g, corresponding to 45.2 percent of theory, of light yellow glistening platelets of melting point 276° to 276.5°C are obtained.

Analysis: $C_{27}H_{19}ON$ (373.43). Calculated C 86.84, H 5.13, N 3.75; found: C 86.78, H 5.16, N 3.83.

The 4-[aryloxazolyl-(2'')]-4-phenylstilbene derivatives of formula (240)

listed in the following Table may be prepared in a similar manner.

| I | II G₁ | III | IV | V | VI | VII | |
|---|---|---|---|---|---|---|---|
| 241 | (phenyl-benzoxazole with -C(CH₃)₃) | 80.0 | 4 | 3 | 264–265 | $C_{31}H_{27}ON$ C 86.68 H 6.34 N 3.26 C 86.83 H 6.11 N 3.29 | |

| I | II G₁ | III | IV | V | VI | VII |
|---|---|---|---|---|---|---|
| 242 | [benzoxazole with -C(CH₃)₂-phenyl substituent] | 77.0 | 5 | 9 | 238–238.5 | $C_{36}H_{29}ON$<br>C 87.95  H 5.94  N 2.85<br>C 87.90  H 5.84  N 2.75 |
| 243 | [benzoxazole with phenyl substituent] | 69.0 | 7 | 6 | 294.5–295.5 | $C_{33}H_{23}ON$<br>C 88.17  H 5.16  N 3.12<br>C 88.33  H 5.26  N 3.11 |
| 244 | [benzoxazole with phenyl substituent, isomer] | 70.3 | 7 | 9 | 284–284.5 | $C_{33}H_{23}ON$<br>C 88.17  H 5.16  N 3.12<br>C 88.28  H 5.04  N 3.19 |
| 245 | [benzoxazole with -CH₃] | 77.6 | 5 | 3 | 294.5–295 | $C_{28}H_{21}ON$<br>C 86.79  H 5.46  N 3.62<br>C 86.87  H 5.46  N 3.61 |
| 246 | [benzoxazole with -CH₃, isomer] | 78.4 | 4 | 9 | 280–280.5 | $C_{28}H_{21}ON$<br>C 86.79  H 5.46  N 3.62<br>C 86.79  H 5.50  N 3.71 |
| 247 | [benzoxazole with two -CH₃ groups] | 82.7 | 5 | 9 | 306–308 | $C_{29}H_{23}ON$<br>C 86.75  H 5.78  H 3.49<br>C 86.88  H 5.85  H 3.48 |
| 248 | [benzoxazole with H₃C substituent] | 50.6 | 5 | 8 | 213–213.5 | $C_{28}H_{21}ON$<br>C 86.79  H 5.46  H 3.62<br>C 86.55  H 5.46  H 3.82 |
| 249 | [benzoxazole with H₃C substituent, isomer] | 82.5 | 5 | 3 | 201–202 | $C_{28}H_{21}ON$<br>C 86.79  H 5.46  N 3.62<br>C 86.64  H 5.53  N 3.38 |
| 250 | [benzoxazole with -SO₂-NH-(CH₂)₇-CH₃] | 90 | 5 | 3 | 266–266.5 | $C_{35}H_{36}O_3N_2S$<br>C 74.44  H 6.43  N 4.96<br>C 74.21  H 6.18  N 4.91 |
| 251 | [naphthoxazole] | 72.7 | 7 | 7 | 259.5–260 | $C_{31}H_{21}ON$<br>C 87.91  H 5.00  N 3.31<br>C 87.91  H 5.11  N 3.26 |
| 252 | [naphthoxazole, isomer] | 94.8 | 11 | 9 | 279–279.5 | $C_{31}H_{21}ON$<br>C 87.91  H 5.00  N 3.31<br>C 87.83  H 4.99  N 3.32 |

Example 19

5.23 g of 1-[benzoxazolyl-(2')]-4-methylbenzene of formula (238) 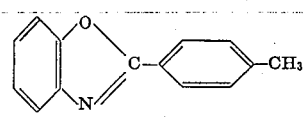

5.78 g of naphth-(1)-aldehyde-anil and 12.5 g of potassium hydroxide powder containing about 10 percent of water are stirred into 150 ml of dimethylformamide with exclusion of air, during which first a wine-red and then a violet color develops. The temperature is raised to 60°C over the course of 30 minutes, and the mixture stirred for a further 30 minutes at this temperature and thereafter cooled to room temperature. Now 200 ml of water and 140 ml of 10 percent strength hydrochloric acid are successively added dropwise. The precipitated reaction product is cooled to 5°C, filtered, washed with water until neutral and freed of a by-product by a further washing with a little methanol. After drying about 7.73 g, corresponding to 89 percent of theory, of the compound of formula (253) 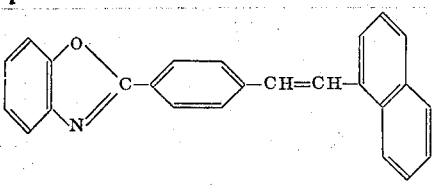

are obtained in the form of a brownish yellow powder. After chromatography on activated aluminum oxide in tetrachlorethylene and recrystallization from dioxane-ethanol pale greenish yellow glistening small needles and platelets of melting point 165° to 166°C are obtained.

Analysis: $C_{25}H_{17}ON$ (347.39). Calculated: C 86.43, H 4.93, N 4.03; found: C 86.54, H 4.91, N 4.08.

The compounds of formula (254) 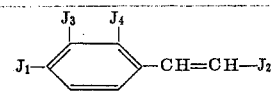

listed in the following Table may be prepared in a similar manner.

| I | II+ J₁ | J₂ | J₃ | J₄ | III | IV | V | VI | VII |
|---|---|---|---|---|---|---|---|---|---|
| 255 | -C(benzoxazolyl)- | -C(CH₃)₃-phenyl | — | naphthyl | 89.4 | 2/3 | 8 | 141–141.5 | $C_{29}H_{25}ON$<br>C 86.32 H 6.25 N 3.47<br>C 86.35 H 6.17 N 3.56 |
| 256 | -C(benzoxazolyl)- | phenyl-naphthyl | — | naphthyl | 90.0 | 2/3 | 6 | 150.5–151 | $C_{31}H_{21}ON$<br>C 87.91 H 5.00 N 3.31<br>C 87.89 H 5.26 N 3.33 |
| 257 | -C(benzoxazolyl)- | phenyl-naphthyl | — | naphthyl | 95.8 | 2/3 | 3 | 183–183.5 | $C_{31}H_{21}ON$<br>C 87.91 H 5.00 N 3.31<br>C 87.98 H 4.81 N 3.35 |
| 258 | -C(naphthoxazolyl)- | — | — | naphthyl | 72.5 | 3 | 6 | 206.5–207 | $C_{29}H_{19}ON$<br>C 87.63 H 4.82 N 3.52<br>C 87.88 H 4.99 N 3.60 |
| 259 | -C(benzoxazolyl)- | — | — | naphthyl-naphthyl | 65.7 | 2/3 | 2 | 225–226 | $C_{25}H_{17}ON$<br>C 86.43 H 4.93 N 4.03<br>C 86.47 H 5.18 N 4.05 |
| 260 | -C(benzoxazolyl)-C(CH₃)₃ | — | — | naphthyl-naphthyl | 61.4 | 2/3 | 1 | 208–208.5 | $C_{29}H_{25}ON$<br>C 86.32 H 6.25 N 3.47<br>C 86.15 H 6.30 N 3.52 |

| I | J₁ | J₂ | J₃ | J₄ | III | IV | V | VI | VII |
|---|---|---|---|---|---|---|---|---|---|
| 261 | -C(benzoxazole with phenyl) | naphthyl | | | ---- | 60.2 | 7 | 8 | 261-261.5 | C₃₁H₂₁ON<br>C 87.91  H 5.00  N 3.31<br>C 87.87  H 5.06  N 3.39 |
| 262 | -C(benzoxazole with phenyl) | naphthyl | | | ---- | 62.4 | 5 | 8 | 264-265 | C₃₁H₂₁ON<br>C 87.91  H 5.00  N 3.31<br>C 87.72  H 4.83  N 3.43 |
| 263 | -C(naphthoxazole) | naphthyl | | | ---- | 80.5 | 5 | 9 | 256-256.5 | C₂₉H₁₉ON<br>C 87.63  H 4.82  N 3.52<br>C 87.88  H 4.83  N 3.58 |
| 264 | -C(benzoxazole) | methylnaphthyl | H | —CH₃ | 95.7 | 5 | 9 | 168-168.5 | C₂₆H₁₉ON<br>C 86.40  H 5.30  N 3.88<br>C 86.44  H 5.30  N 3.95 |
| 265 | -C(benzoxazole) | naphthyl | —CH₃ | H | 90 | 2 | 9 | 144-144.5 | C₂₆H₁₉ON<br>C 86.40  H 5.30  N 3.88<br>C 86.38  H 5.22  N 3.93 |

⁺ J₃, J₄ = H.

Example 20

10.42 g of the bis-benzoxazole compound of formula (266)

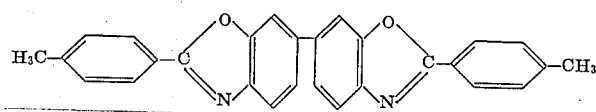

(prepared by condensation of 1 mol of 3,3'-dihydroxybenzidine with 2 mol of p-toluic acid and subsequent ring closure by heating to above 200°C using boric acid as the catalyst; melting point: 316° to 316.5°C), 9.06 g of benzalaniline and 25 g of potassium hydroxide powder containing about 10 percent of water are stirred into 300 ml of dimethylformamide with exclusion of air, during which a brownish-violet coloration gradually develops. The temperature is raised to 60°C over the course of 30 minutes, and the mixture stirred for a further 35 minutes at this temperature and then cooled to room temperature. Now 100 ml of water and 230 ml of 10 percent strength hydrochloric acid are successively added dropwise. The precipitated reaction product is filtered, washed with water and methanol and dried. About 11.2 g, corresponding to 75.6 percent of theory, of the compound of formula (267)

are obtained and after three recrystallizations from o-dichlorobenzene this yields light yellow glistening small crystals of melting point 352° to 353°C.

Analysis: C₄₂H₂₈O₂N₂ (592.66). Calculated: C 85.11, H 4.76, N 4.73; found: C 84.81, H 4.78, N 4.71.

The compound of formula (268)

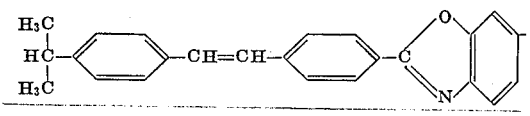

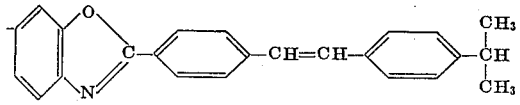

may be prepared in a similar manner. Yield: 62.7 percent of theory. Light yellow felted small crystals from o-dichlorobenzene. Melting point: above 380°C.

Analysis: C₄₈H₄₀O₂N₂ (676.82). Calculated: C 85.17, H 5.96, N 4.14; found: C 85.01, H 5.93, N 4.14.

Example 21

7.24 g of 1-[benzthiazolyl-(2')]-4-methylbenzene of formula (269) 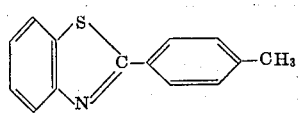

6.04 g of benzalaniline and 16.7 g of potassium hydroxide powder containing about 10 percent of water are stirred into 200 ml of dimethylformamide with exclusion of air, during which a violet coloration develops. The temperature is raised to 60°C over the course of 30 minutes, and the mixture is stirred for a further 30 minutes at this temperature and then cooled to room temperature. Now 100 ml of water and 190 ml of 10 strength hydrochloric acid are successively added dropwise. The precipitated reaction product is filtered, washed with water until neutral and freed of a byproduct by further washing with 300 ml of methanol. After drying about 8.1 g, corresponding to 80.6 percent of theory, of 4-[benzthiazolyl-(2')]-stilbene of formula

(270) 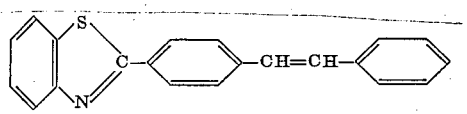

are obtained in the form of a light yellow powder which melts at 226° to 228°C. After three recrystallizations from tetrachlorethylene with the aid of Fuller's earth pale green very fine crystals of melting point 231° to 231.5°C are obtained.
Analysis: $C_{21}H_{15}NS$ (313.43). Calculated: C 80.48, H 4.82, N 4.47; found: C 80.39, H 4.98, N 4.49.

The 4-[benzthiazolyl-(2')]-stilbene derivatives of formula

(271) 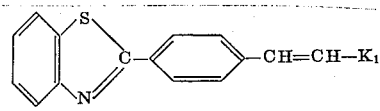

listed in the following Table may be prepared in a similar manner.

Example 22

5.88 g of 2-[4'-methylphenyl-(1')]-5-phenyloxazole of formula (277) 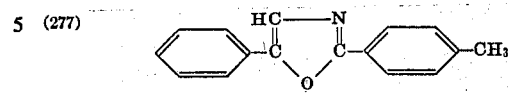

5.44 g of benzalaniline and 12.5 g of potassium hydroxide powder containing about 10 percent of water are stirred into 150 ml of dimethylformamide with exclusion of air, during which a reddish violet coloration develops. The temperature is raised to 60°C over the course of 30 minutes and the mixture stirred for a further 30 minutes at this temperature and then cooled to room temperature. Now 150 ml of water and 130 ml of 10 percent strength hydrochloric acid are successively added dropwise. The precipitated reaction product is filtered, washed with water until neutral and purified by further washing with 150 ml of methanol. After drying about 6.2 g, corresponding to 76.8 percent of theory, of 2-[stilbenyl-(4')]-5-phenyloxazole of formula (278) 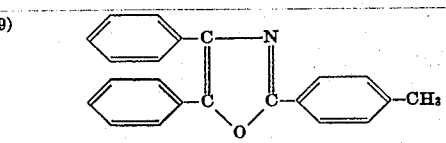

are obtained in the form of a pale yellow powder which melts at 154.5° to 155.5°C. Two recrystallizations from ethanol, with the aid of activated charcoal, yield pale green very fine glistening small needles and platelets of melting point 156° to 156.5°C.
Analysis: $C_{23}H_{17}ON$ (323.37). Calculated: C 85.42, H 5.30, N 4.33; found: C 85.51, H 5.27, N 4.35.

In a similar manner, 2-[4'-methylphenyl-(1')]-5-phenyl-oxazole of formula (277) and 2-[4'-methylphenyl-(1')]-4,5-diphenyloxazole of formula (279)

| I | II, K₁ | III | IV | V | VI | VII | | |
|---|---|---|---|---|---|---|---|---|
| 272 | —⌬—Cl | 82.8 | 5 | 8 | 263.5–264 | $C_{21}H_{14}NSCl$ C 72.51 H 4.06 N 4.03 | | |
| | | | | | | C 72.60 H 4.01 N 3.95 | | |
| 273 | —⌬—OCH₃ | 90.8 | 5 | 9 | 244.5–245 | $C_{22}H_{17}ONS$ C 76.94 H 4.99 N 4.08 | | |
| | | | | | | C 76.61 H 5.01 N 4.11 | | |
| 274 | —⌬—⌬ | 88.0 | 7 | 9 | 299–300 | $C_{27}H_{19}NS$ C 83.26 H 4.92 N 3.60 | | |
| | | | | | | C 83.33 H 4.79 N 3.41 | | |
| 275 | (naphthyl) | 92.4 | 2/3 | 6 | 145.5–146 | $C_{25}H_{17}NS$ C 82.61 H 4.71 N 3.85 | | |
| | | | | | | C 82.67 H 4.75 N 3.90 | | |
| 276 | (naphthyl) | 80.5 | 5 | 5 | 249.5–250 | $C_{25}H_{17}NS$ C 82.61 H 4.71 N 3.85 | | |
| | | | | | | C 82.38 H 4.81 N 3.92 | | | may be used to prepare the 2-[stilbenyl-(4')]-oxazole derivatives of formula (280)
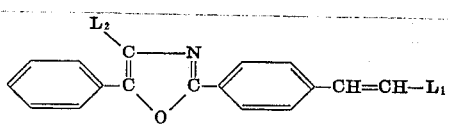

which are listed in the following Table.

12.9 g of diphenyl-(4)-aldehyde-anil and 25 g of potassium hydroxide powder containing about 10 percent of water are stirred into 300 ml of dimethylformamide with exclusion of air, during which a violet coloration develops. The temperature is raised to 60°C over the course of 30 minutes and the reaction mixture stirred for 30 minutes at 60° to 65°C and subsequently cooled to room temperature. Now 150 ml of water and 180 ml

| I | II | | III | IV | V | VI | VII |
|---|---|---|---|---|---|---|---|
| | $L_1$ | $L_2$ | | | | | |
| 281 | ⟨phenyl⟩—Cl | H | 88.5 | 5 | 8 | 204–205 | $C_{23}H_{16}ONCl$<br>C 77.20  H 4.51  N 3.91<br>C 77.14  H 4.56  N 3.86 |
| 282 | ⟨phenyl⟩—OCH₃ | H | 86.0 | 5 | 8 | 191.5–19.25 | $C_{24}H_{19}O_2N$<br>C 81.56  H 5.42  N 3.96<br>C 81.39  H 5.47  N 3.83 |
| 283 | ⟨phenyl⟩—CH(CH₃)₂ | H | 86.5 | 2 | 2 | 142–142.5 | $C_{26}H_{23}ON$<br>C 85.45  H 6.34  N 3.83<br>C 85.33  H 6.19  N 3.98 |
| 284 | ⟨phenyl⟩—⟨phenyl⟩ | H | 80.1 | 5 | 9 | 230–230.5 | $C_{29}H_{21}ON$<br>C 87.19  H 5.30  N 3.51<br>C 87.29  H 5.35  N 3.27 |
| 285 | ⟨naphthyl⟩ | H | 88.0 | 11 | 9 | 169–169.5 | $C_{27}H_{19}ON$<br>C 86.84  H 5.13  N 3.75<br>C 87.09  H 5.25  N 3.70 |
| 286 | ⟨naphthyl⟩ | H | 89.0 | 11 | 8 | 214.5–215 | $C_{27}H_{19}ON$<br>C 86.84  H 5.13  N 3.75<br>C 87.02  H 5.28  N 3.87 |
| 287 | ⟨phenyl⟩ | ⟨phenyl⟩ | 85.1 | 5 | 3 | 181.5–183 | $C_{29}H_{21}ON$<br>C 87.19  H 5.30  N 3.51<br>C 87.36  H 5.32  N 3.69 |
| 288 | ⟨phenyl⟩—Cl | ⟨phenyl⟩ | 84.0 | 5 | 9 | 206–207 | $C_{29}H_{20}ONCl$<br>C 80.27  H 4.65  N 3.23<br>C 80.02  H 4.55  N 3.51 |
| 289 | ⟨2,4-dichlorophenyl⟩ | ⟨phenyl⟩ | 55.6 | 2 | 9 | 171.5–172 | $C_{29}H_{19}ONCl_2$<br>C 74.37  H 4.09  N 2.99<br>C 74.40  H 4.19  N 3.15 |
| 290 | ⟨phenyl⟩—OCH₃ | ⟨phenyl⟩ | 69.0 | 5 | 9 | 182.5–183 | $C_{30}H_{23}O_2N$<br>C 83.89  H 5.40  N 3.26<br>C 84.01  H 5.52  N 3.16 |
| 291 | ⟨biphenyl⟩ | ⟨phenyl⟩ | 92.5 | 5 | 9 | 255–255.5 | $C_{35}H_{25}ON$<br>C 88.39  H 5.40  N 2.95<br>C 88.6   H 5.43  N 3.01 |
| 292 | ⟨naphthyl⟩ | ⟨phenyl⟩ | 87.1 | 2/3 | 6 | 195.5–160 | $C_{33}H_{23}ON$<br>C 88.17  H 5.16  N 3.12<br>C 88.22  H 5.05  N 3.10 |
| 293 | ⟨naphthyl⟩ | ⟨phenyl⟩ | 86.2 | 5 | 9 | 202–202.5 | $C_{33}H_{23}ON$<br>C 88.17  H 5.16  N 3.12<br>C 88.07  H 5.23  N 3.09 |

Example 23

8.13 g of 2-phenyl-4,5-di-[4'-methylphenyl-(1')]-oxazole of formula (294)
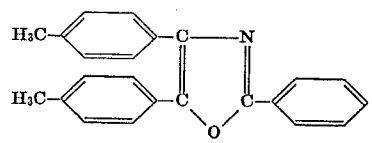

of 10 percent strength hydrochloric acid are successively added dropwise with cooling. The precipitated reaction product is filtered, washed with water until neutral and purified by further washing with 400 ml of methanol. After drying about 15.3 g, corresponding to 93.6 percent of theory, of 2-phenyl-4,5-di-[4''-phenyl-stilbenyl-(4')]- oxazole of formula (295) 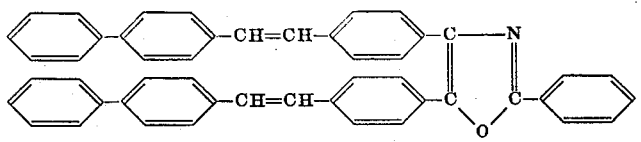

are obtained in the form of a yellow powder. After three recrystallizations from tetrachlorethylene with the aid of Fuller's earth greenish yellow very fine crystals are obtained which melt at 319° to 319.5°C.
Analysis: $C_{49}H_{35}ON$ (653.83). Calculated: C 90.01, H 5.40, N 2.14; found: C 90.04, H 5.53, N 1.93.

In a similar manner, 2-phenyl-4,5-di-[4'-methylphenyl-(1')]-oxazole of formula (294) and 2,4,5-tri-[4'-methyl-phenyl-(1')]-oxazole of formula (296) 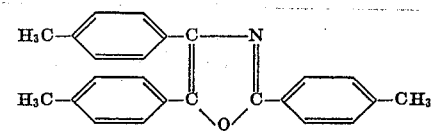

may be used to prepare the stilbenyl-oxazole derivatives of formula (297) 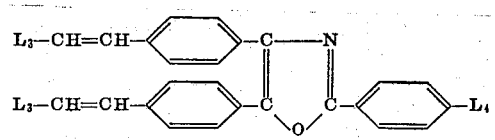

listed in the following Table.

(303) 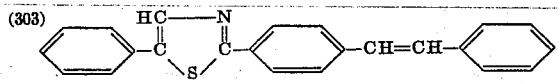

are obtained in the form of a light yellow powder which melts at 208.5° to 209°C. Three recrystallizations, first from tetrachlorethylene and then from xylene, with the aid of Fuller's earth, yield light greenish yellow glistening platelets of melting point 210° to 210.5°C.
Analysis: $C_{23}H_{17}NS$ (339.46). Calculated: C 81.38, H 5.05, N 4.13; found: C 81.45, H 5.17, N 3.89.

In a similar manner, 2-[4'-methylphenyl-(1')]-5-phenylthiazole of formula (302), 2-[4'-methylphenyl-(1')]-5-phenyl-1,3,4-thiadiazole of formula (304) 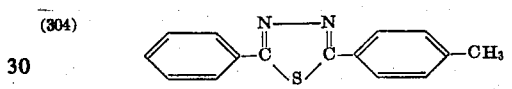

and 2-[4'-methylphenyl-(1')]-5-[diphenyl-(4")]-1,3,4-thiadiazole of formula

| I | II | | III | IV | V | VI | VII | | |
|---|---|---|---|---|---|---|---|---|---|
| | $L_3$ | $L_4$ | | | | | | | |
| 298 | ⌬ | H | 70.1 | 11 | 10 | 233–233.5 | $C_{37}H_{27}ON$ C 88.59 C 88.46 | H 5.43 H 5.64 | N 2.79 N 2.79 |
| 299 | ⌬⌬ | H | 88.5 | 11 | 7 | 242.5–243 | $C_{45}H_{31}ON$ C 89.82 C 89.91 | H 5.19 H 5.39 | N 2.33 N 2.22 |
| 300 | ⌬ | —CH=CH—⌬ | 88.9 | 5 | 7 | 239.5–242 | $C_{45}H_{33}ON$ C 89.52 C 89.22 | H 5.51 H 5.61 | N 2.32 N 2.38 |
| 301 | ⌬⌬ | —CH=CH—⌬⌬ | 93.0 | 5 | 7 | 274–275 | $C_{63}H_{45}ON$ C 90.94 C 91.04 | H 5.45 H 5.58 | N 1.68 N 1.84 |

Example 24

6.28 g of 2-[4'-methylphenyl-(1')]-5-phenylthiazole of formula (302) 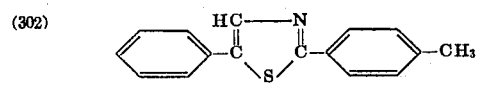

4,55 g of benzalaniline and 12.5 g of potassium hydroxide powder containing about 10 percent of water are reacted in 150 ml of dimethylformamide according to the instructions of Example 22. About 7.4 g, corresponding to 87.3 percent of theory, of 2-[stilbenyl-(4')]-5-phenylthiazole of formula (305) 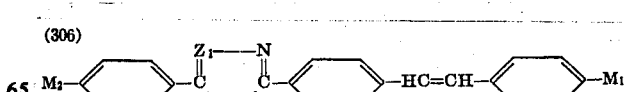

may be used to prepare, respectively, the 2-[stilbenyl-(4')]-thiazole and thiadiazole derivatives of formula (306) $M_2$—⌬—$\overset{Z_1}{C}\underset{S}{\overset{N}{\diagdown}}\overset{N}{C}$—⌬—HC=CH—⌬—$M_1$ listed in the following Table.

| 1 | M₁ | M₂ | Z₁ | III | IV | V | VI | VII | | |
|---|---|---|---|---|---|---|---|---|---|---|
| 307 | –⟨phenyl⟩ | H | =CH– | 93.5 | 11 | 7 | 279–281 | C₂₂H₂₁NS<br>C 83.82<br>C 83.97 | H 5.09<br>H 5.30 | N 3.37<br>N 3.23 |
| 308 | H | H | =N– | 84.7 | 5 | 3 | 227 | C₂₂H₁₆N₂S<br>C 77.62<br>C 77.50 | H 4.74<br>H 4.84 | N 8.23<br>N 8.33 |
| 309 | –⟨phenyl⟩ | H | =N– | 91.3 | 7 | 6 | 320–320.5 | C₂₈H₂₀N₂S<br>C 80.74<br>C 80.62 | H 4.84<br>H 4.77 | N 6.73<br>N 6.70 |
| 310 | H | –⟨phenyl⟩ | =N– | 93.3 | 7 | 6 | 317–318 | C₂₈H₂₀N₂S<br>C 80.74<br>C 80.56 | H 4.84<br>H 4.97 | N 6.73<br>N 6.57 |
| 311 | –⟨phenyl⟩ | –⟨phenyl⟩ | =N– | 95.0 | 7 | 10 | 371–373 | C₃₄H₂₄N₂S<br>C 82.89<br>C 82.86 | H 4.91<br>H 5.07 | H 4.69<br>H 5.49 |

Example 25

5.73 g of 3-phenyl-5-[4'-methylphenyl-(1')]-1,2,4-oxdiazole of formula (312) 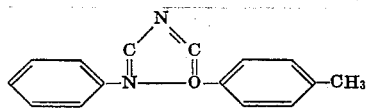

4.55 g of benzalaniline and 12.5 g of potassium hydroxide powder containing about 10 percent of water are reacted in 150 ml of dimethylformamide according to the instructions of Example 22. About 4.4 g, corresponding to 54.2 percent of theory, of 3-phenyl-5-[stilbenyl-(4')]-1,2,4-oxdiazole of formula (313) 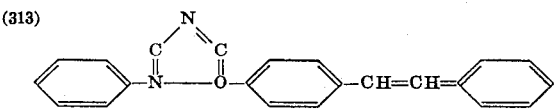

are obtained in the form of a light yellow powder. By twice recrystallizing from ethanol with the aid of activated charcoal, colourless felted small needles of melting point 144° to 144.5°C are obtained.

Analysis: C₂₂H₁₆ON₂ (324.36). Calculated: C 81.46, H 4.97, N 8.64; found: C 81.67, H 5.05, N 8.78.

In a similar manner 3-phenyl-5-[4'-methylphenyl-(1')]-1,2,4-oxdiazole of formula (312) and 3,5-di-[4'-methylphenyl-(1')]-1,2,4-oxdiazole of formula (140) may be used to prepare the 5-stilbenyl-1,2,4-oxdiazole derivatives of formula (314) 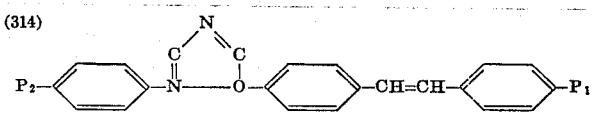

listed in the following Table.

Example 26

8.13 g of 1-phenyl-2,5-di-[4'-methylphenyl-(1')]-1,3,4-triazole of formula (318) 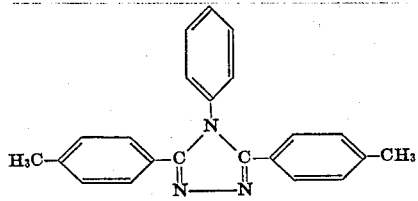

9.06 g of benzalaniline and 25 g of potassium hydroxide powder containing about 10 percent of water are stirred into 300 ml of dimethylformamide with exclusion of air, during which a reddish brown coloration gradually develops. The temperature is raised to 60°C over the course of 30 minutes, stirring continued for 30 minutes at this temperature, and the reaction mixture, which is now violet-red, thereafter cooled to room temperature and filtered. Now 100 ml of water and 250 ml of 10 percent strength hydrochloric acid are successively added dropwise. The precipitated reaction product is washed with a great deal of water and thereafter with 300 ml of methanol, and is dried. About 11.3 g, corresponding to 90.0 percent of theory, of 1-phenyl-2,5-di-[stilbenyl-(4')]-1,3,4-triazole of formula (319) 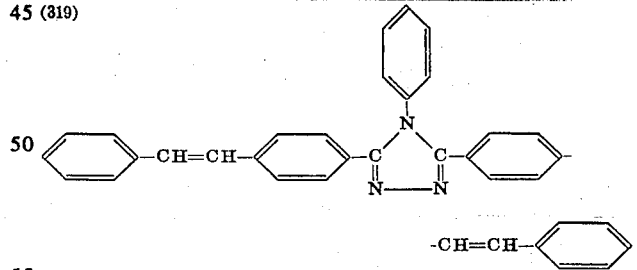

are obtained in the form of a practically colorless

| 1 | P₁ | P₂ | III | IV | V | VI | VII | | |
|---|---|---|---|---|---|---|---|---|---|
| 315 | –⟨phenyl⟩ | H | 70.0 | 11 | 6 | 230–230.5 | C₂₃H₂₀ON₂<br>C 83.97<br>C 83.97 | H 5.03<br>H 5.10 | N 7.00<br>N 7.02 |
| 316 | H | –CH₃ | 71.0 | 2 | 1 | 158–159 | C₂₃H₁₈ON₂<br>C 81.63<br>C 81.41 | H 5.36<br>H 5.39 | N 8.28<br>N 8.31 |
| 317 | –⟨phenyl⟩ | –CH₃ | 90.0 | 11 | 6 | 294.5–295 | C₂₉H₂₂ON₂<br>C 84.03<br>C 84.13 | H 5.35<br>H 5.31 | N 6.76<br>N 6.66 | powder which melts at 333° to 339°C. After three recrystallizations from o-dichlorobenzene with the aid of Fuller's earth, colorless very fine felted small needles of melting point 343° to 344°C are obtained.
Analysis: $C_{36}H_{27}N_3$ (501.60). Calculated: C 86.20, H 5.43, N 8.38; found: C 85.91, H 5.53, N 8.28.

In a similar manner 1-phenyl-2,5-di-[4'-methylphenyl-(1')]-1,3,4-triazole of formula (318), 5-phenyl-1,2,-di-[4'-methylphenyl-(1')]-1,3,4-triazole of formula (320)

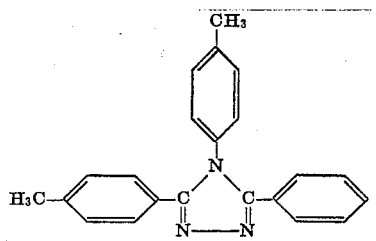

and 1,2,5-tri-[4'-methylphenyl-(1')]-1,3,4-triazole of formula (321)

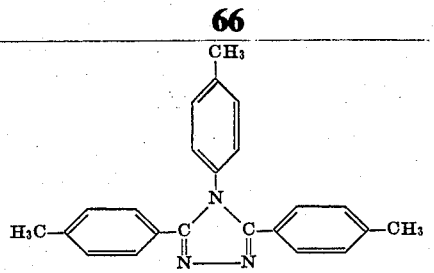

may be used to prepare the stilbenyl-1,3,4-triazole derivatives of formula (327)

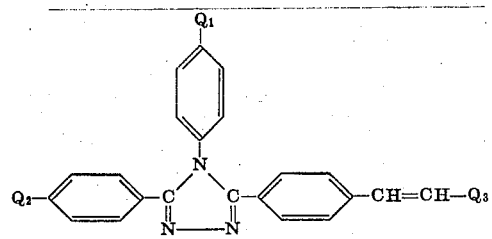

listed in the following Table.

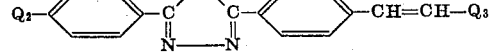

| I | II | | | III | IV | V | VI | VII | | |
|---|---|---|---|---|---|---|---|---|---|---|
| | $Q_1$ | $Q_2$ | $Q_3$ | | | | | | | |
| 323 | H | —CH=CH—(biphenyl) | (biphenyl) | 88.7 | 7 | 1 | >380 | $C_{48}H_{35}N_3$ C 88.18 H 5.40 N 6.43 | C 87.93 H 5.40 N 6.52 | |
| 324 | —CH=CH—(phenyl) | H | (phenyl) | 96.5 | 6 | 1 | 268–268.5 | $C_{36}H_{27}N_3$ C 86.20 H 5.43 N 8.38 | C 85.91 H 5.55 N 8.42 | |
| 325 | —CH=CH—(biphenyl) | H | (biphenyl) | 85.6 | 7 | 1 | 296–297 | $C_{48}H_{35}N_3$ C 88.18 H 5.40 N 6.43 | C 87.99 H 5.53 N 6.49 | |
| 326 | —CH=CH—(phenyl) | —CH=CH— | (phenyl) | 92.5 | 4 | 5 | 276–276.5 | $C_{44}H_{33}N_3$ C 87.53 H 5.51 N 6.96 | C 87.42 H 5.47 N 7.08 | |
| 327 | —CH=CH—(biphenyl) | —CH=CH—(biphenyl) | (biphenyl) | 95.5 | 7 | 5 | 365–366 | $C_{62}H_{45}N_3$ C 89.50 H 5.45 N 5.05 | C 89.23 H 5.55 N 5.19 | |

| I | II | | | III | IV | V | VI | VII |
|---|---|---|---|---|---|---|---|---|
| | $Q_1$ | $Q_2$ | $Q_3$ | | | | | |
| 328 | —CH=CH— (4-Cl-phenyl) | —CH=CH— (4-Cl-phenyl) | 4-Cl-phenyl | 87.5 | 11 | 6 | 279.5–280.5 | $C_{44}H_{30}N_3Cl_3$ C 74.74 H 4.28 N 5.94 C 74.71 H 4.20 N 6.01 |
| 329 | —CH=CH— (4-OCH₃-phenyl) | —CH=CH— (4-OCH₃-phenyl) | 4-OCH₃-phenyl | 95.2 | 7 | 9 | 260–260.5 | $C_{47}H_{39}O_3N_3$ C 81.36 H 5.67 N 6.06 C 81.31 H 5.66 N 5.99 |
| 330 | —CH=CH— (1-naphthyl) | —CH=CH— (1-naphthyl) | 2-naphthyl | 95.5 | 11 | 6 | 296.5–297 | $C_{55}H_{39}N_3$ C 89.21 H 5.21 N 5.57 C 88.96 H 5.26 N 5.55 |
| 331 | —CH=CH— (1-naphthyl) | —CH=CH— (1-naphthyl) | 1-naphthyl | 92.4 | 7 | 5 | 319–319.5 | $C_{55}H_{39}N_3$ C 89.21 H 5.21 N 5.57 C 88.92 H 5.21 N 5.83 |

Example 27

8.13 g of 1-phenyl-3,5-di-[4′-methylphenyl-(1′)]-1,2,4-triazole of formula (332)

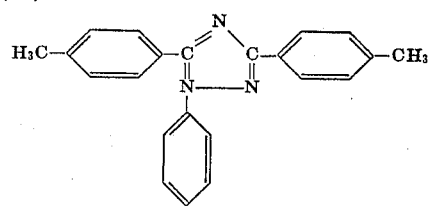

9.06 g of benzalaniline and 25 g of potassium hydroxide powder containing about 10 percent of water are reacted with 300 ml of dimethylformamide according to the instructions of Example 26. About 11.4 g, corresponding to 91 percent of theory, of 1-phenyl-3,5-di-[stilbenyl-(4′)]-1,2,4-triazole of formula (333)

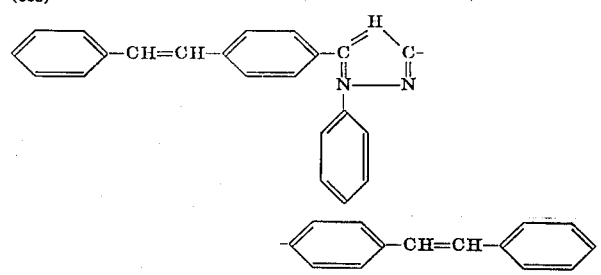

are obtained in the form of a greenish yellow powder. Three recrystallizations from xylene/n-hexane with the aid of Fuller's earth yield about 2.7 g, corresponding to 21.6 percent of theory, of fine colorless small needles of melting point 219.5° to 220°C.

Analysis: $C_{36}H_{27}N_3$ (501.60). Calculated: C 86.20, H 5.43, N 8.38; found: C 86.17, H 5.55, N 8.29.

In a similar manner, 1-phenyl-3,5-di-[4″-phenylstilbenyl-(4′)]-1,2,4 triazole of formula (334)

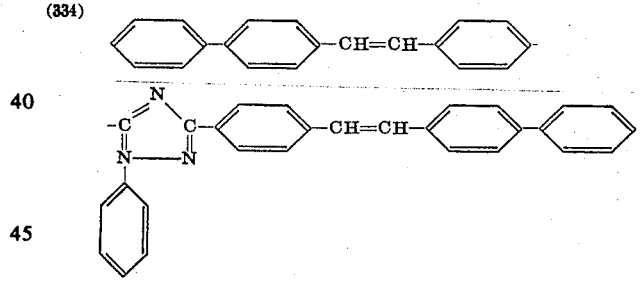

is obtained from 12.87 g of diphenyl-(4)-aldehyde-anil. Yield: 90.5 percent of theory. Pale beige-yellow very fine crystals from dimethylformamide. Melting point: 315° to 317°C.

Analysis: $C_{48}H_{35}N_3$ (653.78). Calculated: C 88.18, H 5.40, N 6.43; found: C 88.29, H 5.53, N 6.45.

Example 28

15.5 g of 1-[4′-methylphenyl-(1′)]-3,5-diphenyl-pyrazole of formula

335

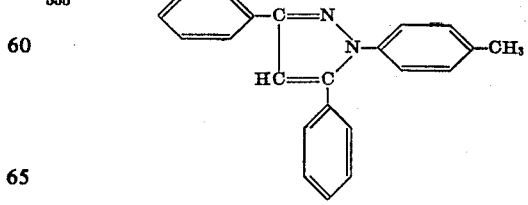

9.1 g of benzalaniline and 25 g of potassium hydroxide powder containing about 10 percent of water are reacted in 300 ml of dimethylformamide according to the instructions of Example 26. About 17.9 g, corresponding to 89.8 percent of theory, of a light brown resin are obtained. After chromatography in toluene on activated aluminum oxide and two recrystallizations from ligroin, about 1.2 g of colorless fine small needles of 1-[stilbenyl-(4')]-3,5-diphenylpyrazole of formula (336)
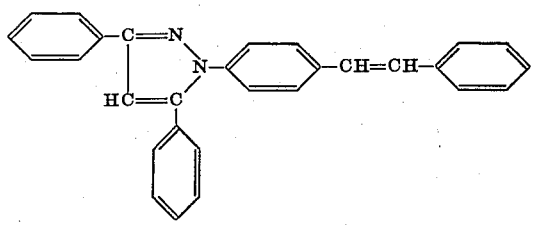

and of melting point 164.5° to 165°C are obtained.
Analysis: $C_{29}H_{22}N_2$ (398.48). Calculated: C 87.40, H 5.57, N 7.03; found: C 87.23, H 5.64, N 7.02.

In a similar manner 1-[4'-methylphenyl-(1')]-3,5-diphenylpyrazole of formula (335), 3-[4'-methylphenyl-(1')]-1,5- diphenylpyrazole of formula (337)
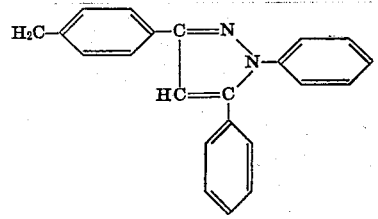

5-[4'-methylphenyl-(1')]-1,3-diphenylpyrazole of formula (338)
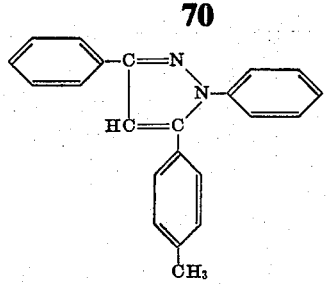

and 1,3-di-[4'-methylphenyl-(1')]-5-phenylpyrazole of formula (339)
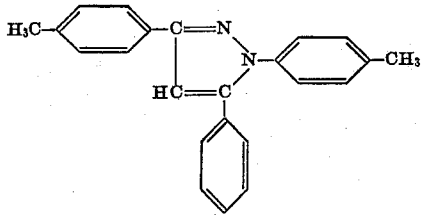

may be used to prepare the stilbenyl-pyrazole derivatives of formula (340)
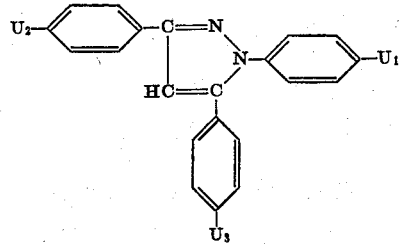

listed in the following Table. The figure given in brackets in column III denotes the yield of pure product.

| I | II U₁ | II U₂ | II U₃ | III | IV | V | VI | VII | | |
|---|---|---|---|---|---|---|---|---|---|---|
| 341 | —CH=CH-〔biphenyl〕 | H | H | 99 (3.4) | 10/11 | 1 | 212–213 | $C_{35}H_{26}N_2$ C 88.57 C 88.24 | H 5.52 H 5.54 | N 5.90 N 5.94 |
| 342 | H | —CH=CH-〔phenyl〕 | H | 93 (4.5) | 10/11 | 1 | 216–216.5 | $C_{29}H_{22}N_2$ C 87.40 C 87.20 | H 5.57 H 5.72 | N 7.03 N 7.01 |
| 343 | H | —CH=CH-〔biphenyl〕 | H | 17 (1) | 11 | 1 | 277.5–278 | $C_{35}H_{26}N_2$ C 88.57 C 88.68 | H 5.52 H 5.49 | N 5.90 N 5.83 |

| I | II U₁ | U₂ | U₃ | III | IV | V | VI | VII | |
|---|---|---|---|---|---|---|---|---|---|
| 344 | H | H | —CH=CH—⟨phenyl⟩ | 90 (5) | 10 | 1 | 163.5–164 | $C_{29}H_{22}N_2$ C 87.40 H 5.57 N 7.03 | C 87.17 H 5.72 N 7.14 |
| 345 | H | H | —CH=CH—⟨biphenyl⟩ | 95.7 (5.5) | 2/4 | 2 | 208.5–209 | $C_{35}H_{26}N_2$ C 88.57 H 5.52 N 5.90 | C 88.74 H 5.59 N 5.78 |
| 346 | —CH=CH—⟨phenyl⟩ | —CH=CH—⟨phenyl⟩ | H | 68.7 (1.6) | 11 | 1 | 236–237 | $C_{37}H_{28}N_2$ C 88.77 H 5.64 N 5.60 | C 88.28 H 5.62 N 5.64 |
| 347 | —CH=CH—⟨biphenyl⟩ | —CH=CH—⟨biphenyl⟩ | H | 80.9 (1,2) | 11 | 6 | 318–319 | $C_{49}H_{36}N_2$ C 90.15 H 5.56 N 4.29 | C 89.60 H 5.65 N 4.47 |

Example 29

9.66 g of 1,4,5-triphenyl-2-[4'-methyl-phenyl-(1')]-imidazole of formula (348)
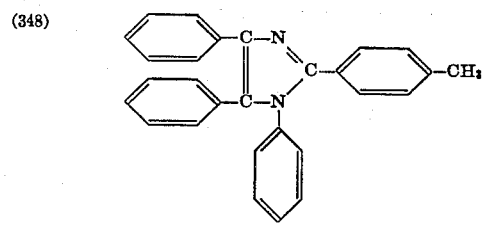

6.46 g diphenyl-(4)-aldehyde-anil and 12.5 g of potassium hydroxide powder containing about 10 percent water are stirred into 200 ml of dimethylformamide with exclusion of air. The temperature is raised to 90°C over the course of 30 minutes, during which a red coloration gradually develops. The reaction mixture is stirred for a further 30 minutes at 90 to 95°C and then cooled to room temperature. Now 200 ml of water and 110 ml of 10 percent strength hydrochloric acid are successively added dropwise, with cooling. The precipitated reaction product is filtered off, washed with a great deal of water and then with 400 ml of methanol and dried. About 8.0 g, corresponding to 58.2 percent of theory, of 1,4,5-triphenyl-2-[4''-phenyl-stilbenyl-(4')]-imidazole of formula (349)
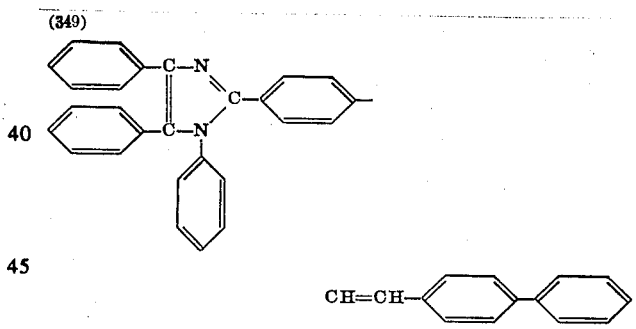

are obtained in the form of a light yellow powder which melts at 307° to 308°C. Three recrystallizations from o-dichlorobenzene, with the aid of Fuller's earth, yield 6.2 g, corresponding to 45.1 percent of theory, of light greenish yellow felted small needles of melting point 308° to 308.5°C.

Analysis: $C_{41}H_{30}N_2$ (550.67). Calculated: C 89.42, H 5.49, N 5.09; found: C 89.35, H 5.52, N 4.96.

In a similar manner the 1,4,5-triphenyl-2-[4'-methylphenyl-(1')]-imidazole of formula (348), the 2,4,5-triphenyl-1-[4'-methylphenyl-(1')]-imidazole of formula (350)
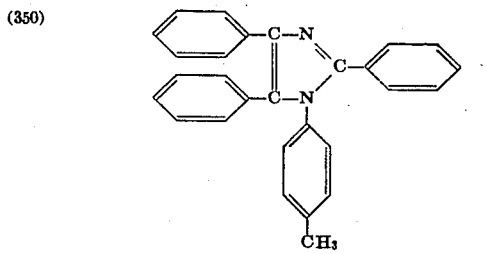

and the 4,5-diphenyl-1,2-di-[4'-methyl-phenyl-(1')]-imidazole of formula (351)
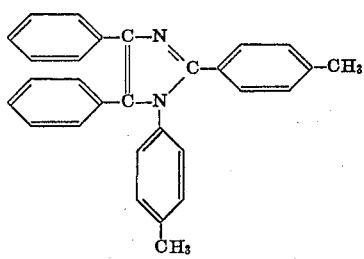

may be used to prepare the stilbenyl-imidazole derivatives of formula (352)
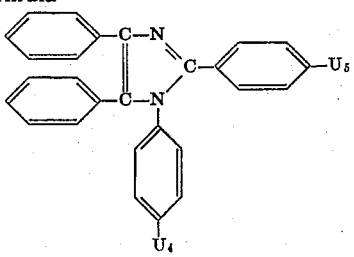

which are listed in the following table.

Example 30

6.42 g of 4-[4'-methyl-phenyl-(1')]-2,6-diphenyl pyridine of formula (359)
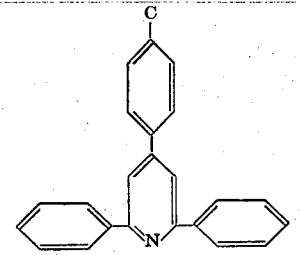

3.7 g of benzalaniline and 10 g of potassium hydroxide powder containing about 10 percent of water are stirred into 150 ml of dimethylformamide with exclusion of air. The temperature is raised to 60°C over the course of 30 minutes, during which a violet color develops. The reaction mixture is stirred for a further 30 minutes at 60° to 65°C and then cooled to room temperature. Now 150 ml of water and 150 ml of 10 percent strength hydrochloric acid are successively added dropwise, with cooling. The precipitated reac-

| I | II | | III | IV | V | VI | VII | | |
|---|---|---|---|---|---|---|---|---|---|
| | $U_4$ | $U_5$ | | | | | | | |
| 353 | H | —CH=CH—phenyl | 44.7 | 5 | 5 | 253–253.5 | $C_{35}H_{26}N_2$ | C 88.57 H 5.52 N 5.90 | C 88.77 H 5.61 N 6.00 |
| 354 | H | —CH=CH—naphthyl | 70.3 | 2/3 | 5 | 230.5–231.5 | $C_{39}H_{28}N_2$ | C 89.28 H 5.38 N 5.34 | C 89.53 H 5.51 N 5.44 |
| 355 | —CH=CH—biphenyl | H | 54.5 | 5 | 2 | 226.5–227 | $C_{41}H_{30}N_2$ | C 89.42 H 5.49 N 5.09 | C 89.60 H 5.66 N 5.30 |
| 356 | —CH=CH—phenyl | —CH=CH—phenyl | 63.8 | 2/3 | 3 | 234 | $C_{43}H_{32}N_2$ | C 89.55 H 5.59 N 4.86 | C 89.37 H 5.58 N 5.00 |
| 357 | —CH=CH—CH=CH—phenyl | —CH=CH—CH=CH—phenyl | 73.7 | 11 | 9 | 285.5–286 | $C_{35}H_{40}N_2$ | C 90.63 H 5.53 N 3.84 | C 90.74 H 5.55 N 4.12 |
| 358 | H | —CH=CH—naphthyl | 53.4 | 11 | 5 | 274.5–275 | $C_{39}H_{28}N_2$ | C 89.28 H 5.38 N 5.34 | C 89.24 H 5.52 N 5.23 | tion product is filtered off, washed with a great deal of cold water and 400 ml of methanol, and dried. About 4.9 g, corresponding to 59.8 percent of theory, of 4-[stilbenyl-(4')]-2,6-diphenyl-pyridine of formula (360)

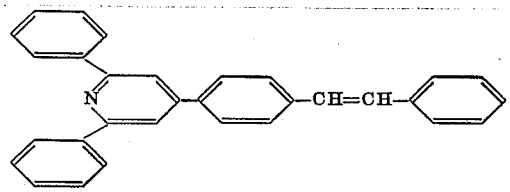

are obtained in the form of a pale yellow powder which melts at 168° to 170°C. Three recrystallizations from dioxane-ethanol, with the aid of activated charcoal, yield colorless very fine crystals of melting point 177.5° to 178°C.
Analysis: $C_{31}H_{23}N$ (409.50). Calculated: C 90.92, H 5.66, N 3.42; found: C 90.98, H 5.84, N 3.35.

In a similar manner 4-[4'-methyl-phenyl-(1')]-2,6-diphenyl-pyridine of formula (359), 4-phenyl-2,6-di-[4'-methyl-phenyl-(1')]-pyridine of formula (361)

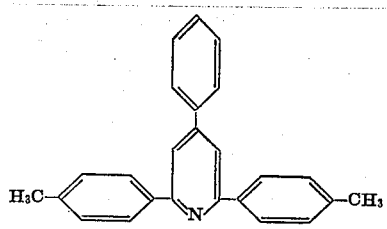

and 2,4,6-tri-[4'-methyl-phenyl-(1')]-pyridine of formula (362)

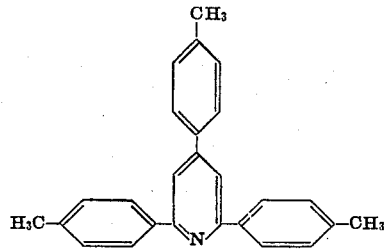

may be used to prepare the stilbenyl-pyridine derivatives of formula (363)

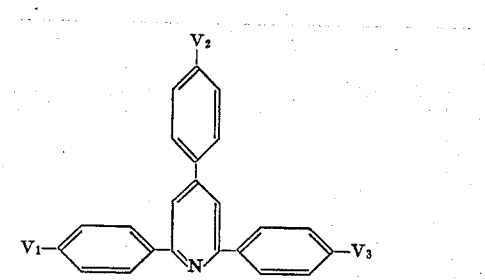

which are listed in the following table.

| I | II | | | III | IV | V | VI | VII | | |
|---|---|---|---|---|---|---|---|---|---|---|
| | $V_1$ | $V_2$ | $V_3$ | | | | | | | |
| 364 | H | —CH=CH—C₆H₄—C₆H₅ | H H | 84.5 | 4 | 1 | 275–275.5 | $C_{37}H_{27}N$ C 91.51 C 91.27 | H 5.60 H 5.46 | N 2.88 N 2.87 |
| 365 | —CH=CH—C₆H₅ | H | —CH=CH—C₆H₅ | 77.1 | 10/11 | 2 | 256–257 | $C_{39}H_{29}N$ C 91.55 C 91.56 | H 5.71 H 5.89 | N 2.74 N 2.67 |
| 366 | —CH=CH—C₆H₄—C₆H₅ | H | —CH=CH—C₆H₄—C₆H₅ | 86.6 | 4 | 5 | 370–371 | $C_{51}H_{37}N$ C 92.27 C 92.11 | H 5.62 H 5.80 | N 2.11 N 1.96 |
| 367 | —CH=CH—C₆H₅ | —CH=CH—C₆H₅ | —CH=CH—C₆H₅ | 93–8 | 5 | 2 | 194.5–195 | $C_{47}H_{35}N$ C 91.97 C 92.06 | H 5.75 H 5.84 | N 2.28 N 2.24 |

| I | II | | | III | IV | V | VI | VII | | |
|---|---|---|---|---|---|---|---|---|---|---|
| | V₁ | V₂ | V₃ | | | | | | | |
| 368 | —CH=CH—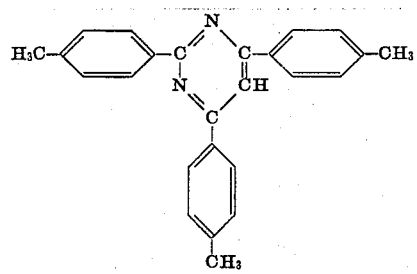 | —CH=CH— | —CH=CH— | 96.3 | 7/4 | 5 | 347–350 | C 92.71<br>C 92.73 | C₆₅H₄₇N<br>H 5.63<br>H 5.86 | N 1.66<br>N 1.73 |

Example 31

5.84 g of 2,4,6-tri-[4'-methyl-phenyl-(1')]-pyrimidine of formula (369)

9.1 g of benzalaniline and 25 g of potassium hydroxide powder containing about 10 percent of water reacted in 300 ml of dimethylformamide according to the data of Example 30. About 9.9 g, corresponding to 79.5 percent of theory, 2,4,6-tri-[stilbenyl-(4')]-pyrimidine of formula (370)

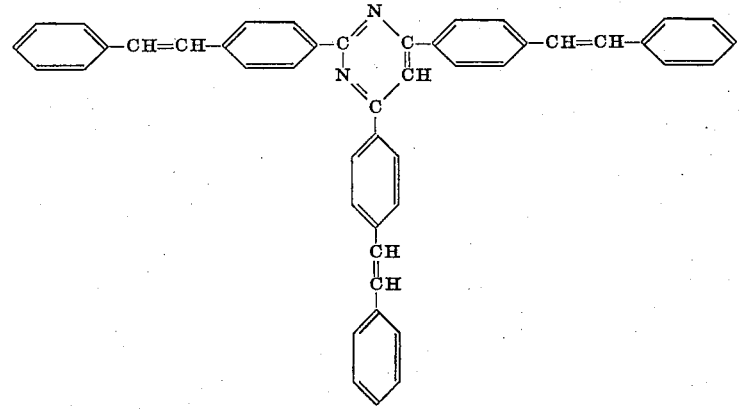

are obtained in the form of a light yellow powder. After three recrystallizations from xylene with the aid of Fuller's earth about 4.1 g, corresponding to 33 percent of theory, of light greenish yellow very fine small needles of melting point 247° to 248°C are obtained.

Analysis: $C_{46}H_{34}N_2$ (614.79). Calculated: C 89.87, H 5.57, N 4.56; found: C 89.89, H 5.63, N 4.68.

In a similar manner 2,4,6-tri-[4'-methyl-phenyl-(1')]-pyrimidine of formula (369) may be used to prepare the stilbenyl-pyrimidine derivatives of formula (371)

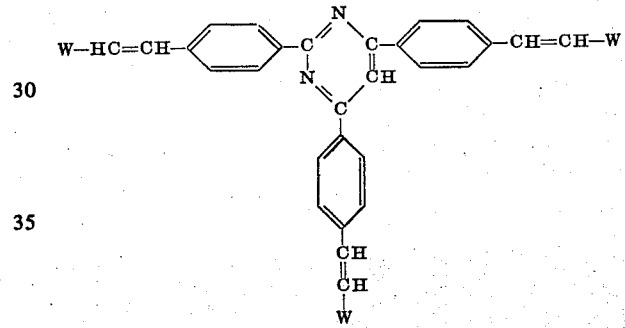

listed in the following table.

| | II, W | III | IV | V | VI | VII | | |
|---|---|---|---|---|---|---|---|---|
| 372 | —⌬—⌬ | 97.5 | 7/4 | 10 | 345–347.5 | C 91.18<br>C 91.16 | C₆₄H₄₆N₂<br>H 5.50<br>H 5.62 | N 3.32<br>N 3.24 |
| 373 | naphthyl | 97.4 | 5/11 | 7 | 288–288.5 | C 91.07<br>C 91.05 | C₅₈H₄₀N₂<br>H 5.27<br>H 5.38 | N 3.66<br>N 3.46 |
| 374 | naphthyl | 100 | 7 | 6 | 281–281.5 | C 91.07<br>C 90.86 | C₅₈H₄₀N₂<br>H 5.27<br>H 5.30 | N 3.66<br>N 3.50 |

Example 32

7.41 g of 2,3-diphenyl-6-methyl-quinoxaline of formula (375)

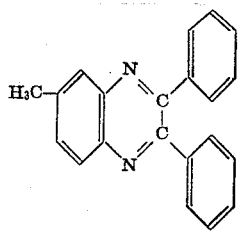

6.45 g diphenyl-(4)-aldehyde-anil and 12.5 g of potassium hydroxide powder containing about 10 percent of water are reacted in 150 ml dimethylformamide according to the data of Example 30. About 10.9 g, corresponding to 94.4 percent of theorie, of 2,3-diphenyl-6-[p-phenyl-styryl]-quinoxaline of formula (376)

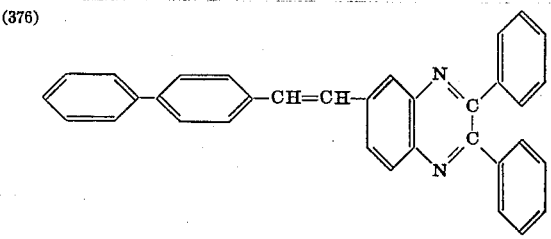

are obtained in the form of a yellowish powder which melts at 225° to 227°C. Three recrystallizations from tetrachlorethylene with the aid of Fuller's earth yield about 4.7 g, corresponding to 40.8 percent of theory, of greenish yellow fine small needles of melting point 230.5° to 231°C.

Analysis: $C_{34}H_{24}N_2$ (460.55). Calculated: C 88.66, H 5.25, N 6.08; found: C 88.63, H 5.37, N 6.07.

In a similar manner 2,3-diphenyl-6-methyl-quinoxaline of Formula (375), 2,3-di-[4'-methyl-phenyl-(1')]a-quinoxaline of formula (377)

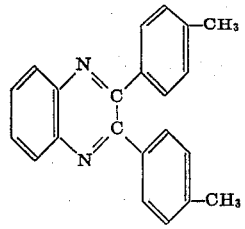

and 2,3-di-[4'-methyl-phenyl-(1')]-6-methyl-quinoxaline of formula (378)

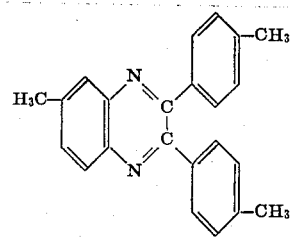

may be used to prepare the styryl-quinoxaline and stilbenyl quinoxaline derivatives of formula (379)

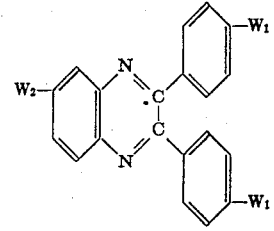

listed in the following table.

| I | II | | III | IV | V | VI | VII |
|---|---|---|---|---|---|---|---|
| | $W_1$ | $W_2$ | | | | | |
| 380 | H | —CH=CH—⌬ | 84.3 | 2 | 6 | 153.5–154 | $C_{28}H_{20}N_2$ C 87.47 H 5.24 N 7.29 C 87.65 H 5.25 N 7.44 |
| 381 | —CH=CH—⌬ | H | 93.0 | 5 | 5 | 243.5–244 | $C_{38}H_{26}N_2$ C 88.86 H 5.39 N 5.76 C 88.72 H 5.61 N 5.81 |
| 382 | —CH=CH—⌬⌬ | H | 97.7 | 7 | 9 | 221–323 | $C_{45}H_{34}N_2$ C 90.25 H 5.37 N 4.39 C 90.32 H 5.38 N 4.23 |
| 383 | —CH=CH—⌬ | —CH=CH—⌬ | 94.6 | 11 | 10 | 300–302 | $C_{44}H_{32}N_2$ C 89.76 H 5.48 N 4.76 C 89.70 H 6.62 N 4.60 |

| I | II | | III | IV | V | VI | VII | | |
|---|---|---|---|---|---|---|---|---|---|
| | W₁ | W₂ | | | | | | | |
| 384 | —CH=CH— 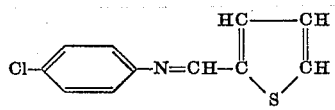 | —CH=CH— 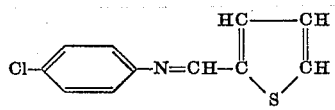 | 99 | 7 | 7 | 350-353 | C₆₂H₄₄N₂<br>C 91.14  H 5.43  N 3.43<br>C 91.10  H 5.42  N 3.57 | | |

EXAMPLE 33

6.24 g of 2,5-di-[4'-methyl-phenyl-(1')]-1,3,4-oxdiazole of formula (137), 11.1 g of the anil of formula (385)
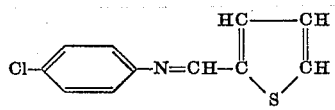

(prepared from thiophene-2-aldehyde and p-chloraniline; melting point 73° to 73.5°C) and 25 g of potassium hydroxide powder containing about 10 percent of water are reacted in 250 ml of dimethylformamide according to the description of Example 30. About 10.3 g, corresponding to 94 percent of theory, of the 1,3,4-oxdiazole compound of formula (386)
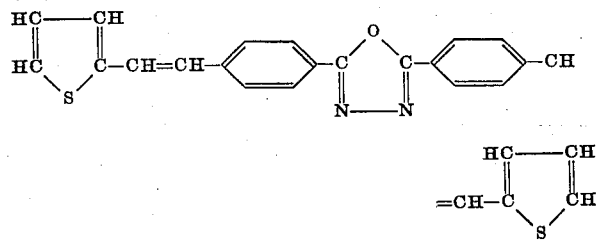

are obtained in the form of a light yellow powder which melts at 262° to 267.5°C. After three recrystallizations from o-dichlorobenzene with the aid of Fuller's earth about 6.3 g, corresponding to 57.6 percent of theory, of light yellow glistening platelets and small needles of melting point 272.5°C to 273.5°C are obtained.
Analysis: C₂₆H₁₈ON₂S₂ (438.57). Calculated: C 71.21, H 4.14, N 6.39; found: C 71.13, H 4.09, N 6.55.

In a similar manner the benzoxazole derivative of formula (387)
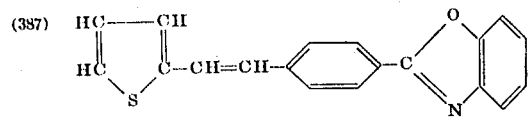

may be prepared from 1-[benzoxazolyl-(2')]-4-methylbenzene of formula (238). Yield, 44.2 percent of theory. Light greenish yellow glistening platelets and small needles from ethanol. Melting point: 216° to 216.5°C.
Analysis: C₁₉H₁₃ONS (303.38). Calculated: C 75.22, H 4.32, N 4.62; Found: C 75.22, H 4.38, N 4.57.

EXAMPLE 34

7.78 g of 2-[4'-methyl-phenyl-(1')]-4,5-diphenyl-oxazole of formula (279), 7.18 g of the anil of formula (388)
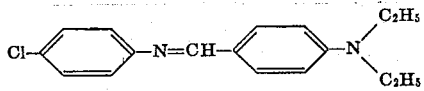

(prepared from p-diethylamino-benzaldehyde and p-chloraniline; melting point 88° to 88.5°C) and 12.5 g of potassium hydroxide powder containing about 10 percent of water are reacted in 200 ml of dimethylformamide according to the description of Example 30. About 9.8 g, corresponding to 82.7 percent of theory, of 2-[4''-diethylamino-stilbenyl-(4')]-4,5-di-phenyl-oxazole of formula (389)
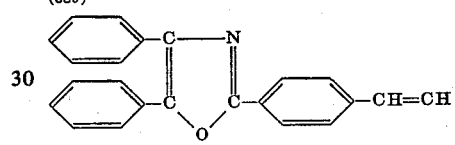
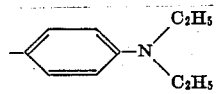

are obtained in the form of a yellow powder which melts at 192° to 193°C. Three recrystallizations from dioxane-ethanol, with the aid of activated charcoal, yield about 4.3 g, corresponding to 36.3 percent of theory, of orange-yellow glistening crystals of melting point 198.5° to 199°C.
Analysis: C₃₃H₃₀ON₂ (470.59). Calculated: C 84.22, H 6.43, N 5.95; found: C 84.23, H 6.34, N 5.85.

EXAMPLE 35

10.61 g of the oxdiazole compound of formula (390)
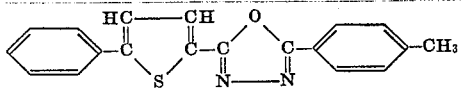

(prepared from 5-phenyl-thiophene-2-carboxylic acid chloride and 4-methylbenzoic acid hydrazide with subsequent ring closure by means of thionyl chloride; melting point: 195.5° to 196°C), 8.58 g of diphenyl-(4)-aldehyde-anil and 16.7 g of potassium hydroxide powder containing about 10 percent of water are reacted in 250 ml of dimethylformamide according to the description of Example 30. About 10.2 g, corresponding to 63.5 percent of theory, of the stilbenyl-1,3,4-oxdiazole compound of formula (391)
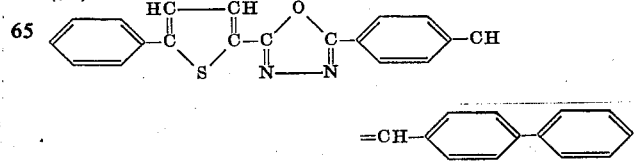

are obtained in the form of a light yellow powder which melts at 280° to 285°C. Three recrystallizations from o-dichlorobenzene, with the aid of Fuller's earth, yield about 7.0g, corresponding to 43,8 percent of theory, of light greenish yellow glistening small needles and platelets of melting point 288° to 288.5°C.

Analysis: $C_{32}H_{22}ON_2S$ (482.61). Calculated: C 79.64, H 4.60, N 5.80; found: C 79.82, H 4.89, N 5.91.

EXAMPLE 36

7.78 g of 2-[4'-methyl-phenyl-(1')]-4,5-diphenyl-oxazole of formula (279) and 6.45 g of diphenyl-(4)-aldehyde-anil are reacted in 200 ml dimethylformamide with the amounts of alkali compounds listed in the following Table, for the reaction times and at the reaction temperatures listed in this Table, with exclusion of air. After the reaction the reaction product is cooled to room temperature, rendered acid to Congo Red by means of 400 ml of dilute aqueous hydrochloric acid, filtered off, washed with water until neutral and purified by further washing with 500 ml of methanol. After drying the yields and melting points of crude 2-[4''-phenyl-stilbenyl-(4')]-4,5-diphenyl-oxazole of formula (291) listed in the following Table are obtained. After a single recrystallization from tetrachlorethylene with the aid of Fuller's earth the yields of pure 2-[4''-phenyl-stilbenyl-(4')]-4,5-diphenyl-oxazole of melting point 254.5° to 255°C listed in the following Table are obtained.

| Alkali compound | | Reaction time in minutes | Temperature in °C. | Crude product | | Pure product yield in percent |
|---|---|---|---|---|---|---|
| Formula | Grams | | | Yield in percent | Melting point in °C. | |
| LiNH₂ | 6.9 | 60 | 140-145 | 64 | 228-235 | 40.0 |
| NaOH | 12.0 | 120 | 120-125 | 75.2 | 239-244 | 54.0 |
| NaNH₂ | 11.7 | 120 | 90-95 | 76.6 | 249-251 | 68.3 |
| NaOCH₃ | 16.2 | 90 | 60-65 | 69.2 | 249-249.5 | 62.4 |
| NaOCH₃ | 16.2 | 50 | 90-95 | 95.2 | 253.5-254 | 86.8 |
| KOH plus 10% H₂O | 12.5 | 300 | 25 | 84.3 | 252-252.5 | 75.0 |
| | 12.5 | 120 | 35-40 | 91.0 | 253-253.5 | 83.5 |
| | 12.5 | 30 | 60-65 | 92.5 | 254-254.5 | 88.4 |
| | 12.5 | 60 | 90-95 | 89.4 | 254-254.5 | 85.2 |
| KOC(CH₃)₃ | 8.41 | 120 | 25 | 93.4 | 253.5-254 | 89.3 |
| RbOH·2H₂O | 10.0 | 90 | 60-65 | 86.8 | 254-254.5 | 81.3 |
| CsOH·H₂O | 10.0 | 90 | 60-65 | 90.2 | 253.5-254 | 83.5 |

EXAMPLE 37

3.89 g of 2-[4'-methylphenyl-(1')]-4,5-diphenyl-oxazole of formula (279), 3.23 g of diphenyl-(4)-aldehyde-anil and 6.25 g of potassium hydroxide powder containing about 10 percent of water are reacted in 100 ml of diethylformamide with exclusion of air for one hour at 90° to 95°C. After working-up and recrystallizing analogously to Example 35 about 1.5 g, corresponding to 8.85 % of theory, of 2-[4''-phenyl-stilbenyl-(4'')]-4,5-diphenyl-oxazole of formula (291) of melting point 254° to 254.5°C are obtained.

If instead of the diethylformamide dimethylacetamide is used as the solvent and the reaction is carried out for 1 hour at 120° to 125°C then about 0.1 g, corresponding to 2.13 percent of theory, 2-[4''-phenyl-stilbenyl-(4')]-4,5-di-phenyl-oxazole of formula (291) of melting point 255°C is obtained.

EXAMPLE 38

A polyester woven fabric (for example "Dacron") is padded at room temperature (about 20°C) with an aqueous dispersion which contains, per liter 2 g of one of the compounds of formulas (110), (114) to (126), (128), (147), (149), (152), (153), (157), (159) to (163), (177) to (179), (181), (184), (185), (217), (239), (241) to (250), (253), (255) to (265), (283) to (286), (291) to (293), (323), (327), (349), (354), (357), (358), (364), (366), (368), (370) and (372) to (374) as well as 1 g of an addition product of about 8 mols of ethylene oxide to 1 mol of p-tert.octylphenol, and is dried at about 100° C. The dry material is subsequently subjected to a heat treatment at 150° to 220°C, which depending on the temperature lasts for 2 minutes to a few seconds. The material which has been treated in this way has a singificantly whiter appearance than the untreated material.

EXAMPLE 39

100 parts of polyester granules of terephthalic acid/ethylene glycol polyester are intimately mixed with 0.05 parts of one of the stilbene derivatives of formula (110), (114) to (126), (128), (147), (149), (152), (153), (157), (159) to (163), (177) to (179), (181), (184), (185), (217), (239,), (241) to (250), (253), (255) to (265), (267), (268), (283) to (286), (291) to (293), (323), (327), (349), (354), (357), (358), (364), (366), (368), (370) and (372) to (374) and fused at 285°C with stirring. After spinning the spinning composition through conventional spinnerets greatly brightened polyester fibers are obtained.

The abovementioned compounds may also be added before or during the polycondensations of the starting substances to give the polyester.

EXAMPLE 40

10,000 parts of a polyamide prepared in a known manner from hexamethylene diamine adipate, in the form of chips, are mixed for 12 hours in a tumbler vessel with 30 parts of titanium dioxide (rutile modification) and 2 parts of the compound of formulas (110), (114) to (126), (128), (147), (149), (152), (153), (157), (159) to (163), (177) to (179), (181), (184), (185), (217), (239), (241) to (250), (253), (255) to (265), (267), (268), (283) to (286), (291) to (293), (323), (327), (349), (354), (357), (358), (364), (366), (368), (370), (372) to (374). The chips having been treated are fused in a kettle heated to 300°–310°C by means of oil or diphenyl vapor, after displacing the atmospheric oxygen by superheated steam, and are stirred for half an hour. The melt is then forced through a spinneret under a nitrogen excess pressure of 5 atmospheres and the filament which has been spun in this way and has been cooled is wrapped on a spinning spool. The filaments produced show an excellent brightening effect.

EXAMPLE 41

100 g of "fiber grade" polypropylene are intimately mixed with 0.02 g at a time of the compound of formula (177), (185) (239), (243) or (244) and fused at 280° to 290°C with stirring. After spinning through conventional spinnerets and stretching, polypropylene fibers having an excellent lightfast brightening effect are obtained.

We claim:

1. Process for the manufacture of heterocyclic compound containing ethylene double bonds, in which a compound of the formula

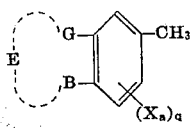

in which formula (a) G and B each denote a ring atom of a 5-membered to 6-membered ring system of aromatic character and represents an atom selected from the group consisting of carbon, oxygen, sulphur and nitrogen, but at least one of the symbols G and B represents a nitrogen atom and these atoms are present in the arrangement of known ring systems, (b) E denotes the ring member supplementation for a 5-membered to 6-membered ring system of aromatic character, containing an atom selected from the group consisting of carbon, nitrogen, oxygen and sulphur in the arrangement of known ring systems, and (c) the ring condensed with the ring containing E contains q substituents $X_a$ which do not contain any atoms, which are replaceable by alkali metal and $q$ represents 0, 1, 2 or 3, is reacted with a Schiff base of the formula

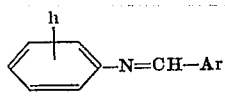

wherein Ar indicates naphthyl, diphenylyl, thienyl or a radical

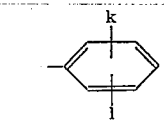

in which $d$ denotes a hydrogen or a halogen atom, and $k$ and $l$ denote a hydrogen atom, a chlorine atom or a methoxy group, an alkyl group or dialkylamino group with the exception of methyl, or adjacent $k$ and $l$ together denote the group $-O-CH_2-O-$, said reaction being carried out by contacting the said reaction components in the presence of a strongly basic alkali compound, having a basic strength of at least that of lithium hydroxide with the reaction medium to be used being dimethyl formamide and being practically anhydrous, except in the case of the use of an alkali hydroxide as the strongly basic alkali compound in which case the alkali hydroxide may have a water content of up to 25 percent.

2. Process according to claim 1, characterized by using as the starting substance a compound of formula

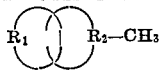

in which $R_1$ denotes a heterocyclic ring system which contains a 5-membered to 6-membered heterocyclic ring with two adjacent ring members which are directly bonded to $R_2$ and contains one to three ring nitrogen atoms, any other hetero atoms in the ring being no more than one sulfur or oxygen atom bonded in the ring, and $R_2$ denotes a benzene ring which is condensed with the hetero-ring, with the two carbon atoms belonging to both rings and with the carbon atoms bonded to the $H_3C$-group being in the 1,2,4-position relative to one another.

3. Process according to claim 1, characterized by using as the starting substance a compound of formula

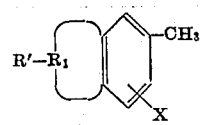

in which R' denotes a benzene residue and X a member selected from the group consisting of a hydrogen atom, a chlorine atom, a methoxy group and a methyl group and $R_1$ represents a 5-membered heterocyclic ring with a nitrogen atom exclusively bonded into the ring, this heterocyclic ring being condensed with the benzene ring in the stated manner.

4. Process according to claim 1, characterized by using as the starting substance a compound of formula

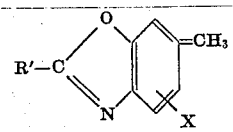

in which R' denotes a benzene residue and X a member selected from the group consisting of a hydrogen atom, a chlorine atom, a methoxy group and a methyl group.

5. Process according to claim 1, characterized by using as the strongly basic alkali compound an alkali metal compound of formula $$KOC_{m-1}H_{2m-1}$$

in which $m$ denotes an integer having a value of not more than 6.

6. Process according to claim 3, characterized by using as the strongly basic alkali compound an alkali metal compound of formula $$KOC_{m-1}H_{2m-1}$$

in which $m$ denotes an integer having a value of not more than 6.

7. Process according to claim 3, characterized by using as the strongly basic alkali compound potassium tert.-butylate.

8. Process according to claim 3, characterized by using as the strongly basic alkali compound, potassium hydroxide containing 0 to 10 percent of water.

9. Process according to claim 1, characterized by using as the strongly basic alkali compound potassium tert.-butylate.

10. Process according to claim 1, characterized by using as the strongly basic alkali compound, potassium hydroxide containing 0 to 10 percent of water.

11. Process according to claim 4, wherein R' is biphenyl and X is hydrogen.

* * * * *

UNITED STATES PATENT OFFICE
CERTIFICATE OF CORRECTION

PATENT NO. : 3,725,395
DATED : April 3, 1973
INVENTOR(S) : ADOLF EMIL SIEGRIST ET AL It is certified that error appears in the above-identified patent and that said Letters Patent are hereby corrected as shown below:

Column 15, left-hand portion formula (57) should be -- 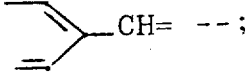 --;

right-portion formula (57) should be --  --.

Column 17, right-hand portion formula (63) should be -- 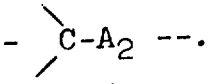 --.

Column 18, left-hand portion formula (67a) should be -- 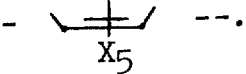 --.

Column 26, formula 120, under VII, "C 87.85" should be -- C 87.75 --

Column 29, center portion formula (146) should be -- 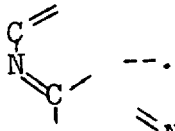 --.

Column 36, line 8, left-center portion formula should be -- 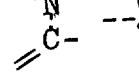 --

Column 40, in Table, right-hand portion formula 182 should be --

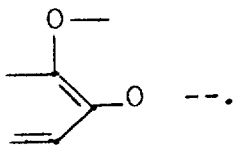 --.

Column 41, line 17 should be -- (4")]-1,3,4-oxdiazole of formula -- in Table, under $D_1$, opposite "190" should be -- 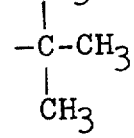 --.

UNITED STATES PATENT OFFICE
CERTIFICATE OF CORRECTION

PATENT NO. : 3,725,395
DATED : April 3, 1973
INVENTOR(S) : ADOLF EMIL SIEGRIST ET AL It is certified that error appears in the above-identified patent and that said Letters Patent are hereby corrected as shown below:

Column 45, in Table, "104" should be -- 204 --.

Column 47, right-hand portion formula 233 should be --  --.

Column 56, for formula 262, under VII, "H 4.83" should be -- H 5.03 --.

Column 57, for formula 275, under II, upper portion of formula should be --  --; under III, "92.4 should be -- 92.5 --.

Columns 59-60, in Table, under VI, opposite "282", "19.25" should be -- 192.5 --; opposite "287", "183" should be -- 182 --; under VII, opposite "289", "$C_{29}H_{19}ONCl$" should be -- $C_{29}H_{19}ONCl_2$ --; opposite "291","H 5.40" should be -- H 5.30 --; "C 88.6" should be -- 88.69 --; opposite "292" formula under $L_1$ should be --

--; under VI, "195.5" should be -- 159.5 --; under VII, "$C_{33}H_{25}ON$" should be -- $C_{33}H_{23}ON$ --.

Column 62, line 65, "-HC" should be -- -CH --.

Columns 63-64, under VII, opposite "309", "C 90.74" should be -- C 80.74 --; opposite "311", "H 4.69" should be -- H 5.69 --.

UNITED STATES PATENT OFFICE
CERTIFICATE OF CORRECTION

PATENT NO. : 3,725,395
DATED : April 3, 1973
INVENTOR(S) : ADOLF EMIL SIEGRIST ET AL It is certified that error appears in the above-identified patent and that said Letters Patent are hereby corrected as shown below:

Column 63, formula (312) should be --  -- formula (313) should be -- 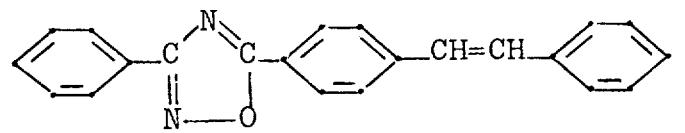 --;

formula (314) should be

-- 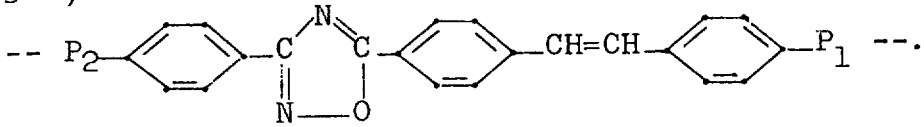 --.

Column 66, line 12, "(327)" should be -- (322) --.

Columns 65-66. under $Q_1$, opposite "324", "CH CH" should be -- -CH=CH --; under $Q_1$ and $Q_2$, opposite "326" both formulae should be -- -CH=CH --; opposite "327" both formulae should be -- -CH=CH-

  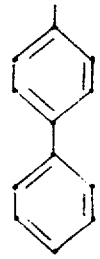

Column 67, under $Q_2$, opposite "330", lower left portion of formula should be --  --; center portion formula (332) should be

UNITED STATES PATENT OFFICE
CERTIFICATE OF CORRECTION

PATENT NO. : 3,725,395
DATED : April 3, 1973
INVENTOR(S) : ADOLF EMIL SIEGRIST ET AL It is certified that error appears in the above-identified patent and that said Letters Patent are hereby corrected as shown below:

-- 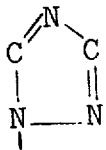 --; line 55, right-hand portion of formula should be

-- 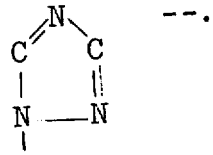 --.

Column 68, line 40, left-hand portion of formula should be

-- 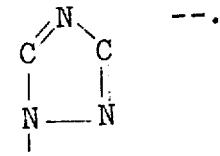 --.

Column 69, left-hand portion of formula (337) should be -- $H_3C\text{-}\!\!\bigg\langle$ --.

Column 73, under $U_4$ and $U_5$, opposite "357" both formulae should be

-- -CH=CH 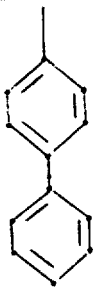 --.

Column 74, upper portion of formula (359) should be --  --

UNITED STATES PATENT OFFICE
CERTIFICATE OF CORRECTION

PATENT NO. : 3,725,395
DATED : April 3, 1973
INVENTOR(S) : ADOLF EMIL SIEGRIST ET AL It is certified that error appears in the above-identified patent and that said Letters Patent are hereby corrected as shown below:

Column 80, in the Table, under VI, opposite "382", "221-323" should be --- 321-323 --; under VII, opposite "383", "H 6.62" should be -- H 5.62 --.

Column 83, in the Table, column 3, opposite "NaOCH$_3$" (second occurrence), "50" should be --- 60 ---.

Column 86, claim 4, right-hand portion of formula should be

-- 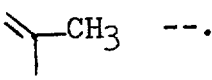 --.

Signed and Sealed this twenty-sixth Day of August 1975

[SEAL]

Attest:

RUTH C. MASON
Attesting Officer

C. MARSHALL DANN
Commissioner of Patents and Trademarks